United States Patent
Okamoto et al.

(10) Patent No.: US 8,276,073 B2
(45) Date of Patent: Sep. 25, 2012

(54) INFORMATION PROCESSING APPARATUS, INFORMATION PROCESSING METHOD, AND PROGRAM

(75) Inventors: Naoya Okamoto, Tokyo (JP); Ken Onogi, Tokyo (JP); Fujio Nobori, Kanagawa (JP); Seiichi Aoyagi, Tokyo (JP)

(73) Assignee: Sony Corporation (JP)

( * ) Notice: Subject to any disclaimer, the term of this patent is extended or adjusted under 35 U.S.C. 154(b) by 434 days.

(21) Appl. No.: 12/449,285

(22) PCT Filed: Jan. 31, 2008

(86) PCT No.: PCT/JP2008/051537
§ 371 (c)(1),
(2), (4) Date: Jul. 30, 2009

(87) PCT Pub. No.: WO2008/093784
PCT Pub. Date: Aug. 7, 2008

(65) Prior Publication Data
US 2010/0058192 A1    Mar. 4, 2010

(30) Foreign Application Priority Data

Feb. 2, 2007   (JP) .............................. P2007-024293
Mar. 27, 2007  (JP) .............................. P2007-082828

(51) Int. Cl.
*G06F 3/00* (2006.01)
(52) U.S. Cl. ........ 715/718; 715/716; 715/717; 715/738; 725/37; 725/110; 725/112; 725/61
(58) Field of Classification Search .................. 715/718, 715/738, 716, 717; 725/37, 39, 52, 60, 61, 725/109, 110, 112, 113, 118
See application file for complete search history.

(56) References Cited

U.S. PATENT DOCUMENTS

| | | | | |
|---|---|---|---|---|
| 5,818,935 A | * | 10/1998 | Maa | 380/200 |
| 5,903,816 A | * | 5/1999 | Broadwin et al. | 725/110 |
| 5,905,865 A | * | 5/1999 | Palmer et al. | 725/112 |
| 5,929,849 A | * | 7/1999 | Kikinis | 725/113 |

(Continued)

FOREIGN PATENT DOCUMENTS

EP    0 762 686 A2    3/1997
(Continued)

OTHER PUBLICATIONS

Colaitis F: "The MHEG Standard for Video on Demand and Digital Television Services" No. 4, Oct. 1, 1995, pp. 33-39, XP 000533328.

(Continued)

*Primary Examiner* — Weilun Lo
*Assistant Examiner* — Rashedul Hassan
(74) *Attorney, Agent, or Firm* — Lerner, David, Littenberg, Krumholz & Mentlik, LLP

(57) ABSTRACT

The present invention relates to an information processing apparatus, an information processing method, and a program that enable easy information acquisition.
A television receiver accesses an application server to acquire an application list. The television receiver accesses the application server again to acquire an application selected from the application list. While a processing based on the acquired application is being executed, the television receiver accesses a contents server to acquire contents data as needed. The acquired application or contents data is deleted from a storage section when an instruction to end the processing based on the application is made. The invention can be applied to a television receiver that acquires data through a network.

5 Claims, 45 Drawing Sheets

U.S. PATENT DOCUMENTS

| | | | |
|---|---|---|---|
| 6,118,976 A * | 9/2000 | Arias et al. | 725/118 |
| 6,141,003 A * | 10/2000 | Chor et al. | 715/719 |
| 6,169,541 B1 * | 1/2001 | Smith | 715/716 |
| 6,177,931 B1 * | 1/2001 | Alexander et al. | 725/52 |
| 6,240,555 B1 * | 5/2001 | Shoff et al. | 725/110 |
| 6,313,851 B1 * | 11/2001 | Matthews et al. | 715/718 |
| 6,859,937 B1 * | 2/2005 | Narayan et al. | 725/37 |
| 7,036,083 B1 * | 4/2006 | Zenith | 715/758 |
| 7,234,155 B1 * | 6/2007 | Kay et al. | 725/60 |
| 7,987,491 B2 * | 7/2011 | Reisman | 725/112 |
| 2004/0031058 A1 * | 2/2004 | Reisman | 725/112 |
| 2004/0139472 A1 * | 7/2004 | Furet et al. | 725/109 |
| 2005/0044191 A1 * | 2/2005 | Kamada et al. | 709/223 |
| 2005/0066366 A1 * | 3/2005 | Takamine | 725/59 |
| 2005/0235319 A1 * | 10/2005 | Carpenter et al. | 725/52 |
| 2005/0235331 A1 * | 10/2005 | Lynch | 725/100 |
| 2005/0262548 A1 | 11/2005 | Shimojo et al. | |
| 2008/0235728 A1 * | 9/2008 | Kim | 725/39 |
| 2009/0119335 A1 * | 5/2009 | Ide et al. | 707/104.1 |

FOREIGN PATENT DOCUMENTS

| | | |
|---|---|---|
| JP | 2005-303553 A | 10/2005 |
| JP | 2006-005897 A | 1/2006 |
| JP | 2006-058268 A | 3/2006 |
| JP | 2006-115213 A | 4/2006 |
| WO | 0131442 A2 | 5/2001 |
| WO | 03088645 A1 | 10/2003 |

OTHER PUBLICATIONS

Steven Morris et al: "Interactive TV Standards" A Guide to MHP, OCAP, and Java TV (Chapters 3 and 4), Jan. 1, 2005, Interactive TV Standards, Amsterdam: Elsevier, NL, pp. 41-88, XP 002394425.

Supplementary European Search Report EP 08704280, dated May 24, 2012.

* cited by examiner

FIG. 22

INFORMATION PROCESSING APPARATUS, INFORMATION PROCESSING METHOD, AND PROGRAM

CROSS-REFERENCES TO RELATED APPLICATIONS

The present application is a national phase entry under 35 U.S.C. §371 of international Application No. PCT/JP2008/051537 filed Jan. 31, 2008, published on Aug. 7, 2008 as WO 2008/093784 A1, which claims priority from Japanese Patent Application No. JP 2007-024293 filed in the Japanese Patent Office on Feb. 2, 2007 and Japanese Patent Application No. JP 2007-082828 filed in the Japanese Patent Office on Mar. 27, 2007.

TECHNICAL FIELD

The present invention relates to an information processing apparatus, an information processing method, and a program, and in particular, to an information processing apparatus, an information processing method, and a program that enable a user to freely acquire information.

BACKGROUND ART

The spread of Internet enables a user to acquire information. In addition, in the digital television broadcasting, the user can acquire desired information from the television broadcasting through two-way communication. Furthermore, the user can acquire desired information by reading out a predetermined code, such as a QR code (Registered Trademark) or the like, and accessing a predetermined site with a mobile phone or the like. (For example, see Patent Document 1.)

Patent Document 1: JP-A-2005-303553

DISCLOSURE OF THE INVENTION

Problem that the Invention is to Solve

The user can acquire information in various ways, but he/she wants to easily and freely acquire information. Furthermore, it is desirable to enable everyone to view desired information only with a simple operation, instead of allowing only a person who carries out a predetermined operation to view information.

The invention has been finalized in consideration of such a situation, and it is an object of the invention to enable a user to more easily and freely acquire information while watching television broadcasting.

Means for Solving the Problem

According to an aspect of the invention, an information processing apparatus controls display of a program of television broadcasting and executes processing based on a predetermined application, and when a processing mode is switched in the application, activates a Web browser to change the processing based on the application to processing based on the Web browser.

Display may be controlled such that a screen of the program of television broadcasting and a screen by the processing based on the application lie next to each other.

When the Web browser is activated, control of the program of television broadcasting may stop.

The application may be acquired through a network, a plurality of acquired applications may execute processing in parallel, and when the Web browser is activated, the plurality of applications may be discarded.

According to another aspect of the invention, an information processing method includes the steps of controlling display of a program of television broadcasting and executing processing based on a predetermined application, and when a processing mode is switched in the application, activating a Web browser to change the processing based on the application to processing based on the Web browser.

According to yet another aspect of the invention, a computer-readable program controls a processing including the steps of controlling display of a program of television broadcasting and executing processing based on a predetermined application, and when a processing mode is switched in the application, activating a Web browser to change the processing based on the application to processing based on the Web browser.

The information processing apparatus, the information processing method, and the program, control display a program of television broadcasting and execute processing based on a predetermined application, and when a processing mode is switched in the application, activates a Web browser to change the processing based on the application to processing based on the Web browser.

Advantage of the Invention

According to the aspects of the invention, images that are managed by a predetermined server or the like can be viewed through simple setting.

BRIEF DESCRIPTION OF THE DRAWINGS

FIG. 22 is a diagram showing an example of a screen which is displayed on the display panel.
FIG. 44-1 is a flowchart illustrating the operation of the television receiver.
FIG. 44-2 is a flowchart illustrating the operation of the television receiver.

DESCRIPTION OF REFERENCE NUMERALS AND SIGNS

11: NETWORK
12: APPLICATION SERVER
13: CONTENTS SERVER
14: TELEVISION RECEIVER
219: GRAPHIC GENERATION CIRCUIT
220: PANEL DRIVING CIRCUIT
221: DISPLAY PANEL
230: SDRAM
231: FLASH MEMORY
232: CPU
251: REMOTE CONTROLLER

BEST MODE FOR CARRYING OUT THE INVENTION

Figure 1:
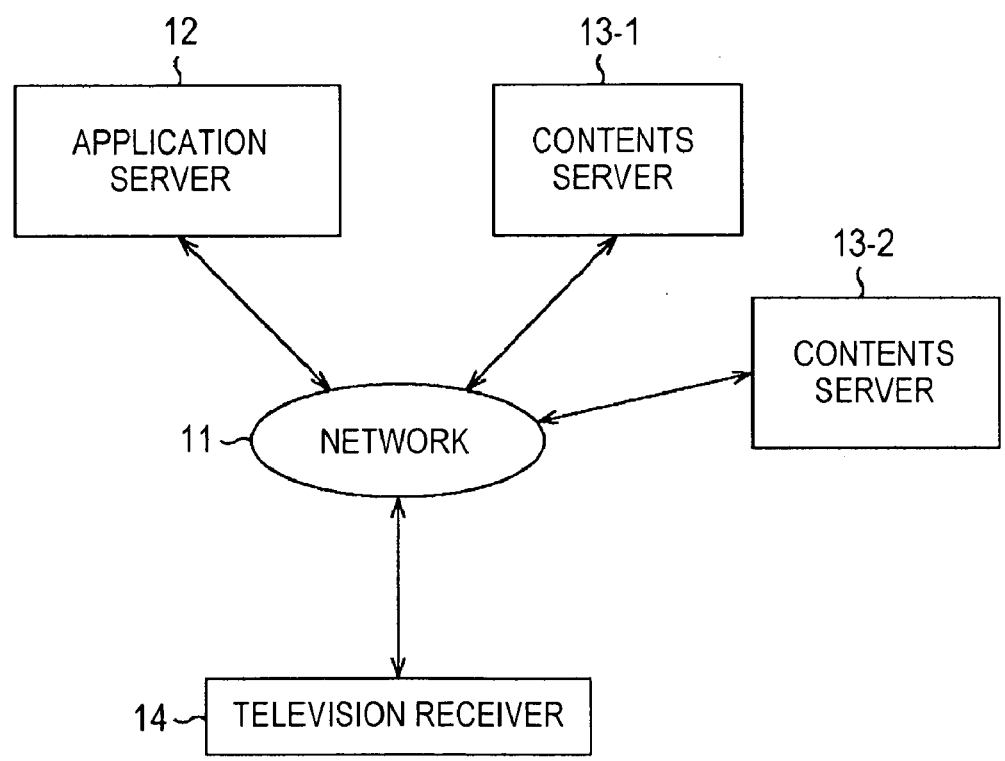
FIG. 1 is a diagram showing the configuration of an embodiment of a system to which the invention is applied.

Hereinafter, an embodiment of the invention will be described with reference to the drawings.
[System Configuration]
FIG. 1 is a diagram showing the configuration of an embodiment of a system to which the invention is applied. A system shown in FIG. 1 is configured such that an application server 12, a contents server 13-1, a contents server 13-2, and a television receiver 14 are connected to a network 11.

The network 11 includes Internet, a LAN (Local Area Network), or the like, and is used for data exchange between devices connected thereto. The application server 12 is a server that manages applications to be described below or a list of applications.

The contents server 13-1 or the contents server 13-2 is a server that manages contents, which are used by the applications being managed by the application server 12. In the following description, when it is not necessary to individually distinguish the contents server 13-1 and the contents server 13-2, the contents server 13-1 or the contents server 13-2 is referred to as a contents server 13. While FIG. 1 shows an example where two contents servers 13 are connected to the network 11, two or more contents servers 13 may be connected to the network 11.

The contents being managed by the contents server 13 include text data, image data, and video data. The contents may include programs.

The television receiver 14 is a user-end information processing apparatus. The television receiver 14 has a function that receives television broadcasting and provides a program of television broadcasting to the user, and a function that acquires an application being managed by the application server 12 through the network 11, carries out a processing based on the application, and provides predetermined information to the user. While FIG. 1 shows an example where the single television receiver 14 is connected to the network 11, one or more television receivers 14 are connected to the network 11.

In the system of this embodiment shown in FIG. 1, with the television receiver 14, the user can watch a program of television broadcasting and view predetermined information by a processing based on an application, which is managed by the application server 12. The details of such a system will be described below.

Figure 2:
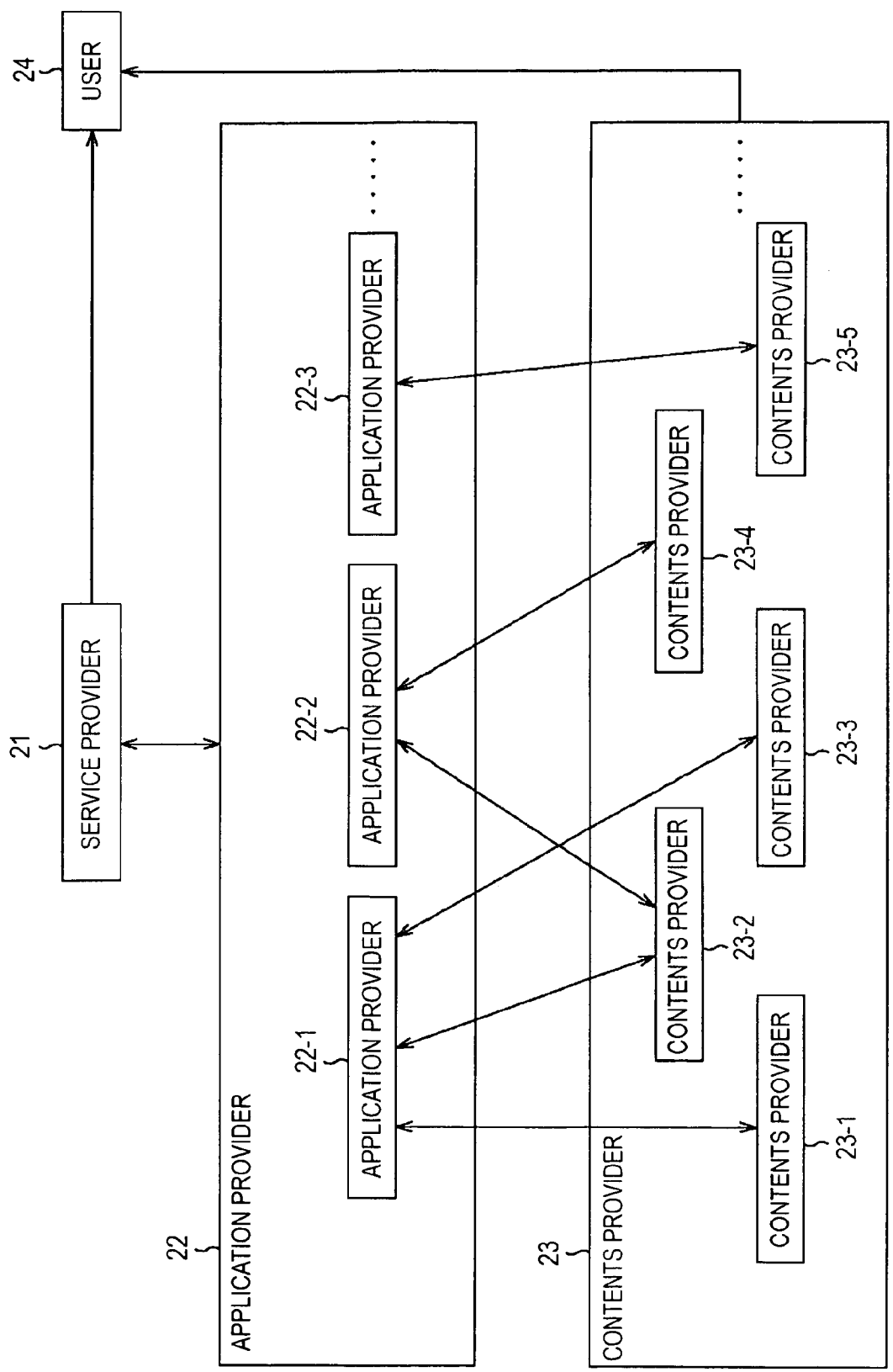
FIG. 2 is a diagram further showing the configuration of the system.

FIG. 2 is a diagram showing the relationship between an administrator who manages the server shown in FIG. 1 or the like and a user who uses a service. A service provider 21, an application provider 22, and a contents provider 23 provides a service. A user 24 uses a service.

The service provider 21 manages the application server 12. The application provider 22 includes a plurality of application providers 22, such as an application provider 22-1, an application provider 22-2, an application provider 22-3, . . . . The contents provider 23 includes a plurality of contents providers 23, such as a contents provider 23-1, a contents provider 23-2, a contents provider 23-3, a contents provider 23-4, a contents provider 23-5, . . . .

The single service provider 21 is present. The service provider 21 manages the application server 12, and manages an application list 71 and applications 72 in the application server 12, as described below with reference to FIG. 4. While the application list 71 describes therein information regarding an application 72, the application 72 is provided from the application provider 22.

The application provider 22 provides an application 72. The application 72 is configured to appropriately refer to contents data, which is managed in the contents server 13. Contents data for reference is provided by the contents provider 23.

In the example of FIG. 2, the application provider 22-1 provides an application 72, which refers to contents from the contents provider 23-1, contents from the contents provider 23-2, and contents from the contents provider 23-3, to the service provider 21.

Similarly, in the example of FIG. 2, the application provider 22-2 provides an application 72, which refers to contents from the contents provider 23-2 and contents from the contents provider 23-4, to the service provider 21. Similarly, in the example of FIG. 2, the application provider 22-3 provides an application 72, which refers to contents from the contents provider 23-5, to the service provider 21.

In this way, the application provider 22 provides an application 72, which can refer to contents to be provided from a plurality of contents providers 23, to the service provider 21. A contract is made between the service provider 21 and the application provider 22, and the service provider 21 may obtain a contract fee or a registration fee from the application provider 22.

The service provider 21 can preliminarily examine an application 72, which is registered in the application server 12, so as to prevent an application 72 including a virus or the like from being registered. The unified service provider 21 ensures improvement of security.

The application 72 that is managed by the service provider 21 is provided to the user 24 on the basis of a request from the user 24. If necessary, the application 72 that is registered in the service provider 21 is checked at the time of registration, as described above, and after registration, thereby providing a safe application, not an application with a virus or the like.

When an application provided to the user 24 is configured to refer to contents which are provided by the contents provider 23, the application receives contents from the contents provider 23 with a single processing.

A contract may also be individually made between the application provider 22 and the contents provider 23.

The application provider 22 and the contents provider 23 may be the same. Basically, the contents provider 23 manages the contents server 13, but when the application provider 22 and the contents provider 23 are the same, the application provider 22 may manage the contents server 13.

As the examples of the application provider 22 and the contents provider 23, a company that operates a predetermined search site or a company that carries on business on the network serves as the application provider 22, and a company that provides contents, such as news or weather forecast, constituting the pages of the search site, serves as the contents provider 23.

[Example of Configuration of Application Server]

Figure 3:
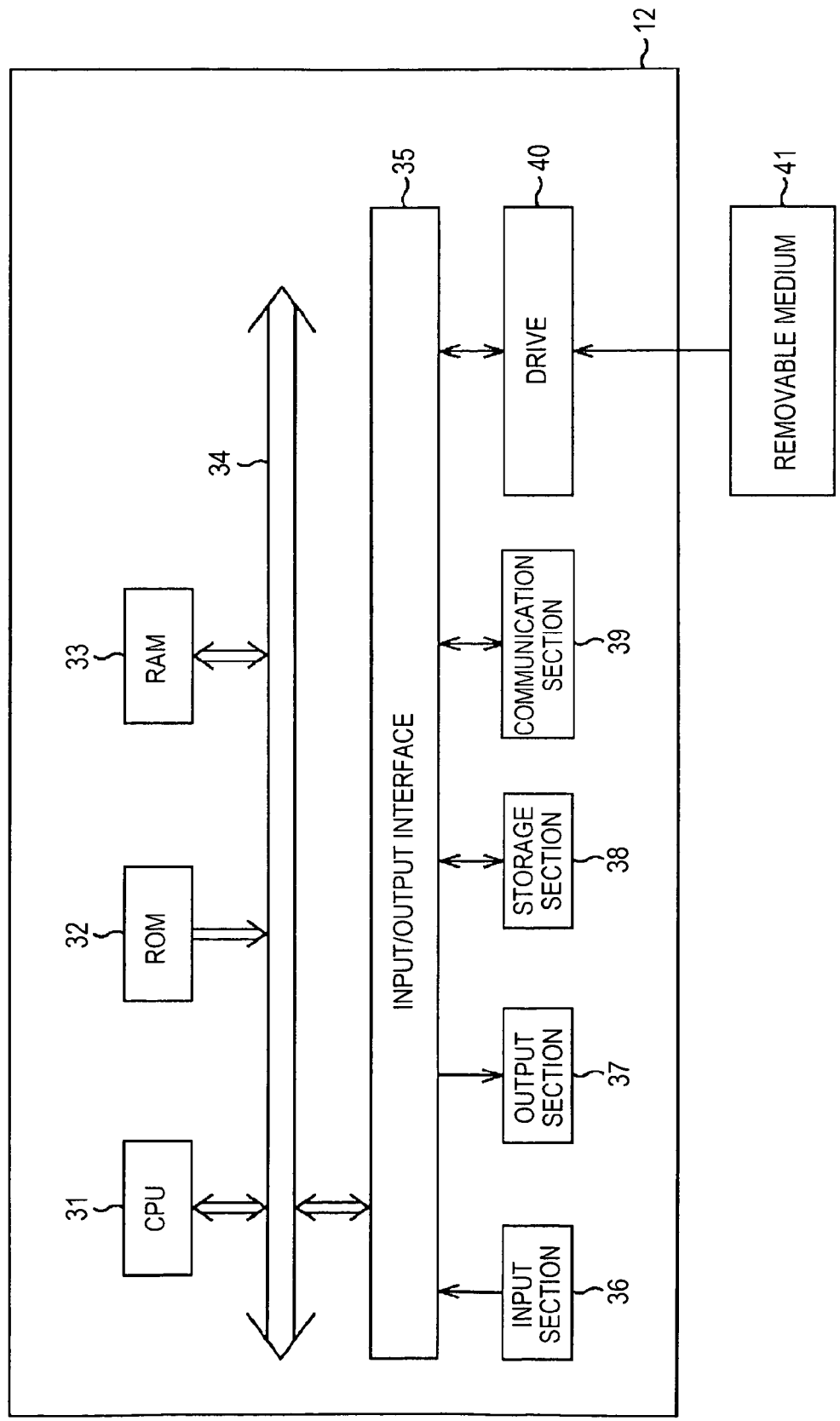
FIG. 3 is a diagram showing an example of the internal configuration of an application server.

FIG. 3 is a diagram showing an example of the internal configuration of the application server 12. The application server 12 may be formed by, for example, a personal computer, and the internal configuration thereof may be the same as the personal computer.

The application server 12 includes a CPU (Central Processing Unit) 31, a ROM (Read Only Memory) 32, a RAM (Random Access Memory) 33, a bus 34, an input/output interface 35, an input section 36, an output section 37, a storage section 38, a communication section 39, and a drive 40.

In the application server 12, the CPU 31, the ROM 32, and the RAM 33 are connected to each other through the bus 34. The input/output interface 35 is also connected to the bus 34. To the input/output interface 35, the input section 36 including a keyboard, a mouse, a microphone, or the like, the output section 37 including a display, a speaker, or the like, the storage section 38 including a hard disk, a nonvolatile memory, or the like, the communication section 39 including a network interface or the like, and a drive 40 driving a removable medium 41, such as a magnetic disc, an optical disc, a magneto-optical disk, or a semiconductor memory, are connected.

As the CPU 31, a cell described in "The Birth of Cell", Nikkei Electronics, Nikkei BP Inc., Feb. 28, 2005, pp. 89-117 may be used.

In the application server 12 configured as above, the CPU 31 loads a program, which is stored in the storage section 38 on the RAM 33 through the input/output interface 35 and the bus 34, and executes the program, such that a series of processing to be described below is performed.

Figure 4:
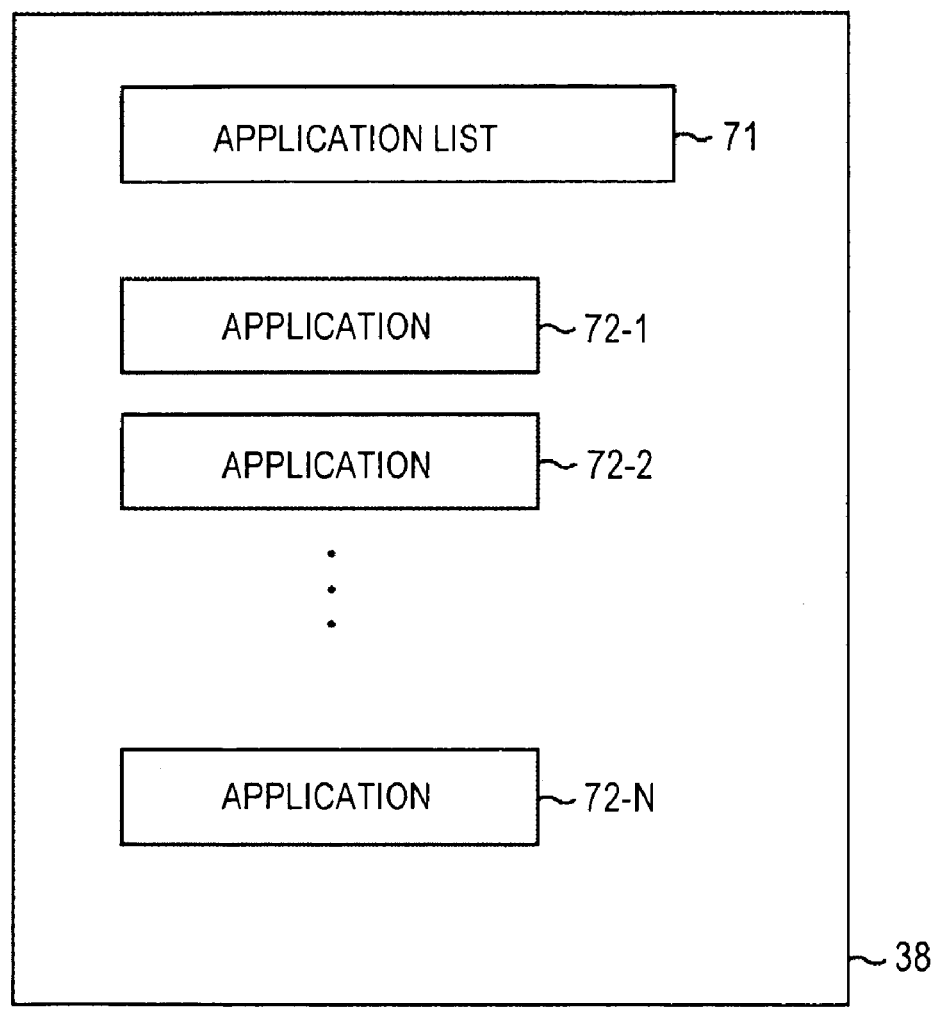
FIG. 4 is a diagram illustrating data which is managed by the application server.

FIG. 4 is a diagram illustrating data which is stored in the storage section 38. The storage section 38 stores the application list 71 and the applications 72-1 to 72-N. The application list 71 is a list of the applications 72-1 to 72-N, which are managed by the application server 12, and is data which is provided to the television receiver 14 when the television receiver 14 accesses, in other words, when a menu screen for application selection is displayed on the television receiver 14.

Each of the applications 72-1 to 72-N is data of a main body of the application. In the following description, when it is not necessary to individually distinguish the applications 72-1 to 72-N, the applications 72-1 to 72-N are simply referred to as an application 72.

The application 72 may be a program, called a widget. The widget is a single-function program that is executed in a specific runtime environment mainly on a desktop of a personal computer. Examples of the widget include a watch, a calendar, a dictionary, a calculator, and a program for providing weather information or the like. The widget may cooperate with the network.

The application server 12 provides the application list 71 to the television receiver 14. Then, an application 72 selected from the application list 71 on the television receiver 14 side is provided to the television receiver 14.

[Example of Internal Configuration of Contents Server]

Figure 5:
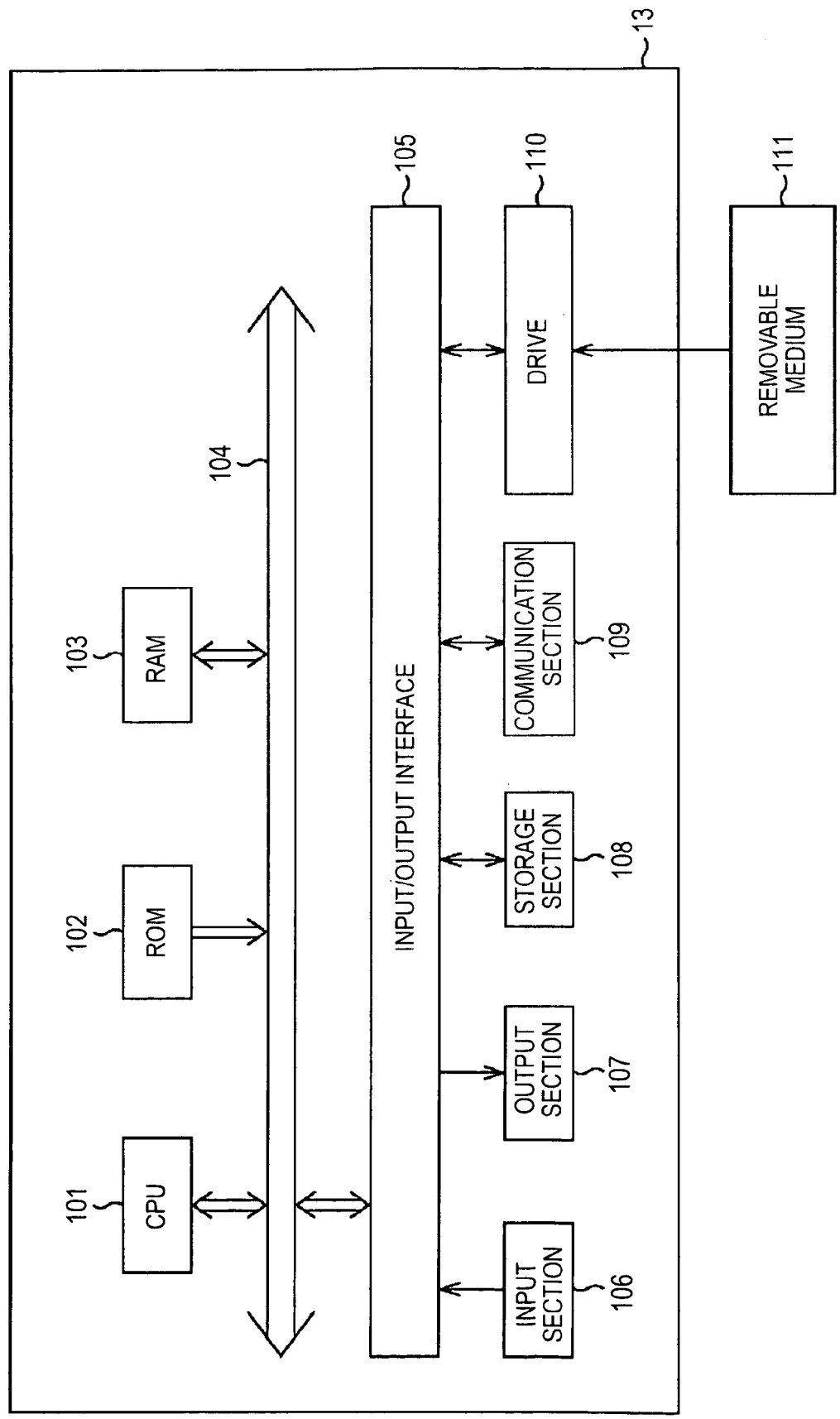
FIG. 5 is a diagram showing an example of the internal configuration of a contents server.

FIG. 5 is a diagram showing an example of the internal configuration of the contents server 13. Similarly to the application server 12, the contents server 13 may be formed by, for example, a personal computer, and the internal configuration thereof may be the same as the personal computer.

In the contents server 13, a CPU 101, a ROM 102, a RAM 103 are connected to each other through a bus 104. An input/output interface 105 is also connected to the bus 104. To the input/output interface 105, an input section 106 including a keyboard, a mouse, a microphone, or the like, an output section 107 including a display, a speaker, or the like, a storage section 108 including a hard disk, a nonvolatile memory, or the like, a communication section 109 including a network interface or the like, and a drive 110 driving a removable medium 111, such as a magnetic disc, an optical disc, a magneto-optical disk, or a semiconductor memory, are connected.

As the CPU 101, a cell described in "The Birth of Cell", Nikkei Electronics, Nikkei BP Inc., Feb. 28, 2005, pp. 89-117 may be used.

In the contents server 13 configured as above, the CPU 101 loads a program, which is stored in the storage section 108, on the RAM 103 through the input/output interface 105 and the bus 104, and executes the program, such that a series of processing to be described below is performed.

Figure 6:
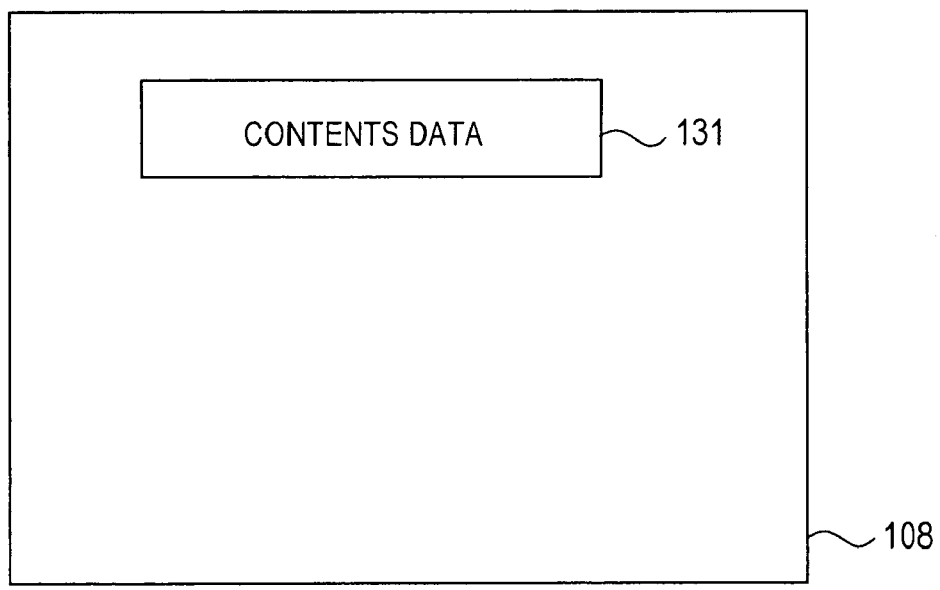
FIG. 6 is a diagram illustrating data which is managed by the contents server.

As shown in FIG. 6, the storage section 108 of the contents server 13 stores contents data 131. Contents data 131 is a program or text data.

In the application 72 that is managed by the application server 12, an URL (Uniform Resource Locator) where contents data necessary for the application 72 is managed is described. A processing based on the application 72 is performed on the television receiver 14 side, and an access to the contents server 13 is executed on the basis of the URL in the application 72, and contents data 131 is provided.

For example, if the application 72 is an application for providing news, contents data 131 is text data or image data which represents the contents of news. If the application 72 is an application for fortune-telling, contents data 131 is text data which represents the contents of fortune-telling for every zodiac sign or data of an image obtained by imaging the corresponding zodiac sign.

While a case where contents data 131 is managed by the contents server 13 will continue to be described, contents data 131 may be managed by the application server 12. In this case, the service provider 21 also functions as the application provider 22 including a plurality of application providers 22.

Contents data 131 that is managed by the contents server 13-1 is different from contents data 131' that is managed by the contents server 13-2 (a dash (') is put in order to distinguish from contents data 131 that is managed by the contents server 13-1). In other words, different applications 72 are configured to refer to different contents data 131 such that contents data to be cited by the application 72-1 is contents data 131, and contents data to be cited by the application 72-2 is contents data 131'.

A single application 72 may access a plurality of contents servers 13 to acquire a plurality of contents data 131.

[Example of Internal Configuration of Television Receiver]

Figure 7:
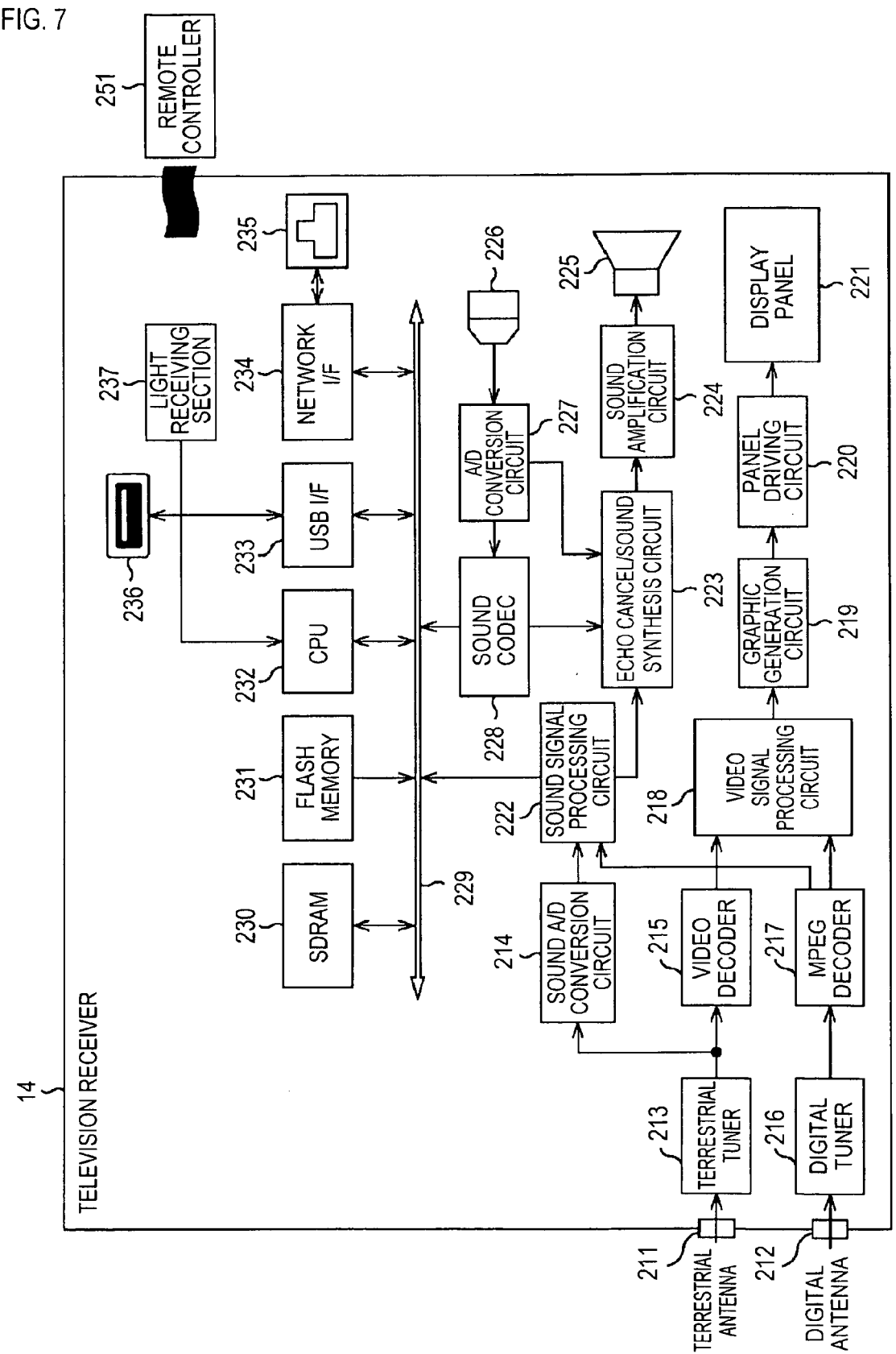
FIG. 7 is a diagram showing an example of the internal configuration of a television receiver.

FIG. 7 is a diagram showing an example of the internal configuration of the television receiver 14.

The television receiver 14 has an antenna input terminal 211 to which a signal is input from an antenna for reception of analog terrestrial broadcasting, and an antenna input terminal 212 to which a signal is input from an antenna for reception of digital broadcasting (digital terrestrial broadcasting and digital BS/CS broadcasting). One of the terminals may be provided.

A terrestrial tuner 213 receives and demodulates a broadcasting signal input to the antenna input terminal 211, and acquires a video signal and a sound signal. The terrestrial tuner 213 outputs the acquired sound signal to a sound A/D (Analog/Digital) conversion circuit 214, and outputs the video signal to a video decoder 215.

The sound A/D conversion circuit 214 carries out A/D conversion for the sound signal supplied from the terrestrial tuner 213, and outputs the obtained digital sound signal to a sound signal processing circuit 222.

The video decoder 215 carries out decoding for the video signal supplied from the terrestrial tuner 213, and outputs the obtained digital component signal to the video signal processing circuit 218.

A digital tuner 216 receives and demodulates a broadcasting signal input to the antenna input terminal 212, and acquires MPEG-TS (Moving Picture Experts Group-Transport Stream). The digital tuner 216 outputs the acquired MPEG-TS to an MPEG decoder 217.

The MPEG decoder 217 releases scrambling of the MPEG-TS supplied from the digital tuner 216, and extracts a stream including data of a program to be reproduced (watched). The MPEG decoder 217 decodes sound packets constituting the extracted stream, and outputs obtained sound data to the sound signal processing circuit 222. The MPEG decoder 217 also decodes video packets constituting the stream, and outputs obtained video data to the video signal processing circuit 218.

The MPEG decoder 217 also performs a processing to output EPG (Electronic Program Guide) data extracted from the MPEG-TS to a CPU (Central Processing Unit) 232 through a path (not shown).

The video signal processing circuit 218 carries out a predetermined processing, such as noise elimination or the like, for video data supplied from the video decoder 215 or video data supplied from the MPEG decoder 217, and outputs obtained video data to a graphic generation circuit 219.

The graphic generation circuit 219 generates video data of a program to be displayed on a display panel 221 or image data by a processing based on the application 72, which is supplied through the network 11, and outputs generated video data or image data to a panel driving circuit 220. The graphic generation circuit 219 is configured to appropriately carry out a processing to generate video data (graphic) for display of a screen, which is used by the user in selection of an item, and to output video data, which is obtained by superimposing generated video data on video data of the program, to the panel driving circuit 220.

The panel driving circuit 220 drives the display panel 221 on the basis of data supplied from the graphic generation circuit 219, and displays the video of the program or various screens described above on the display panel 221.

The display panel 221 is formed by an LCD (Liquid Crystal Display) or the like, and displays the video of the program or the like under the control of the panel driving circuit 220.

The sound signal processing circuit 222 carries out a predetermined processing, such as noise elimination or the like, for sound data supplied from the sound A/D conversion circuit 214 or sound data supplied from the MPEG decoder 217, and outputs obtained sound data to an echo cancel/sound synthesis circuit 223.

The echo cancel/sound synthesis circuit 223 outputs sound data, which is supplied from the sound signal processing circuit 222, to a sound amplification circuit 224, and outputs sound of the program from a speaker 225.

When data of sound supplied through the network 11 is supplied from a sound codec 228, or when data of sound of the user (user A) of the television receiver 14 is supplied from an A/D conversion circuit 227, the echo cancel/sound synthesis circuit 223 carries out echo cancel for sound data of the user A. The echo cancel/sound synthesis circuit 223 outputs data of sound obtained by synthesis to the sound amplification circuit 224.

The sound amplification circuit 224 carries out D/A conversion and amplification for sound data supplied from the echo cancel/sound synthesis circuit 223, adjusts the volume to a predetermined volume, and outputs sound from the speaker 225.

The A/D conversion circuit 227 receives a signal of sound of the user imported by a microphone 226, which is provided in the television receiver 14 for voice speech, and carries out A/D conversion for the received sound signal. The A/D conversion circuit 227 outputs digital sound data, which is obtained by A/D conversion, to the echo cancel/sound synthesis circuit 223 and the sound codec 228.

The sound codec 228 converts sound data supplied from the A/D conversion circuit 227 into a predetermined format data of for transmission through the network 11, and outputs converted data to a network I/F 234 through an internal bus 229.

A SDRAM (Synchronous Dynamic Random Access Memory) 230, a flash memory 231, the CPU 232, a USB (Universal Serial Bus) I/F 233, and the network I/F 234 are also connected to the internal bus 229.

The SDRAM 230 stores various kinds of data necessary for a processing in the CPU 232.

The flash memory 231 stores a program that is executed by the CPU 232. The program that is stored in the flash memory 231 is read out by the CPU 232 with a predetermined timing, for example, when the television receiver 14 is activated. The flash memory 231 also stores EPG data acquired through digital broadcasting, data acquired from a predetermined server through the network 11, and the like.

The CPU 232 executes the program that is stored in the flash memory 231, and controls the overall operation of the television receiver 14 in accordance with a control code to be supplied from a light receiving section 237. The CPU 232 and the individual sections of the television receiver 14 are connected to each other through a path (not shown).

The USB I/F 233 performs data transmission and reception with an apparatus outside the television receiver 14, which is connected through a USB cable attached to a USB terminal 236. The network I/F 234 is connected to the network 11 through a cable attached to a network terminal 235, and performs data transmission and reception with various devices, which are connected to the network 11.

The light receiving section 237 receives infrared light from a remote controller 251, and outputs a control code, which is obtained by demodulation and represents the contents of a user operation, to the CPU 232.

Figure 8:
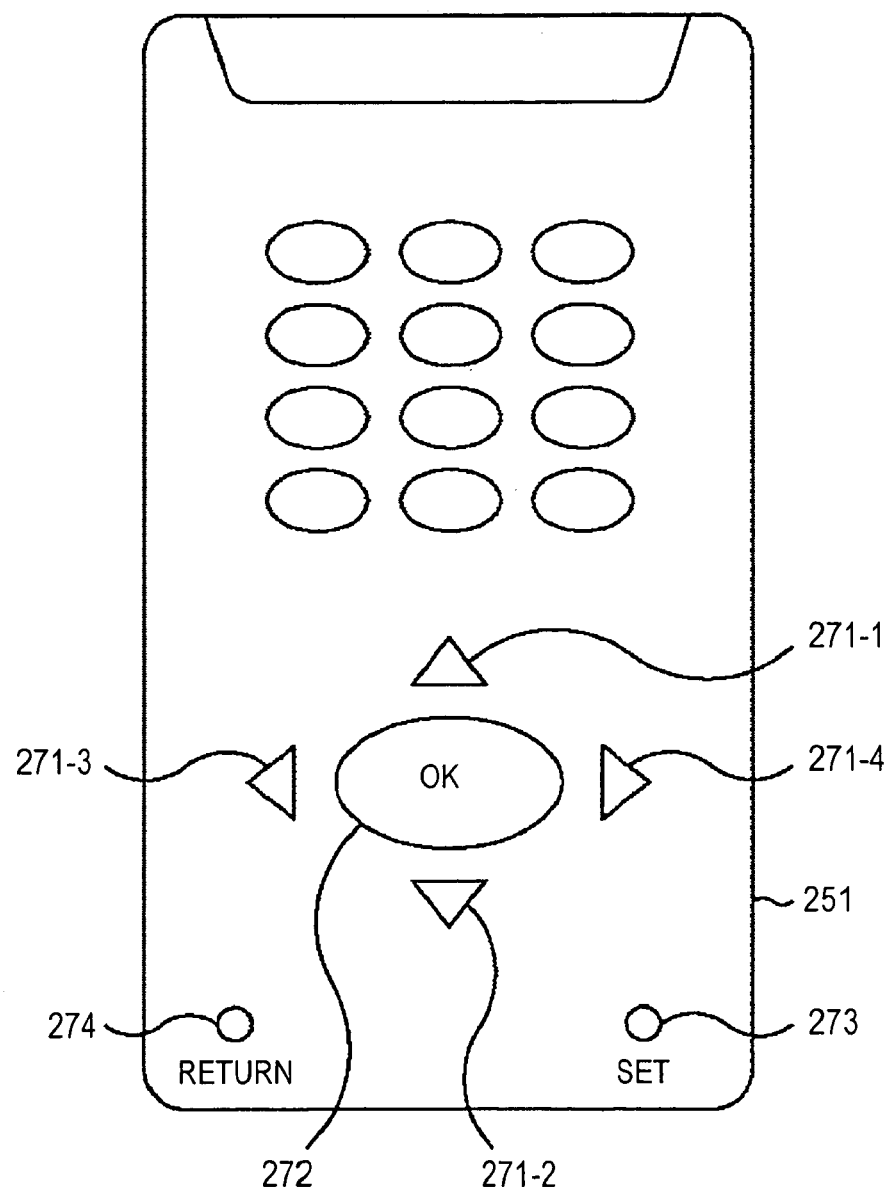
FIG. 8 is a diagram showing an example of the exterior configuration of a remote controller.

FIG. 8 is a diagram showing an example of the exterior configuration of the remote controller 251. The remote controller 251 includes an up button 271-1 for upward movement of a cursor, which is displayed on the television receiver 14, a down button 271-2 for downward movement of the cursor, a left button 271-3 for leftward movement of the cursor, a right button 271-4 for rightward movement of the cursor, an OK button 272 for selection an item of a movement destination and decision, and a set button 273 for predetermined setting, and a return button 274 for return to a previous screen.

These buttons are operated when the application 72 is selected or the like.

The remote controller 251 is also provided with, in addition to the buttons shown in FIG. 8, for example, a button for selection of a program of television broadcasting or a button for selection of a volume, on which no reference numeral is put, on the upper side of the remote controller 251. That is, the remote controller 251 is separately provided with a button for an operation regarding television broadcasting, and a button for an operation regarding the application 72. Meanwhile, some of the buttons may be commonly used.

If a button for an operation regarding television broadcasting and a button for an operation regarding the application 72 are separately provided, as described below, when a program of television broadcasting and an image or text based on the application 72 are displayed on the same screen, the user can operate a desired operation target only by an operation of a button of the remote controller 251 in association with the operation target.

If a button for changing a channel up as a button for program selection and a button for upward movement of the cursor for application selection are commonly used, even if the user operates the button with intent to change the program channel up, the cursor may move upward. In order to suppress occurrence of such a situation, it is necessary to provide a switch button or the like and to operate the corresponding button.

As described above, however, if a button for an operation regarding television broadcasting and a button for an operation regarding the application 72 are separately provided, the user can perform a desired processing by using the remote controller 251 with no erroneous operation and no complex operation, such as an operation of a switch button.

[Processing Overview]

Figure 9:
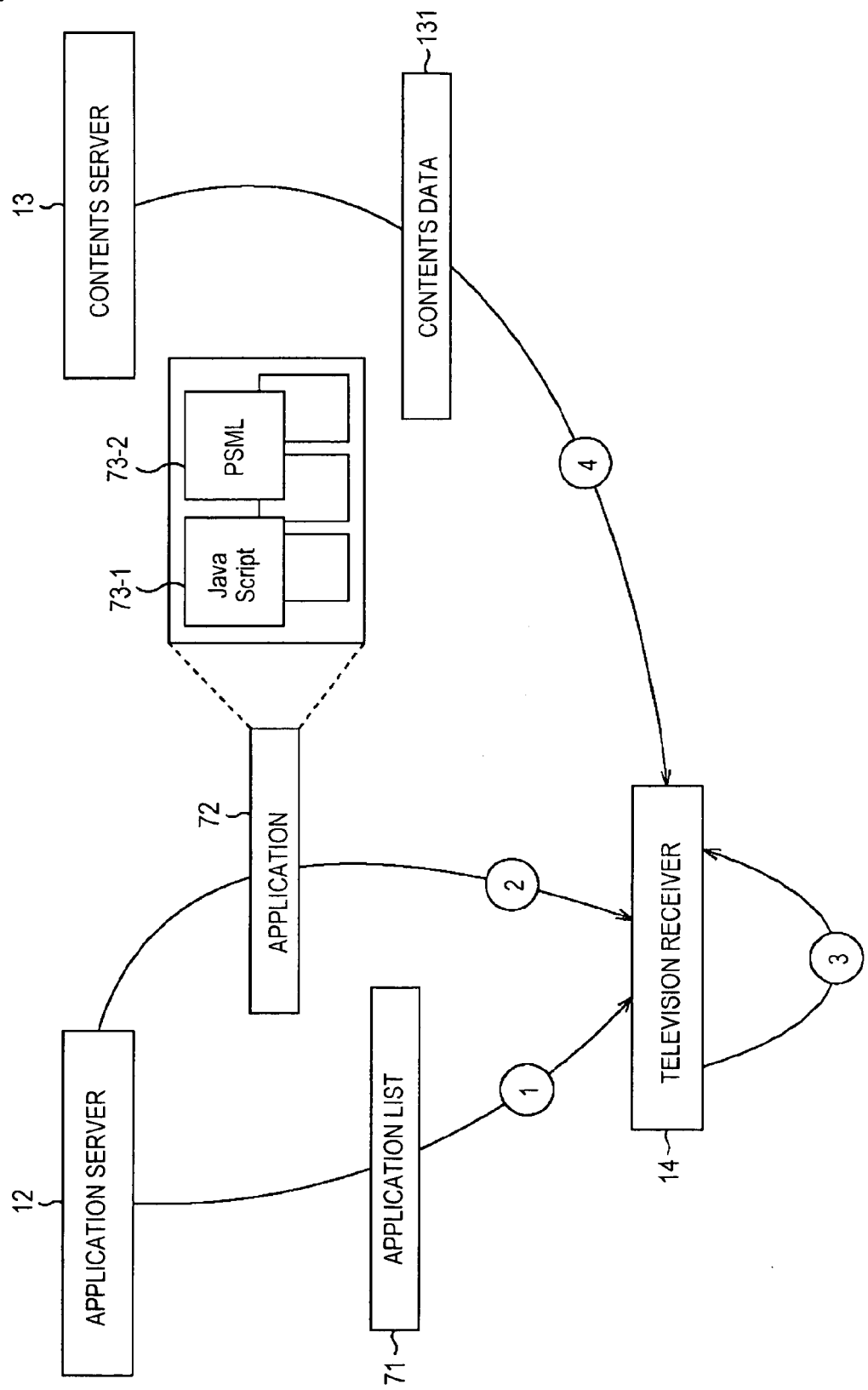
FIG. 9 is a diagram illustrating a data flow.

The overview of a processing that is executed in the system of FIG. 1 will be described with reference to FIG. 9. An application list 71 is supplied from the application server 12 to the television receiver 14. Thereafter, an application 72 is provided from the application server 12. The application 72 includes, for example, Java (Registered Trademark) Script 73-1, PSML (Page Structure and Macro description Language) 73-2, and the like.

After the application list 71 and the application 72 are received, when a user's instruction is made, the television receiver 14 carries out a processing on the basis of the received application 72. In any application 72 (by a script described in Java (Registered Trademark) Script 73-1 constituting the application 72), an access to the contents server 13 is executed to acquire contents data 131, and a processing on the basis of contents data 131 is carried out.

[Screen Switching]

Next, a screen that is displayed on the television receiver 14 having such a configuration will be described. In the following description, a screen on which an image based on the application 72 and the like are displayed is exemplified.

Figure 10:
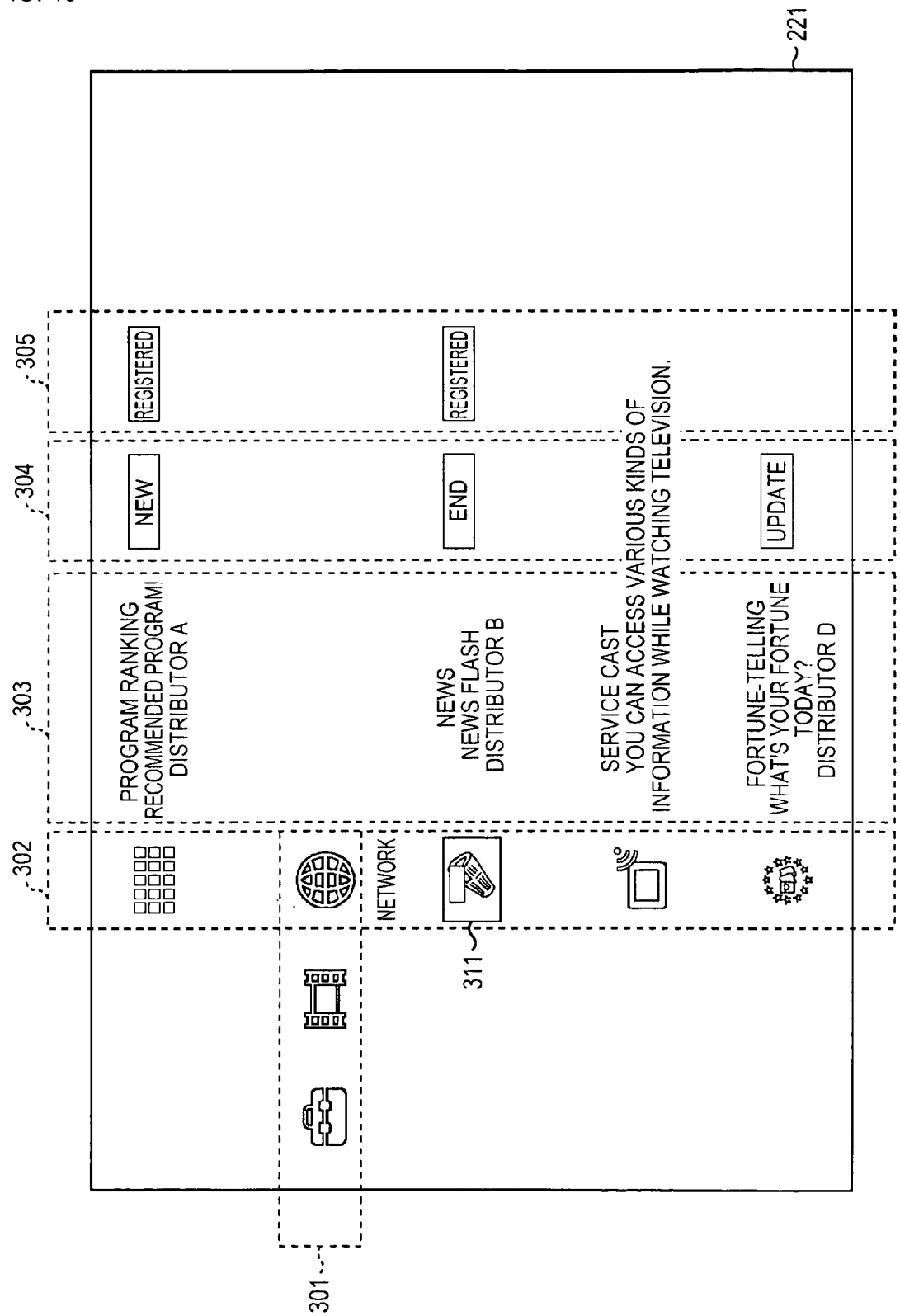
FIG. 10 is a diagram showing an example of a screen which is displayed on a display panel.

FIG. 10 shows an example of a screen which is displayed on the display panel 221 when the user wants to activate the application 72. In the following description, the screen shown in FIG. 10 is referred to as an initial screen. The user can select a desired processing on the initial screen. The desired processing is, for example, a processing to refer to a list of programs which are recorded in an HDD recorder (not shown) connected to the television receiver 14 and to select a program, a processing to refer to a program guide of digital terrestrial broadcasting and to watch a program, or the like. The initial screen is a menu screen for selection of processing or setting.

In the initial screen of FIG. 10, a dotted line is put for description, and is not displayed on the actual screen.

An icon display section 301 has a plurality of icons that are arranged in a horizontal direction and displayed, and each icon is an image that allows the user to intuitively recognize what kind of processing or what kind of setting is possible. For example, when a processing regarding an image (for example, a processing to display a list of programs recorded in the HDD recorder) is carried out, an icon that allows the user to recognize that processing for such an image is possible is displayed in the icon display section 301.

From among the icons that are displayed in the icon display section 301, one icon is focused. Text indicative of what the icon relates to is displayed below the focused icon. In the example of FIG. 10, since an icon regarding "NETWORK" is focused, text "NETWORK" is displayed below the icon. The focused icon is displayed a different color from other icons so as to be distinguished from other icons.

The icons that are displayed in the icon display section 301 slide in a left-right direction on the basis of a user's instruction. For example, when the user operates the left button 271-3 (FIG. 10) of the remote controller 251, the icons that are displayed in the icon display section 301 move leftward as a whole, and the focused icon move to a next icon.

Up and down of the focused icon, an icon display section 302 is provided, and icons indicative of options for processing or setting represented by the focused icon are displayed. In the example of FIG. 10, in a state where the icon "NETWORK" is focused, icons indicative of options for processing or setting regarding the network are arranged in a vertical direction and displayed in the icon display section 302.

Here, the options regarding the icon "NETWORK" are options for selection of the applications 72.

A cursor 311 is positioned on one icon of the icon display section 302. An example where the cursor 311 is positioned at an icon below the focused icon will continue to be described. In other words, the cursor 311 is fixed and constantly positioned below the focused icon. When the user instructs movement (slide) of the icons displayed in the icon display section 302, the icons slide in an up-down direction, and the movement of the icons is realized.

From among the icons displayed in the icon display section 302, the descriptions of icons, excluding the icon displayed in the icon display section 301 (in this case, excluding the icon NETWORK) are displayed in a description display section 303. For example, referring to FIG. 10, it can be seen that text "PROGRAM RANKING" is displayed at the top of the description display section 303, and a corresponding icon (application) is used to display the ranking of the program.

On the right side of the description display section 303, a state icon display section 304 is provided. In the state icon display section 304, when an application 72 is newly added, an icon "NEW" is displayed, when the application 72 is updated, an icon "UPDATE" is displayed, and when service provision by the application 72 ends, an icon "END" is displayed.

On the right side of the state icon display section 304, a registration state display section 305 is provided. When an icon displayed in the icon display section 302 is selected, the application 72 of the icon is activated, and information by the activated application 72 is provided to the user, together with a program of television broadcasting. Meanwhile, a predetermined number of applications 72 to be activated other than the application 72 selected at that time may be registered beforehand. That is, the user can register the favorite applications 72.

The layout of such an initial screen or information to be displayed is just an example, and it is not limited to the layout of the initial screen or information to be displayed shown in FIG. 10. The same is applied to screens that will be described below, and these screens are for illustrative but not limitative purposes and may be appropriately changed.

The initial screen shown in FIG. 10 is displayed when the user selects the icon "NETWORK", in other words, when the television receiver 14 is connected to the application server 12 and the application list 71 is acquired in a state where the icon "NETWORK" is focused. In this way, the timing at which the application list 71 is acquired is when an icon is focused, as described above. Meanwhile, when an icon is focused, the initial screen may not be instantaneously displayed depending on the communication speed of the network or the like. For this reason, for example, the application list 71 is preferably acquired and held at regular intervals.

In the application list 71, information in each display section of the icon display section 302, the description display section 303, and the state icon display section 304 is described. Information that is described in the registration state display section 305 is stored on the television receiver 14 side. When the application list 71 is acquired, it is determined which application 72 is to be registered, and an icon REGISTERED is displayed for the corresponding icon.

Figure 11:
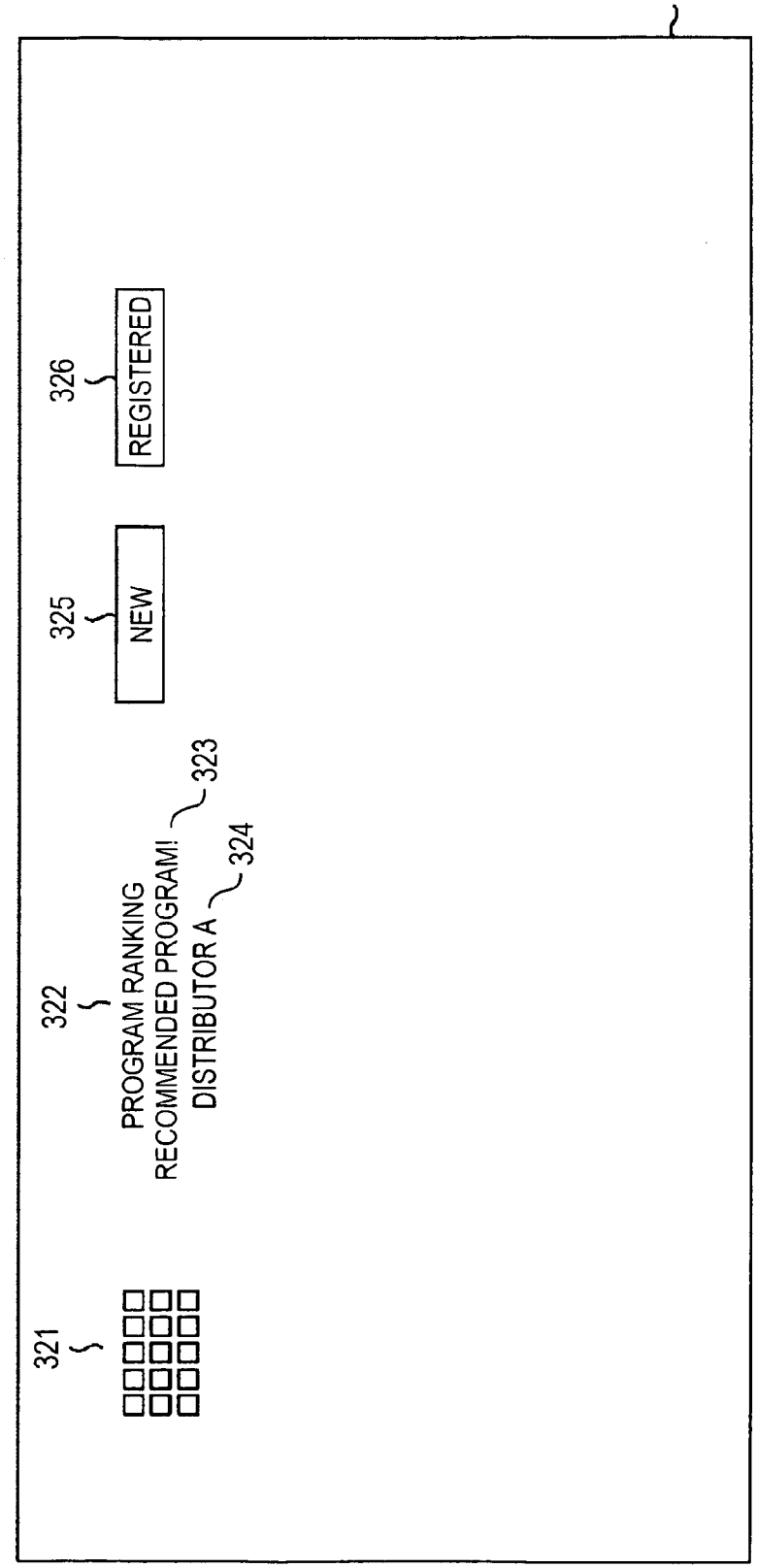
FIG. 11 is a diagram showing an example of a screen which is displayed on the display panel.

To cite an example of one icon that is displayed in the icon display section 302, a further description will be provided for information, which is displayed in each of the description display section 303, the state icon display section 304, and the registration state display section 305, with reference to FIG. 11.

An icon 321 that is displayed in the icon display section 302 is formed by an image that causes the contents of the application 72 to be imaged to the user. Icon data for display of the icon 321 is described in the application list 71. In addition, a URL where icon data is stored is described in the application list 71, and icon data is acquired through an access to the URL.

The description display section 303 includes a name display section 322 in which the name of the application 72 is displayed, a description display section 323 in which the description of the application 72 is displayed, and a provider display section 324 in which the provider of the application 72 is displayed.

For example, as shown in FIG. 11, the name of the application 72 corresponding to the icon 321 is "PROGRAM RANKING", and thus "PROGRAM RANKING" is displayed in the name display section 322. The application 72 corresponding to the icon 321 is a program of television broadcasting and has a function to provide information regarding rankings of audience ratings or to recommend a program, and thus the description "RECOMMENDED PROGRAM!" is displayed in the description display section 323. A distributor that distributes the application 72 corresponding to the icon 321 is "DISTRIBUTOR A", and thus "DISTRIBUTOR A" is displayed in the provider display section 324. The distributor A is the application provider 22.

A state icon 325 that is displayed when the state of the application 72 changes is displayed in the state icon display section 304. As described above, the state icon 325 includes the icon "NEW" that is displayed when the application 72 is newly added, the icon "UPDATE" that is displayed when the application 72 is updated, and the icon "END" that is displayed when service provision by the application 72 ends. No state icon 325 is displayed in the state icon display section 304 corresponding to the application 72 with no change in the state.

In the case of an application 72 that is registered, a REGISTERED icon 326 is displayed in the registration state display section 305. The user may register the favorite applications 72. With this registration, as described below, when a predetermined application 72 is selected, the registered applications 72 may be displayed, together with the selected application 72. Though the details are described below, referring to the initial screen shown in FIG. 10 again, if an icon "SERVICE CAST" is selected, the registered application 72 is displayed.

The registered applications 72 are activated at the same time, and the applications 72 individually carry out processing. Meanwhile, if the processing by a plurality of applications 72, mainly, the processing to access the contents server 13 through the network 11 and to acquire and display contents data 131 is carried out at the same time, a burden may be imposed on the television receiver 14 depending on the number of processing. In particular, since there is a limit in the capacity of the SDRAM 230 (FIG. 6), which temporarily stores contents data 131, or the like is limited, contents data 131 by a plurality of applications 72 cannot be stored unlimitedly.

Accordingly, the number of applications 72 that can be registered is preferably limited. For example, the number of applications 72 that can be registered may be limited to 5, and when the user wants to register a sixth application 72, an error message or the like may be displayed. In addition, for example, when the number of applications 72 that can be registered is limited to 5, five REGISTERED icons 326 are displayed in the registration state display section 305 to the maximum.

Registration/unregistration is different for every television receiver 14. For this reason, information regarding the registered application 72, for example, the ID for identifying the registered application 72 or the like is stored on the television receiver 14 side. When the television receiver 14 acquires the application list 71, an application 72 being registered is determined with reference to the stored information and information described in the application list 71, and the REGISTERED icon 326 is displayed in the registration state display section 305.

Figure 12:
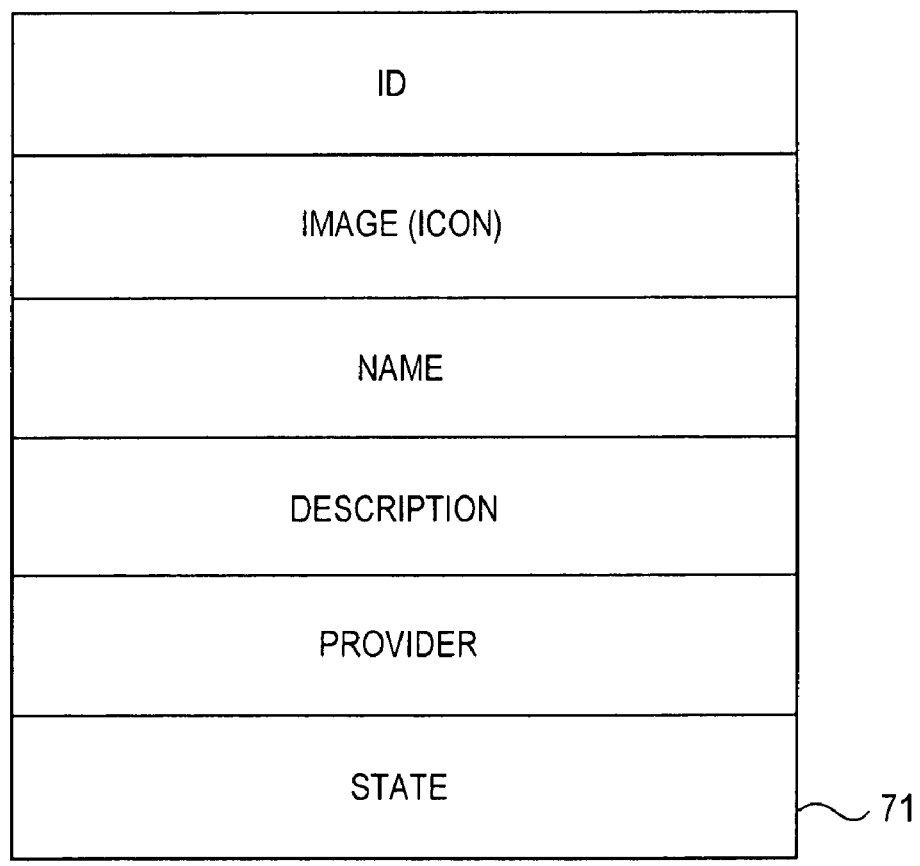
FIG. 12 is a diagram illustrating an application list.

From among the information described with reference to FIG. 11, the information that is displayed in each of the display sections other than the registration state display section 305 is described in the application list 71. FIG. 12 is an example of information that is described in the application list 71 and an example of information for one application 72.

In the application list 71, for every application 72, information (data) regarding "ID" for identifying the application 72, "IMAGE" of the icon displayed in the icon display section 302, "NAME" of the application 72, "DESCRIPTION" regarding a service, which is provided by the application 72, "PROVIDER" that provides the application 72, and "STATE" of the application 72 are described.

"ID" for identifying the application 72 may be the above-described URL where the application 72 is managed. In addition, when the television receiver 14 determines whether or not an application 72 is registered, the ID that is managed on the television receiver 14 side is the ID that is described in the application list 71.

"IMAGE" of the icon displayed in the icon display section 302 may be image data of the icon or may be the above-described URL where image data of the icon is managed. In the case of the URL, image data of the icon is acquired through acquisition of the application list 71 and connection to the URL described in the application list 71.

With the management of the application list 71 on the application server 12 side, the following advantages can be obtained. First, when an application 72 is newly registered in the application list 71, the administrator (in FIG. 2, the service provider 21) who manages the application server 12 can examine the application 72. With the examination by the administrator, for example, an ill-intended application 72 including a virus can be prevented from being registered. Therefore, the security of the application 72 that is provided to the user 24 side (the television receiver 14 side) can be increased.

The application list 71 is supplied to the television receiver 14, and the television receiver 14 presents only the applications 72, which are registered in the supplied application list 71, to the user side. For this reason, if the application list 71 is updated, a processing based on the updated application list 71 can be carried out on the television receiver 14 side. For example, if there is a newly registered application 72, the newly registered application 72 can be provided to the user side, without bothering the user on the television receiver 14 side (for example, without carrying out the update).

That is, the applications 72 that are provided to the user side can be freely set on the administrator side, and a problematic application 72 can be deleted from the application list 71. For this reason, the applications 72 can be provided to the user side through the accurate management of the administrator. In other words, the application provider 22 can be freely set on the service provider 21, and accordingly a contract with a problematic application provider 22 can be released, and information regarding the application 72 that is provided by the corresponding application provider 22 can be deleted from the application list 71. For this reason, the applications 72 can be provided to the user 24 side through the accurate management of the service provider 21.

The television receiver 14 accesses the application server 12, and holds the URL for acquisition of the application list 71.

We now return to the description for the initial screen shown in FIG. 10. When the initial screen shown in FIG. 10 is displayed on the display panel 221, if the user operates the down button 271-2 (FIG. 10) of the remote controller 251, the screen is switched to a screen shown in FIG. 13.

Figure 13:
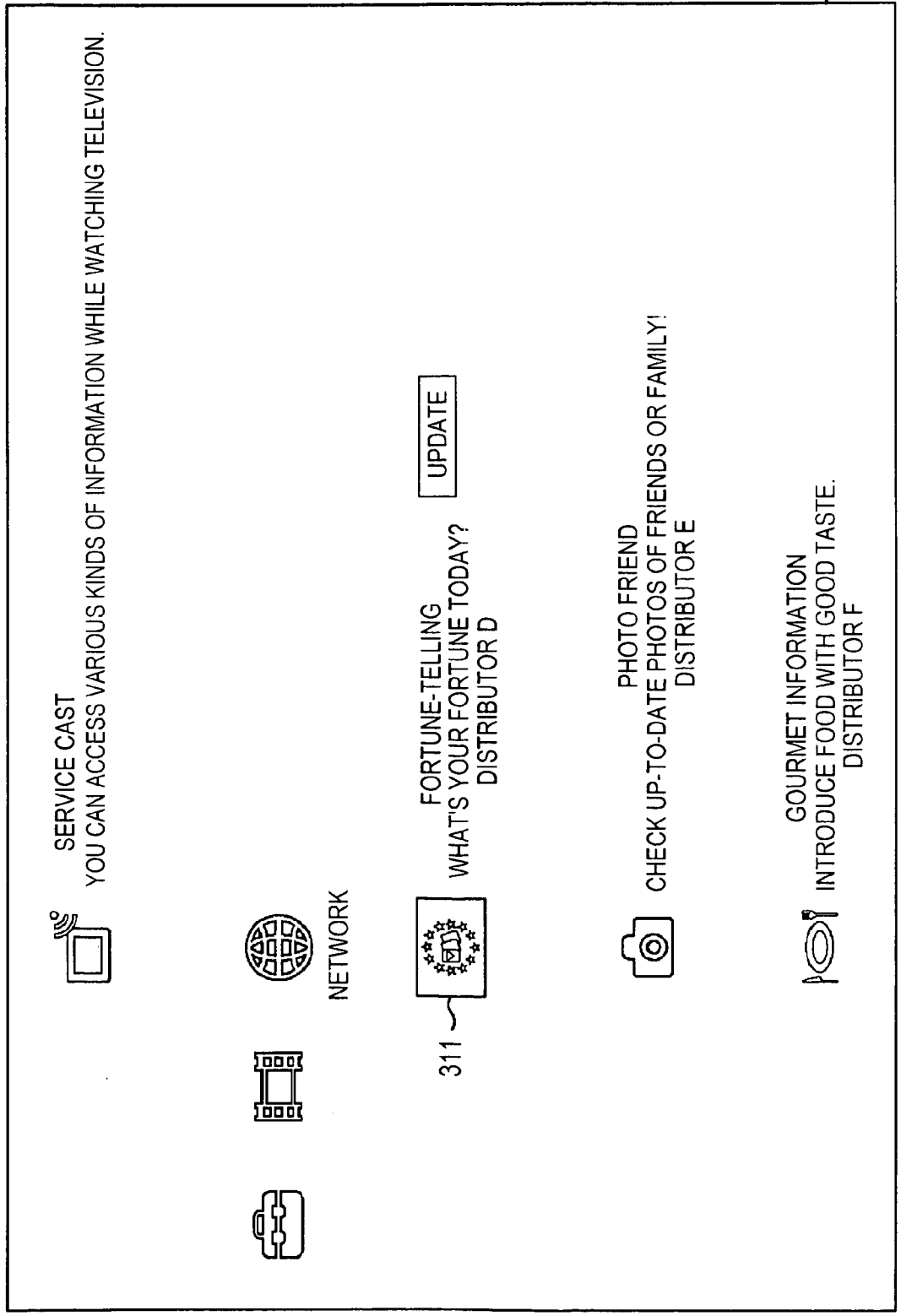
FIG. 13 is a diagram showing an example of a screen which is displayed on the display panel.

In comparison of the screen example shown in FIG. 13 with the screen example shown in FIG. 10, while in the case of the screen (initial screen) shown in FIG. 10, the cursor 311 is positioned on an icon representing an application 72 named "NEWS", in the case of the screen shown in FIG. 13, the cursor 311 is positioned on an icon of an application 72 named "FORTUNE-TELLING".

Referring to FIG. 10, the icon of the application 72 named "FORTUNE-TELLING" is positioned below the icon of the application 72 named "NEWS" by two icons. When the user operates the down button 271-2 of the remote controller 251 two times, or when the user continues to operate the down button 271-2 of the remote controller 251 until the cursor 311 moves by two icons, the cursor 311 moves downward to the icon positioned below by two icons.

In this case, since the position of the cursor 311 is fixed, actually, the icons that are displayed in the icon display section 302 move upward by two icons. In this way, a processing corresponding to the two times operation of the down button 271-2 of the remote controller 251 is carried out.

Figure 14:
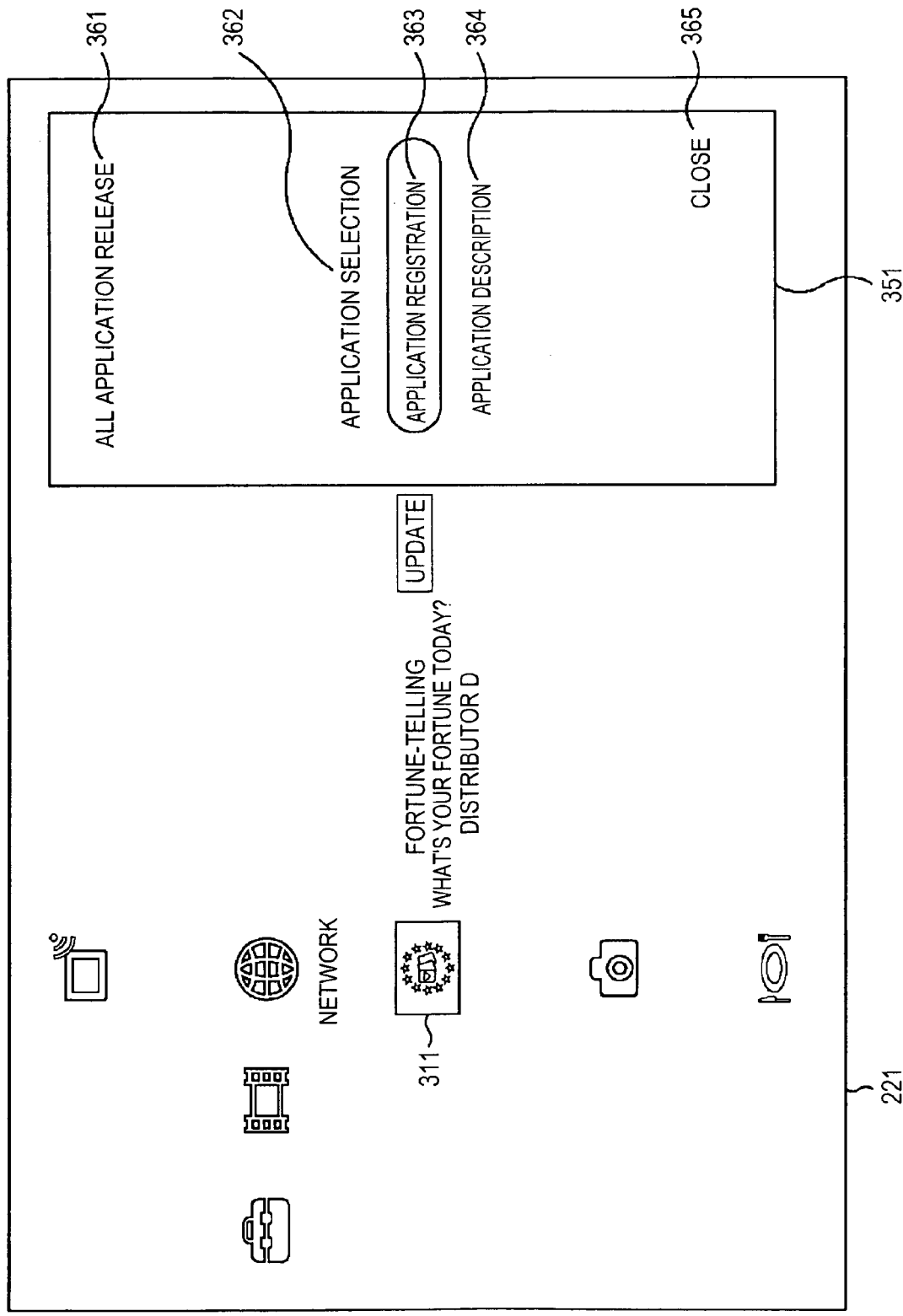
FIG. 14 is a diagram showing an example of a screen which is displayed on the display panel.

As shown in FIG. 13, in a state where the cursor 311 is positioned on the icon of the application 72 named "FORTUNE-TELLING", if the set button 273 of the remote controller 251 is operated, the screen becomes a screen shown in FIG. 14.

A description will be provided for the screen shown in FIG. 14. In the screen shown in FIG. 14, a setup screen 351 is displayed so as to be superimposed on the screen shown in FIG. 13. In the setup screen 351, as selection items, an item 361, "ALL APPLICATION RELEASE", which is operated to release all the applications 72 being registered, and item 362, "APPLICATION SELECTION", which is operated to activate an application 72 being selected, an item 363, "APPLICATION REGISTRATION", which is operated to register an application 72 being selected, an item 364, "APPLICATION DESCRIPTION", which is operated to view the description of the application 72 regarding which processing an application 72 being selected carries out, and an item 365, "CLOSE", which is operated to close the selection screen 351, are displayed.

The "application 72 being selected" is application 72 corresponding to an icon on which the cursor 311 is positioned, and in the screen example shown in FIG. 14, is the application 72 named "FORTUNE-TELLING".

Referring to the screen example of FIG. 13 again, since the application 72 named "FORTUNE-TELLING" is not registered, the icon representing registration is not displayed in the registration state display section 305. When such an application 72 is selected, if the item 363 (FIG. 14), "APPLICATION REGISTRATION", is selected, the corresponding application 72 is registered.

If an application 72 is registered, an icon indicative of registration is displayed in the registration state display section 305 when the initial screen is next displayed. In addition, if an application 72 is registered, the ID of the application 72 is stored in the television receiver 14. At the time of registration, when a predetermined number of applications 72 are already registered, registration is not carried out, and an error message or the like is displayed.

When registration is carried out, though not shown, a screen for confirmation of the user on whether or not to execute registration may be displayed.

Figure 15:
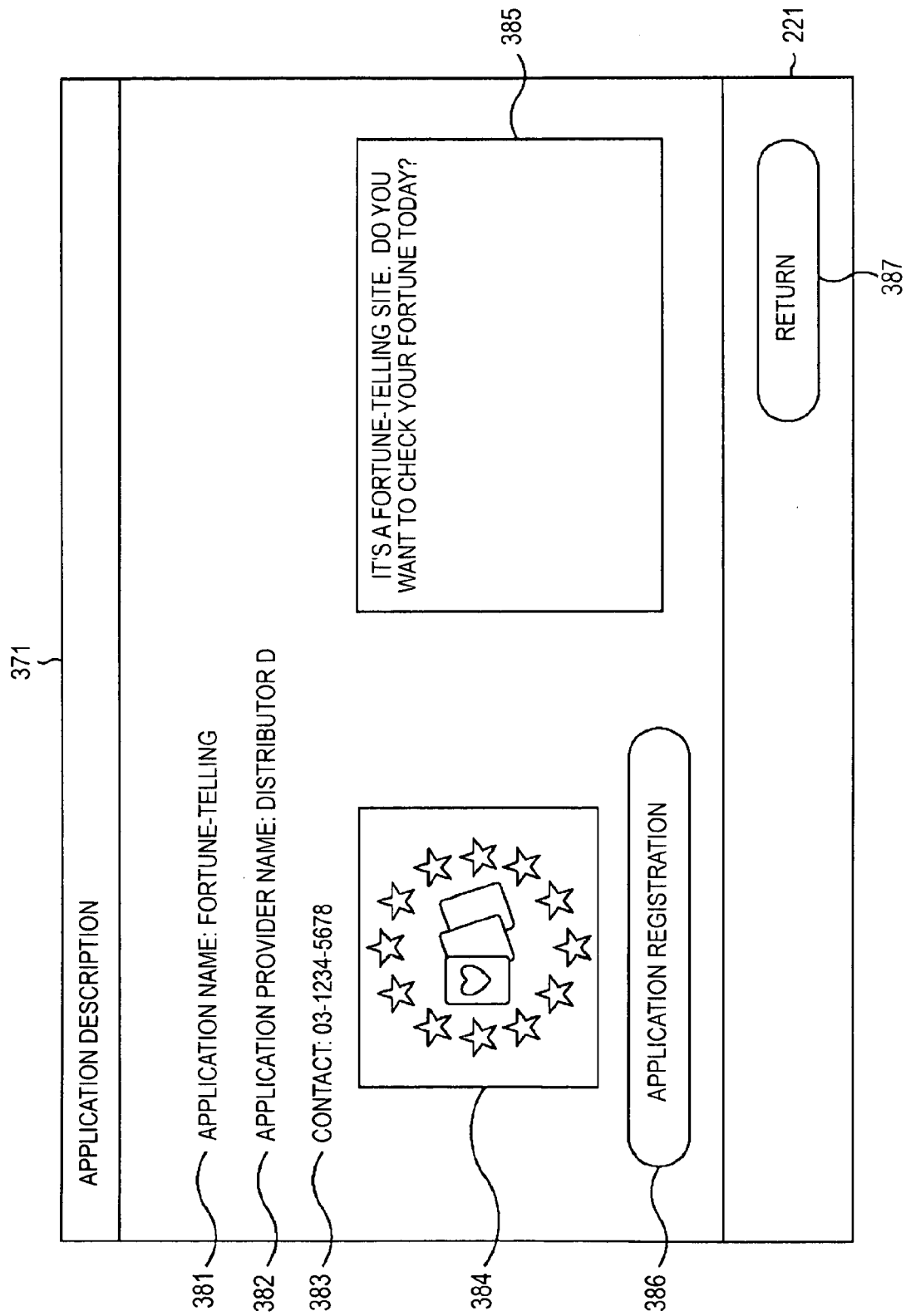
FIG. 15 is a diagram showing an example of a screen which is displayed on the display panel.

Returning to the description for the screen example of FIG. 14, if the item 364, "APPLICATION DESCRIPTION", is selected, the screen of the display panel 221 is switched to an application description screen 371, as shown in FIG. 15. The application description screen 371 is provided with a region 381 where the name of the application 72 is displayed, a region 382 where the name of the provider of the application 72 is displayed, and a region 383 where a telephone number for inquiry of the application 72 is displayed.

The application description screen 371 is also provided with a region 384 where an image that causes a service, which is provided to the user through processing by an application 72, to be imaged to the user, for example, an enlarged image of an icon displayed in the icon display section 302 is displayed, and a region 385 where text that describes the contents of a service, which is provided to the user through processing by an application 72, is displayed.

The application description screen 371 is also provided with a button 386 that is operated to activate a Web browser and display a contact or support information of an application 72, and a button 387 that is operated to return to the screen shown in FIG. 14, that is, the screen on which the setup screen 351 is displayed.

The user can view such an application description screen 371 to recognize the contents of the service, which is provided by the application 72.

Next, a description will be provided for a screen when the application 72 is activated from the screen shown in FIG. 13 or the screen shown in FIG. 14. The screen shown in FIG. 13 is displayed when the cursor 311 is positioned on the icon indicative of the application 72 named "FORTUNE-TELLING". In a state where the cursor 311 is positioned on the icon indicative of a predetermined application 72, if the OK button 272 (FIG. 10) of the remote controller 251 is operated, the screen of the display panel 221 is switched to a screen shown in FIG. 16.

Figure 16:
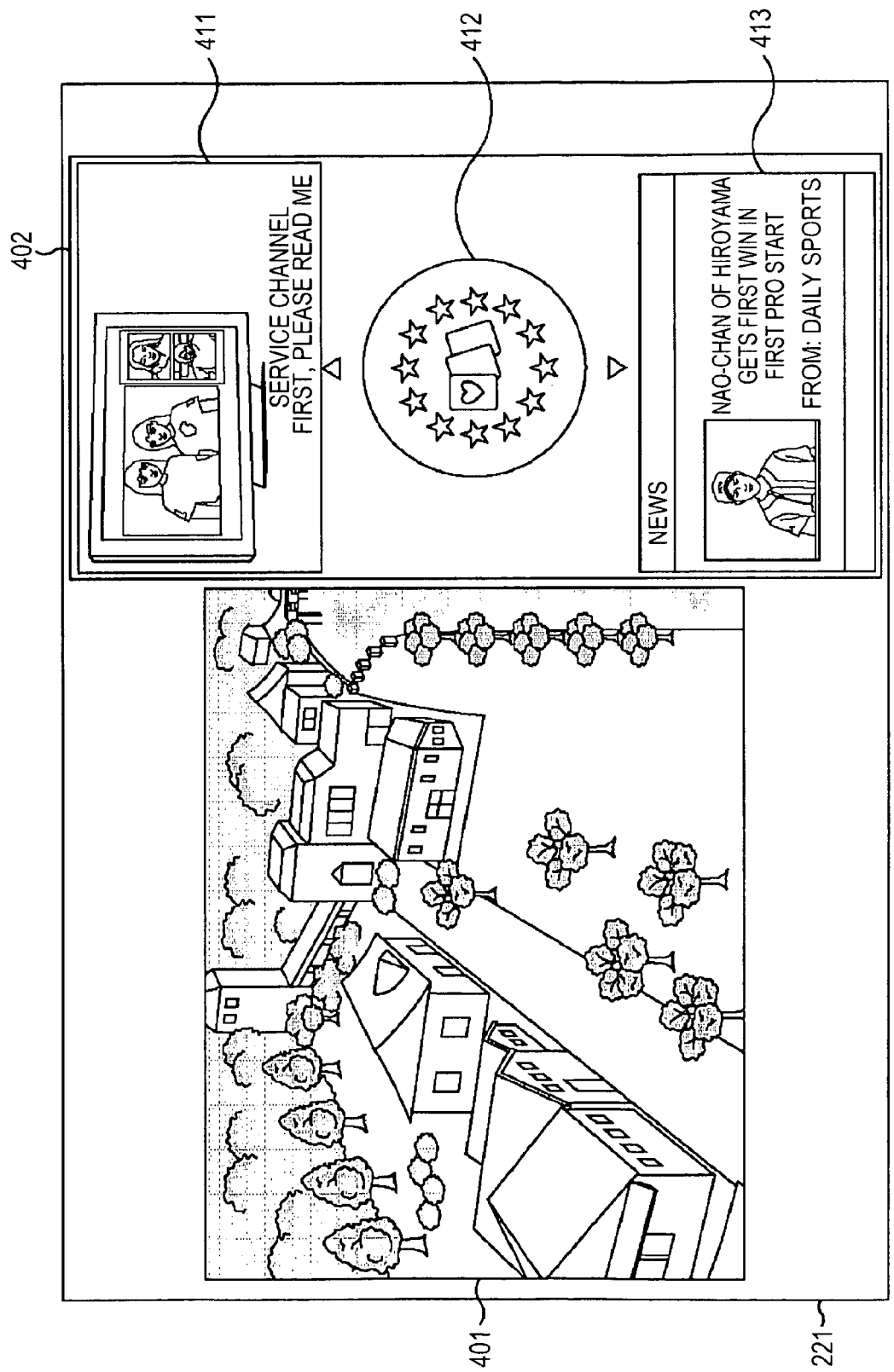
FIG. 16 is a diagram showing an example of a screen which is displayed on the display panel.

As shown in FIG. 14, in a state where the cursor 311 is positioned on the icon indicative of the application 72, "FORTUNE-TELLING", and the setup screen 351 is displayed, if the item 362, "APPLICATION SELECTION", is operated, the screen of the display panel 221 is switched to a screen shown in FIG. 16.

If the application 72 is activated, data of the main body of the application 72 is acquired from the application server 12. In this case, when an instruction to activate the application 72 is made, an access to the application server 12 is executed, and data (program and the like) of the main body of the application 72 is acquired. At the time of acquisition, data of the application 72 that is instructed to be activated is acquired on the basis of the ID of the application 72 described in the application list 71.

A description will be provided for the screen shown in FIG. 16. Of the screen shown in FIG. 16, the left side becomes a program display region 401 where a program of television broadcasting is displayed, and the right side becomes an application display region 402 where services of a plurality of application 72 are displayed. In this way, the program of television broadcasting and information, which is provided by the application 72 are provided to the user at the same time. The user can view desired information that is provided by the application 72, while enjoying the program of television broadcasting.

In the screen example shown in FIG. 16, information that is provided by three applications 72 is displayed in the application display region 402. Of the application display region 402, in the upper region 411, information is displayed by an application 72 called SERVICE CHANNEL (hereinafter, the application 72 named "SERVICE CHANNEL" is described to correspond to an application 72-1). In the middle region 412, information is displayed by an application 72 called FORTUNE-TELLING (hereinafter, the application 72 named "FORTUNE-TELLING" is described to correspond to an application 72-2). In the lower region 413, information is displayed by an application 72 called NEWS (hereinafter, the application 72 named "NEWS" is displayed to correspond to an application 72-3).

The applications 72 that display information in the application display region 402 include the application 72 being registered and the selected application 72. As described above, it is configured such that the user can register a predetermined number of applications 72 in advance. Even if an application 72 being not registered is selected, the applications 72 that are registered by the user are displayed in the application display region 402, together with the application 72 being not registered.

For example, referring to FIG. 13, in the screen shown in FIG. 16, the application 72-2 called FORTUNE-TELLING is the application 72 being not registered. Even if the application 72-2 being not registered is selected, the applications 72-1 and 72-3 being registered are displayed in the application display region 402, together with the application 72-2.

The applications 72 displayed in the application display region 402 separately operate. For example, the application 72-3 that provides a service for news display is connected to the contents server 13 to acquire contents data 131 of news and to update news (text) displayed in the region 413 at the timing at which the application 72-3 is set.

Though not displayed, the applications 72 being registered are operating, as well as the applications 72-1 to 72-3 that are displayed in the application display region 402. For example, when five applications 72 are registered, six applications 72 including the five applications 72 and the selected unregistered application 72 execute processing, regardless of whether or not they are displayed in the application display region 402. The application 72-3 is connected to the contents server 13 to acquire news, regardless of whether or not it is displayed in the application display region 402.

In this way, the information by the applications 72 displayed in the application display region 402 is updated, regardless of whether or not a user's instruction is made, insofar as each of the applications 72 is an application 72 that can appropriately update information. Therefore, the user can acquire new information without feeling bothersome.

As described above, when one application 72 is instructed to be activated, the application 72, which is instructed to be activated, and the applications 72 being registered are activated at the same time. Here, simultaneous activation means that an access to the application server 12 is executed to acquire the data main body of the application 72, a processing is carried out on the basis of the acquired application 72, and during this processing, if necessary, a connection to the contents server 13 is made to acquire contents data 131.

As described above, in this embodiment, when the application 72 is instructed to be activated, data regarding the application 72 is acquired. Therefore, data regarding the application 72 does not need to be resident on the television receiver 14, and thus the memory space of the SDRAM 230 (FIG. 7) to be allocated to data regarding the application 72 can be reduced.

Figure 17:
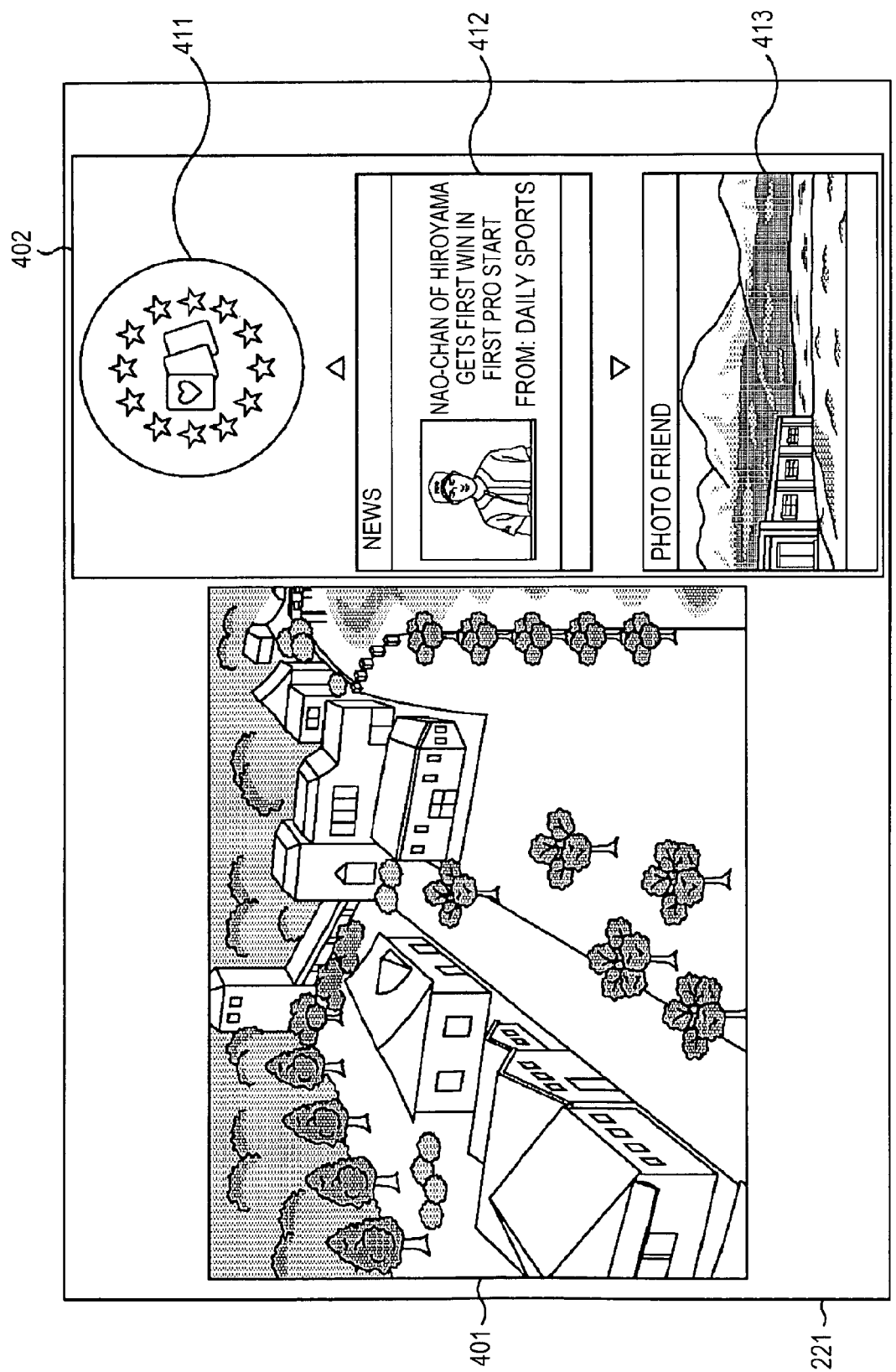
FIG. 17 is a diagram showing an example of a screen which is displayed on the display panel.

Referring to FIG. 16 again, if the up button 271-1 of the remote controller 251 is operated, the applications 72-1 to 72-3 displayed in the application display region 402 move upward, and an application 72-4 that is an application 72, which is not displayed in the application display region 402, and virtually disposed below the application 72-3 is displayed. As a result, as shown in FIG. 17, a screen is displayed in which information by the application 72-2 is displayed in the region 411, information by the application 72-3 is displayed in the region 412, and information by the application 72-4 is displayed in the region 413. In the following description, a case where the application 72-4 is an application 72 corresponding to the name "PHOTO FRIEND" will continue to be described.

Figure 18:
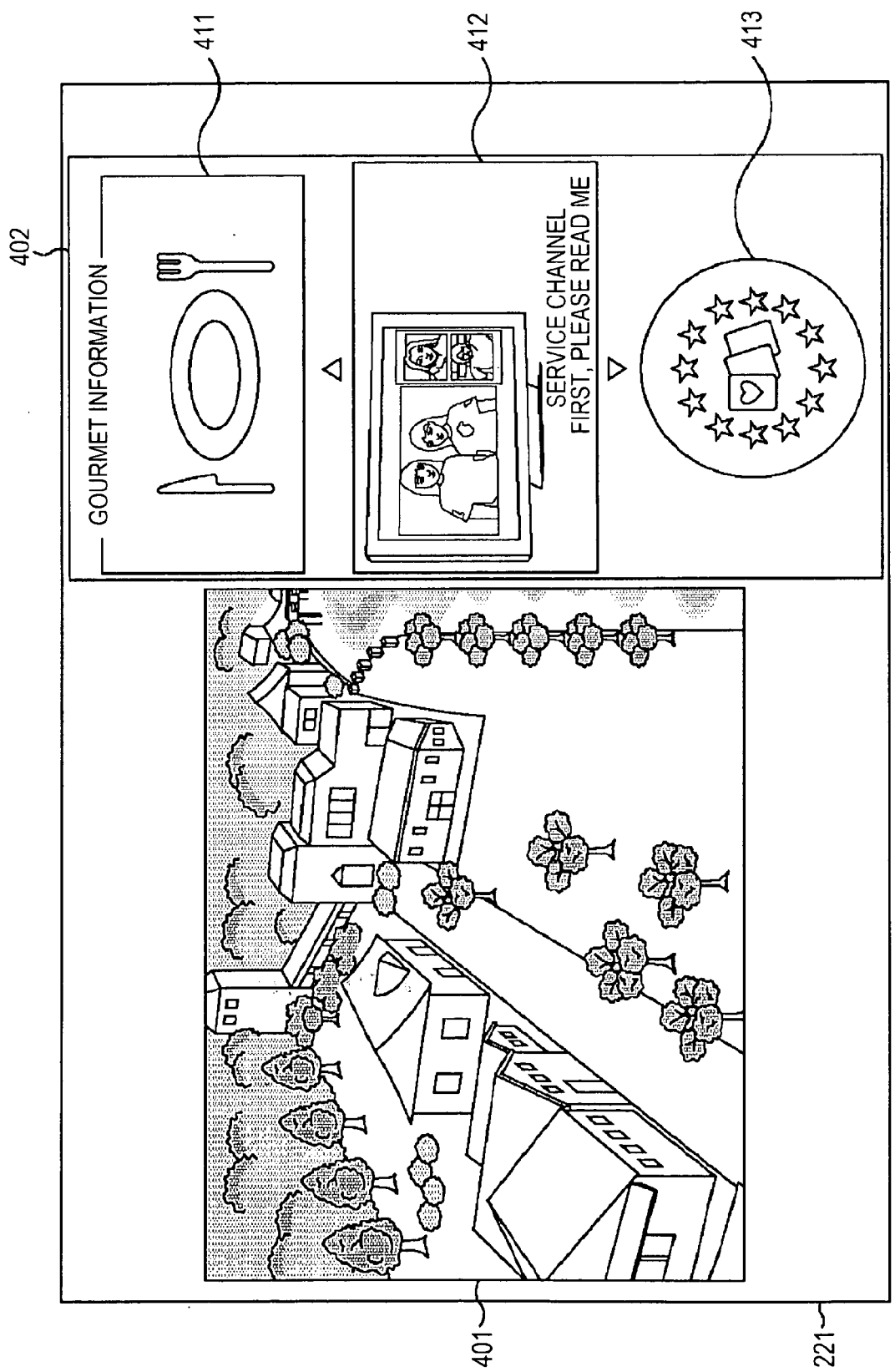
FIG. 18 is a diagram showing an example of a screen which is displayed on the display panel.

When the down button 271-2 of the remote controller 251 is operated, the applications 72-1 to 72-3 move downward, and an application 72-5 that is an application 72, which is not displayed in the application display region 402, and virtually disposed above the application 72-1 is displayed. As a result, as shown in FIG. 18, a screen is displayed in which information by the application 72-5 is displayed in the region 411, information by the application 72-1 is displayed in the region 412, and information by the application 72-2 is displayed in the region 413. In the following description, a case where the application 72-5 is an application 72 corresponding to the name "GOURMET INFORMATION" will continue to be described.

As described above, the applications 72 that are operating in parallel are virtually arranged in the vertical direction, the applications 72 displayed in the application display region 402 are switched in accordance with the operation state of the up button 271-1 or the down button 271-2 of the remote controller 251.

The screens shown in FIGS. 16 to 18 are referred to as a normal mode. In the normal mode, if the OK button 272 of the remote controller 251 is operated, the mode is switched to a focus mode in which an application 72 positioned in the middle at that time (an application 72 which is displaying information in the region 412) is focused.

For example, in the screen shown in FIG. 16, the application 72 that is displaying information in the region 412 of the application display region 402 is the application 72-2 named "FORTUNE-TELLING". In this state, if the OK button 272 of the remote controller 251 is operated, the screen is switched to the screen of the focus mode, in which the application 72-2 is focused.

Figure 19:
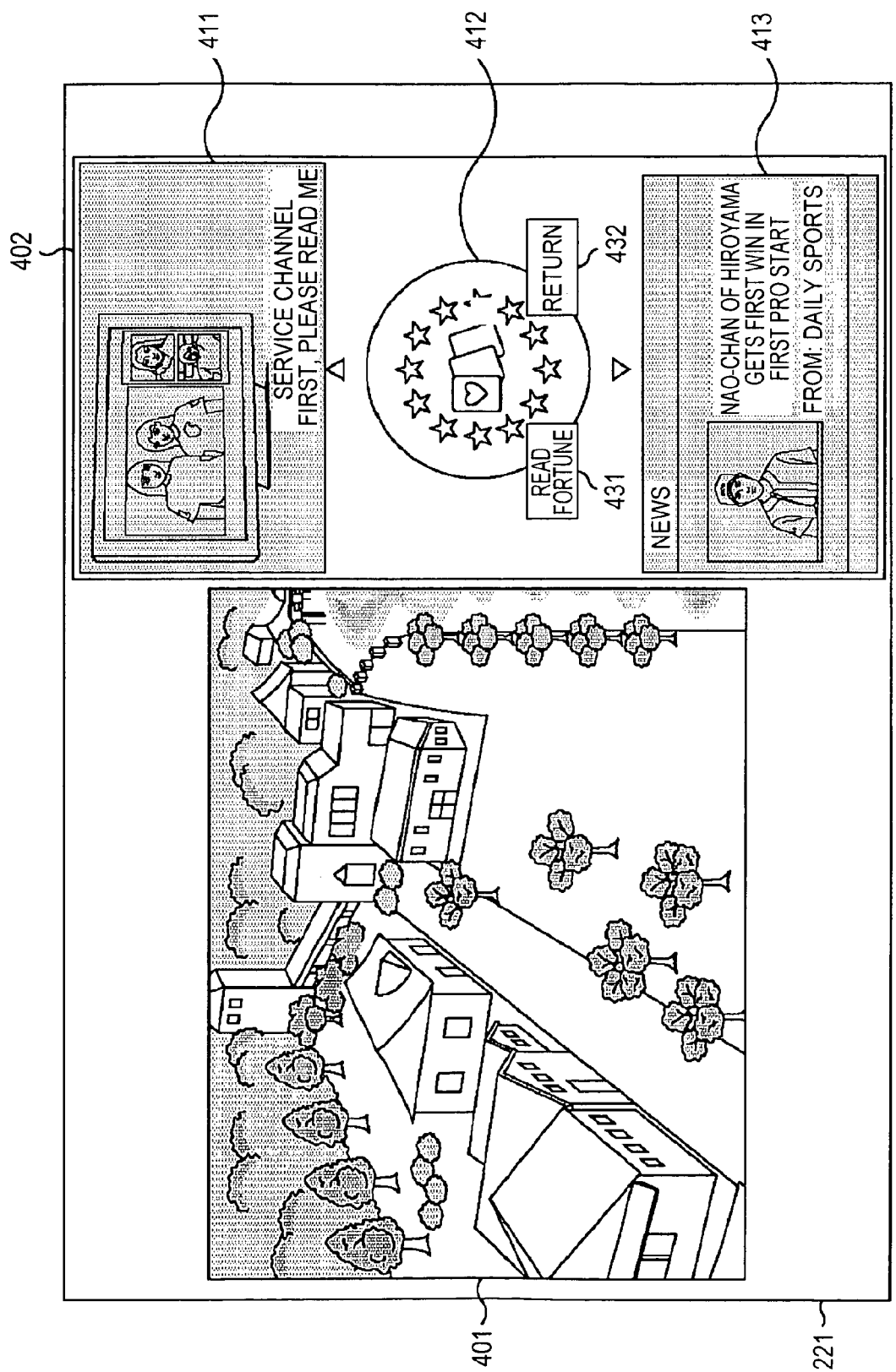
FIG. 19 is a diagram showing an example of a screen which is displayed on the display panel.

FIG. 19 shows an example of a screen in the focus mode. In the focus mode, the regions 411 and 413 of the application display region 402 are displayed dark. In other words, only the region 412 in the middle of the application display region 402 is displayed brighter than other regions. In the focus mode, the applications 72 being registered and the selected application 72 are operating in parallel, regardless of whether or not the applications 72 are displayed in the application display region 402.

In the focus mode, similarly to the normal mode, if the up button 271-1 or the down button 271-2 of the remote controller 251 is operated, the applications 72 displayed in the application display region 402 slide upward or downward and are displayed. With this slide, the application 72 displayed in the region 412 is switched, and thus the focused application 72 is also switched. Therefore, in the focus mode, the user can bring a desire application 72 into focus.

When the mode is switched to the focus mode, buttons and the like based on the application 72 being focused are displayed. For example, referring to FIG. 19, when the application 72 displayed in the region 412 is the application 72-2, "FORTUNE-TELLING", a button 431, "READ FORTUNE", is displayed in the focus mode. A button 432 called RETURN that is operated to return to the normal mode is also displayed.

The user operates the left button 271-3 or the right button 271-4 of the remote controller 251 to select the button 431 or the button 432. After the button 431 or the button 432 is selected, if the OK button 272 is operated, a processing corresponding to the selected button is executed. When the button 431 called "READ FORTUNE" is selected and decided, the mode is switched to an active mode, and when the button 432 called "RETURN" is selected and decided, the mode is switched to the normal mode.

Figure 20:
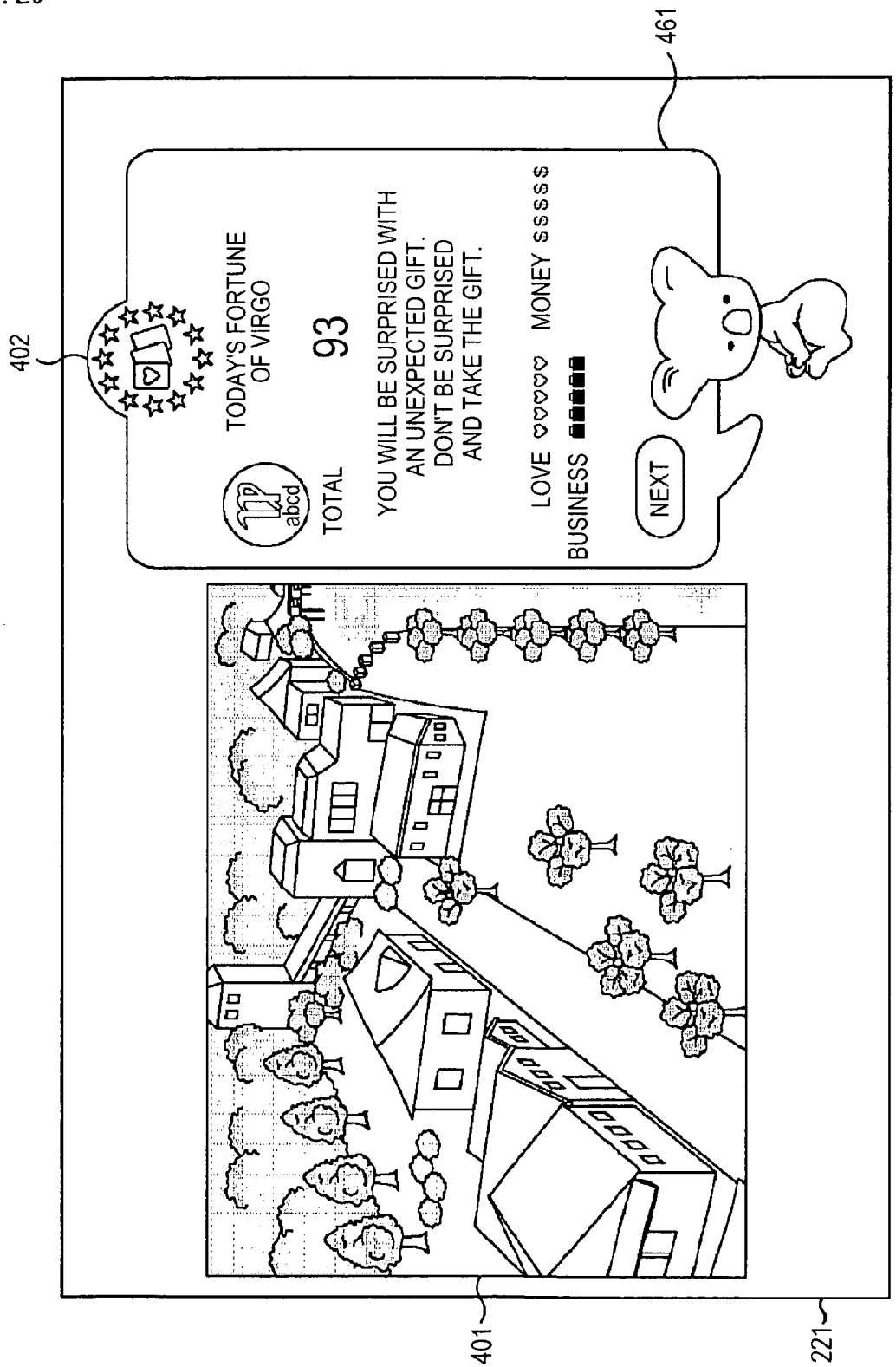
FIG. 20 is a diagram showing an example of a screen which is displayed on the display panel.

The active mode is a mode in which only information provided by one application 72 is displayed. FIG. 20 shows an example of a screen which is displayed on the display panel 221 in the active mode. In the application display region 402, an active screen 461 in which only information by one application 72, in this case, the application 72-2 named "FORTUNE-TELLING" is displayed is displayed.

In the active mode, information by one application 72 is displayed, and in this state, the operations of other applications 72 stop. As described above, while in the normal mode or the focus mode, the applications 72 being registered and the selected application 72 operate in parallel, regardless of whether or not they are displayed, in the active mode, only the applications 72 being displayed operate.

In the active mode, the activated application 72 accesses the contents server 13 to acquire contents data 131. A processing based on acquired contents data 131 is executed, and thus the active screen 461 is displayed.

For example, as shown in FIG. 20, information that is provided by the application 72-2 called "FORTUNE-TELLING" is displayed, in the active screen 461, text indicative of the contents of fortune-telling or the like is displayed. The contents of fortune-telling shown in FIG. 20 is information that is provided for every zodiac sign, and when the user wants to view fortune-telling information of zodiac signs other than the zodiac sign being displayed (in FIG. 20, Virgo), he/she operates a button "NEXT" that is provided below the active screen 461. The user operates the button "NEXT" to view desired fortune-telling information.

Meanwhile, it is considered that, when fortune-telling information is provided by zodiac sign, the user wants to view fortune-telling information of his/her zodiac sign with no operation of the button "NEXT". Therefore, it is configured that the zodiac sign of the user is registered, and information of the registered zodiac sign is first displayed when the mode is switched to the active mode.

Figure 21:
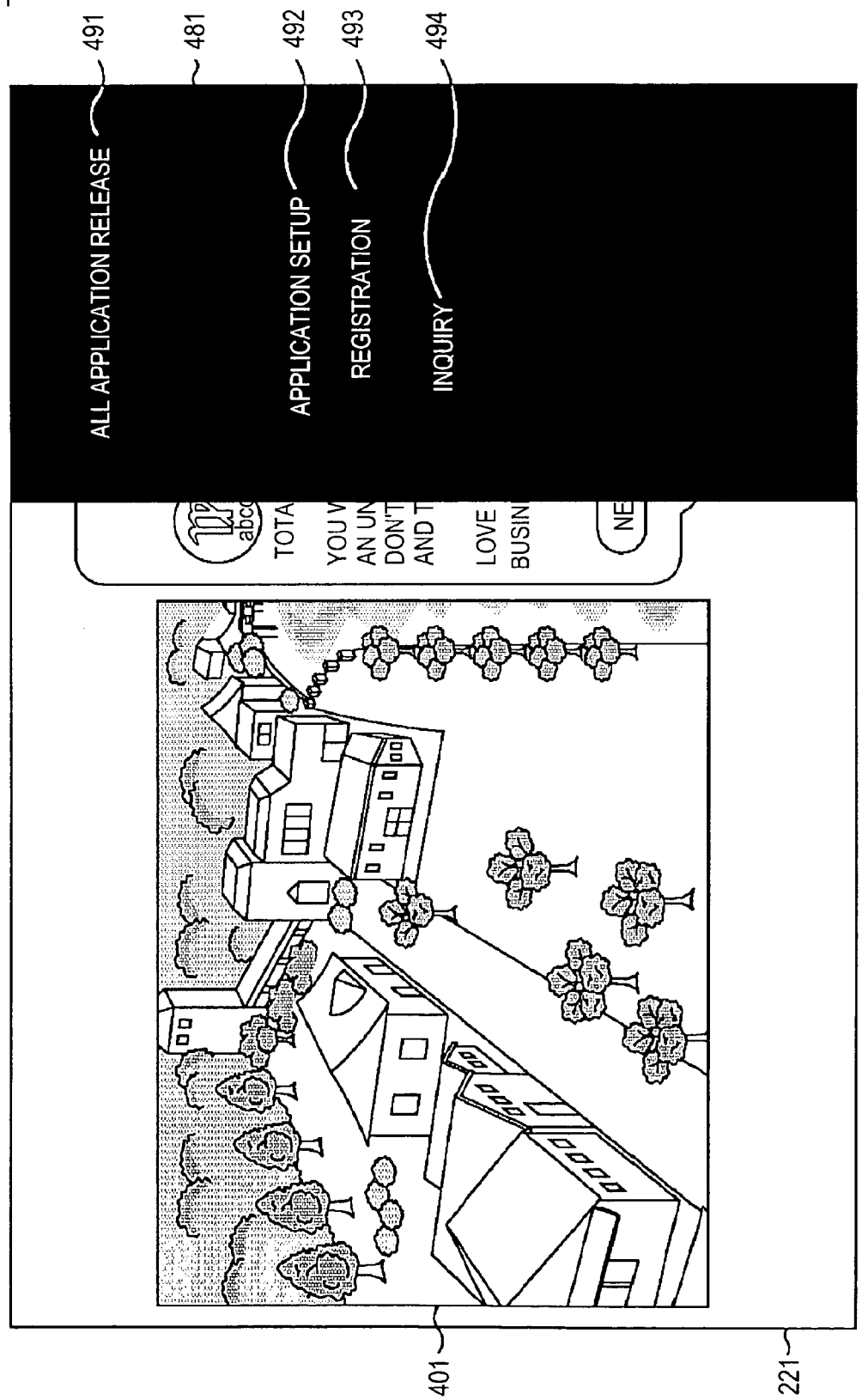
FIG. 21 is a diagram showing an example of a screen which is displayed on the display panel.

For example, in the screen of the active mode shown in FIG. 20, if the user operates the set button 273 of the remote controller 251, an option menu screen for setup (registration)

of a zodiac sign or the like is displayed. FIG. 21 shows an example of an option menu screen corresponding to the application 72-2 called "FORTUNE-TELLING". In the screen of the normal mode (for example, FIG. 16) or in the screen of the focus mode (for example, FIG. 19), even if the set button 273 of the remote controller 251 is operated, the option menu screen 481 is superimposed on the screen at that time and displayed in the same manner as the active mode.

Referring to FIG. 21, in the option menu screen 481, a button 491 called "ALL APPLICATION RELEASE", a button 492 called "APPLICATION SETUP", a button 493 called "REGISTRATION", and a button 494 called "INQUIRY" are displayed. Of these, with respect to the button 493 called "REGISTRATION", when an application 72 being not registered yet is subject to processing, the option menu screen 481 is displayed, and when an application 72 being already registered is subject to processing, a button 493 called "REGISTRATION RELEASE" is displayed.

The button 491 called "ALL APPLICATION RELEASE" is a button that is operated to release registration of all the applications 72 being registered. The button 492 called "APPLICATION SETUP" is a button that is operated to set information depending on the application 72, for example, in the case of the application 72 regarding fortune-telling by zodiac sign, information of the zodiac signs or the like.

The button 493 called "REGISTRATION" is a button that is displayed when the application 72 being not registered yet is subject to processing, and is operated to register the application 72 subject to processing. When the application 72 being already registered is subject to processing, the button 493 "REGISTRATION RELEASE" is displayed. The button 493 called "REGISTRATION RELEASE" is a button that is operated to release registration of the application 72 being registered.

The button 494 called "INQUIRY" is a button that is operated to display information regarding a destination for providing the application 72.

Figure 22:
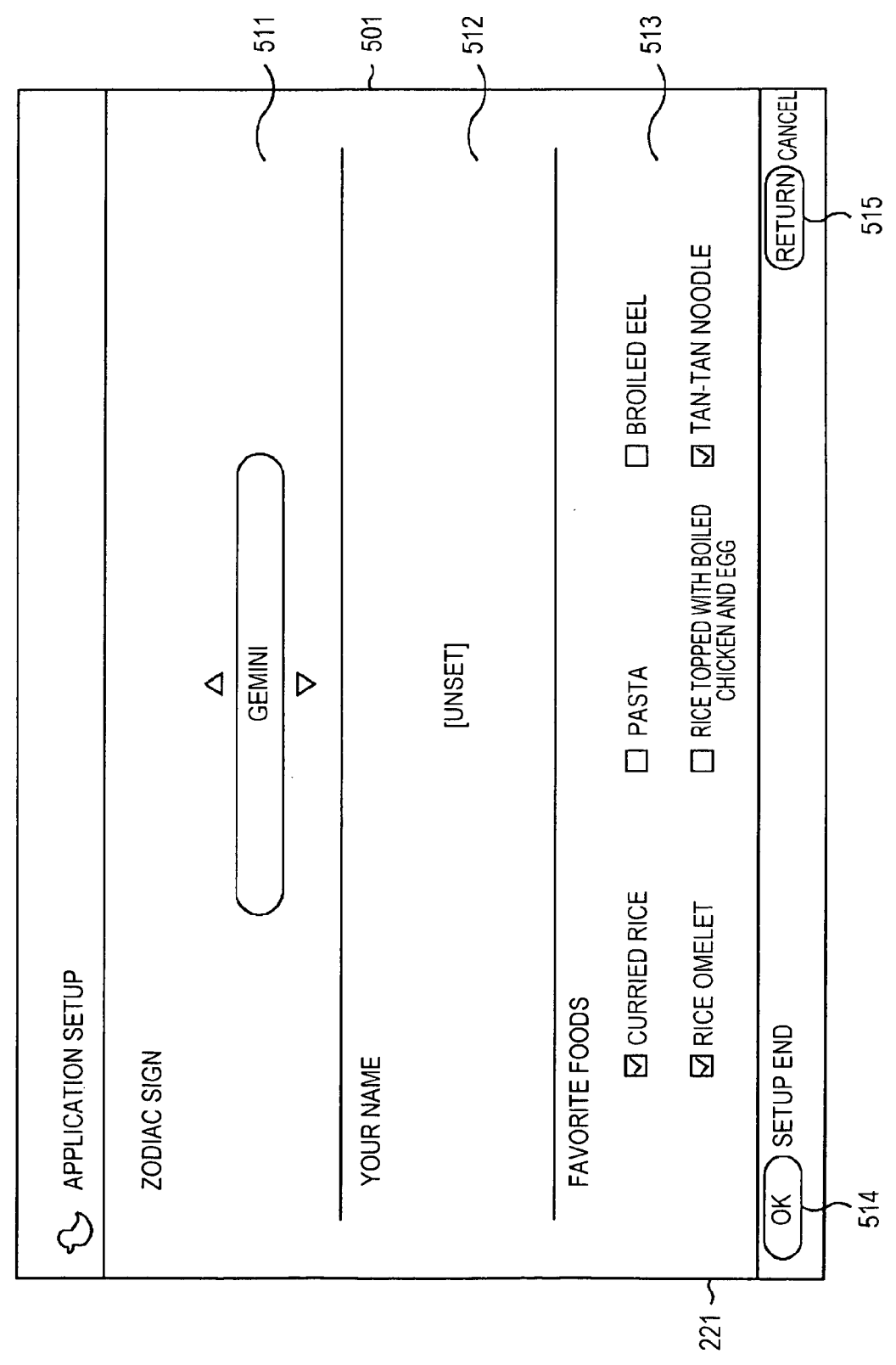

If the button 492 called "APPLICATION SETUP" is operated, the screen is switched to a screen shown in FIG. 22. A description will be provided for a setup screen shown in FIG. 22. A setup screen 501 shown in FIG. 22 is a screen for setup in the application 72-2 named "FORTUNE-TELLING". In the setup screen 501 regarding fortune-telling, a column 511 for zodiac sign selection, a column 512 for name input, and a column 513 for favorite food selection are provided.

The column 511 for zodiac sign selection is configured such that one zodiac sign can be selected, and a desired zodiac sign can be selected by the operation of the up button 271-1 or the down button 271-2 of the remote controller 251.

The column 512 for name input is configured such that the user can input and set desired text, such as his/her name, nickname, or the like by the operation of the remote controller 251. While a case where the name is input has been described, the user ID or password may be set by the application 72.

In the column 513 for favorite food selection, the names of a plurality of foods are listed, and a checkbox is provided in front of each name. The user can select the names of a plurality of foods, and can check each checkbox.

As described above, the items that are set in the setup screen 501 includes an item that is set through input of desired text or the like by the user, an item that is set when the user selects one item from among the items being set in advance, an item that is set when the user selects a plurality of items from among the items being set in advance or the like.

The set items that are set in such a setup screen 501 are stored on the television receiver 14 side. For example, when the application 72-2, "FORTUNE-TELLING", is put in the active mode, a zodiac sign that is one of the items set in the television receiver 14 is referred to, and contents corresponding to the zodiac sign is acquired from the contents server 13 and displayed. Therefore, the user can first view fortune-telling of his/her zodiac sign set once in the focus mode or the active mode.

While the above example has been described mainly focusing on the application 72-2 named "FORTUNE-TELLING", hereinafter, a description will be provided again focusing on the application 72-3 named "NEWS".

Figure 23:
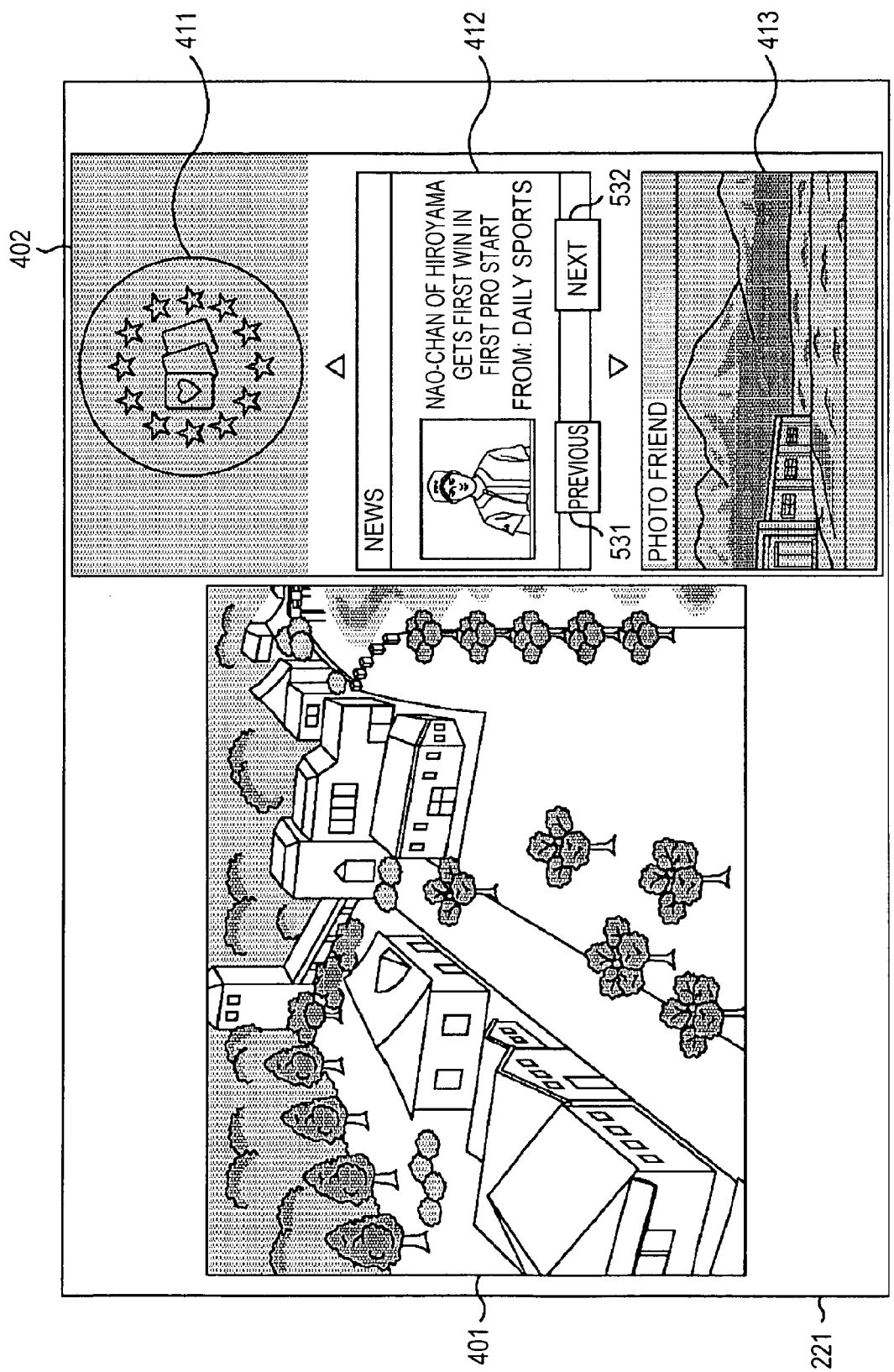
FIG. 23 is a diagram showing an example of a screen which is displayed on the display panel.

In the screen of the normal mode shown in FIG. 17, that is, in a state where information by the application 72-3 named "NEWS" is displayed in the region 412 that is positioned in the middle of the application display region 402, if the OK button 272 of the remote controller 251 is operated, the screen is switched to a screen in a focus mode shown in FIG. 23.

FIG. 23 shows a screen example in a focus mode in which the application 72-3 named "NEWS" is focused. Of the application display region 402, only the region 412 where news is displayed through processing by the application 72-3 is displayed brighter than other regions. In such a focus mode, the applications 72 being registered and the selected application 72 are operating in parallel, regardless of whether or not the applications 72 are displayed in the application display region 402.

As the buttons based on the application 72-3 named "NEWS", in the example of FIG. 23, a button 531, "PREVIOUS", and a button 532, "NEXT", are displayed. The button 531, "PREVIOUS", is a button that is operated to return to a previous article of news articles, and the button 532, "NEXT", is a button that is operated to return to a next article of news articles.

It is configured such that the operation of the left button 271-3 of the remote controller 251 corresponds to the operation of the button 531, "PREVIOUS", and the operation of the right button 271-4 corresponds to the operation of the button 532, "NEXT". The user operates the left button 271-3 or the right button 271-4 to view a desired news article.

In the focus mode shown in FIG. 23, if the OK button 272 of the remote controller 251 is operated, the mode is changed to an active mode, and the screen is switched. As described above, the active mode is a mode in which only information to be provided by one application 72-3 is displayed. In this case, as shown in FIG. 24, an active screen 461 in which only information to be provided by the application 72-3, "NEWS", is displayed is displayed in the application display region 402.

In the active mode, the activated application 72-3 accesses the contents server 13 to acquire contents data 131 regarding news. If a processing based on acquired contents data 131 is executed, a news article is displayed on the active screen 461. The news article that is displayed on the active screen 461 is updated in a cycle set in the application 72-3. When the update is carried out, contents data 131 is acquired.

Figure 24:
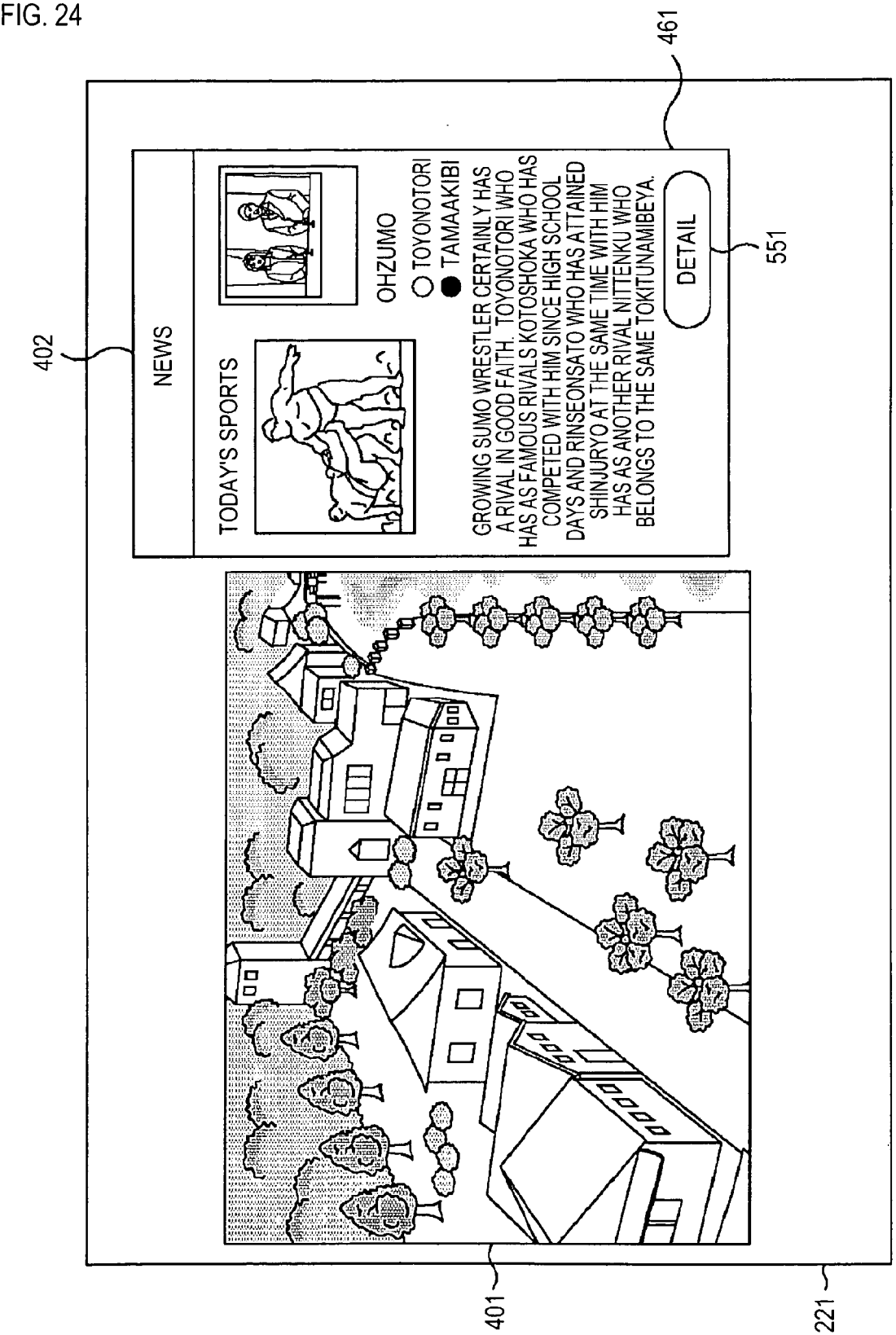
FIG. 24 is a diagram showing an example of a screen which is displayed on the display panel.

In the active screen 461 of FIG. 24, a button 551, "DETAIL" is provided which is operated to see the details of the news article being displayed. As described above, the buttons that are provided in the active screen 461 are buttons that are suitable for the activated application 72.

If the button 551, "DETAIL", is operated, data of the details of the news article is acquired through an access to the contents server 13. Alternatively, a predetermined browser may be activated and may access a predetermined server on Internet, and a processing of the predetermined browser may be executed on the basis of data acquired from the server to provide the details.

As shown in FIG. 24, while the news article that is provided by the application 72-3 called "NEWS" is displayed in the active screen 461, news of interest is different by users. Therefore, a genre of interest of the user can be set (registered) such that a news article of the genre of interest of the user is preferentially provided more than news articles of no interest.

Figure 25:
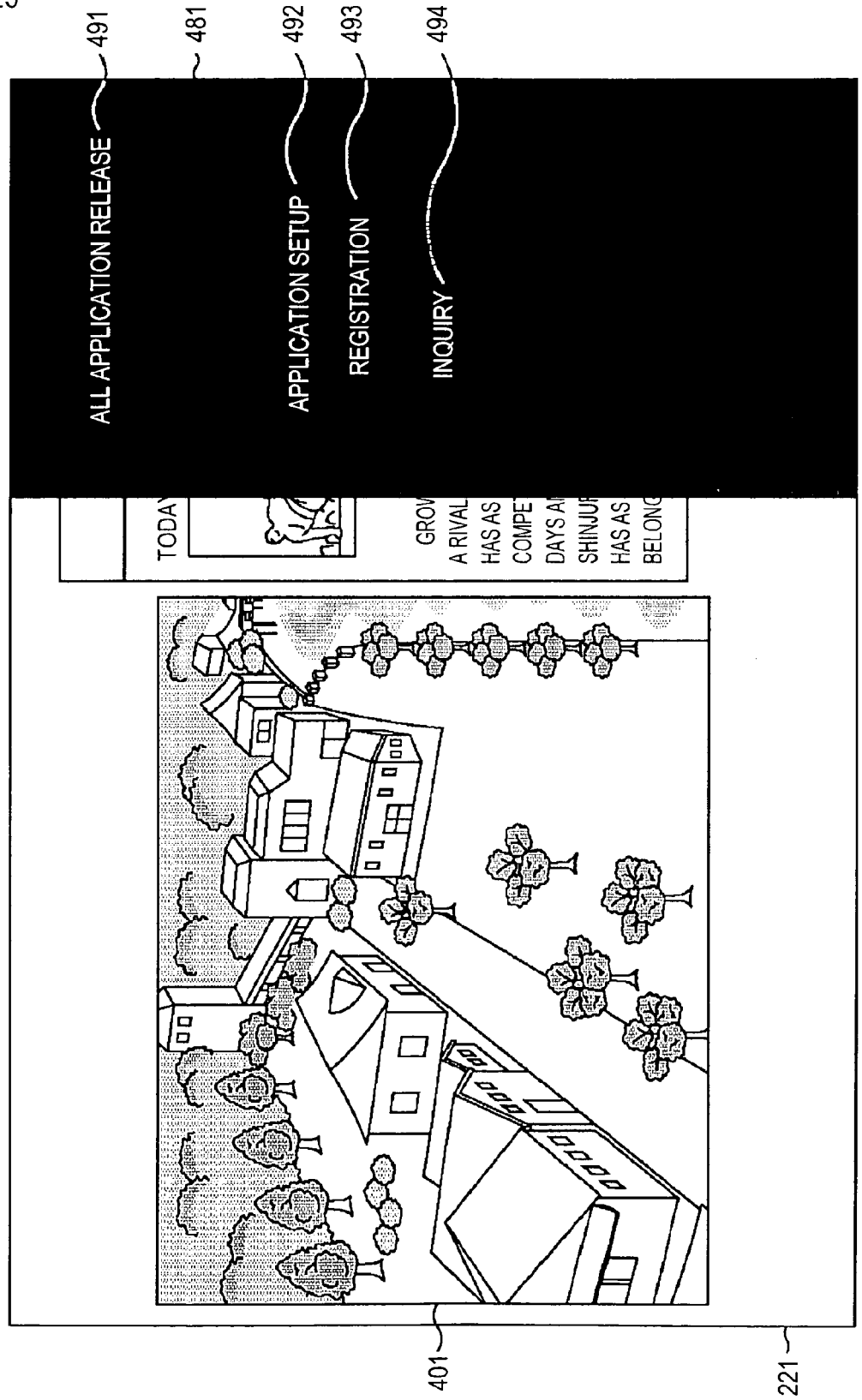
FIG. 25 is a diagram showing an example of a screen which is displayed on the display panel.

In the screen of the active mode shown in FIG. 24, if the user operates the set button 273 of the remote controller 251, as shown in FIG. 25, an option menu screen 481 is displayed. In the option menu screen 481, the same items as the above-described option menu screen 481 (FIG. 21), which is displayed when the application 72-2 called "FORTUNE-TELLING" is put in the active mode, are displayed. The example shown in FIG. 25 is different from the example shown in FIG. 21 in that the option menu screen 481 is displayed on the active screen 461 of the application 72-3 regarding news.

Figure 26:
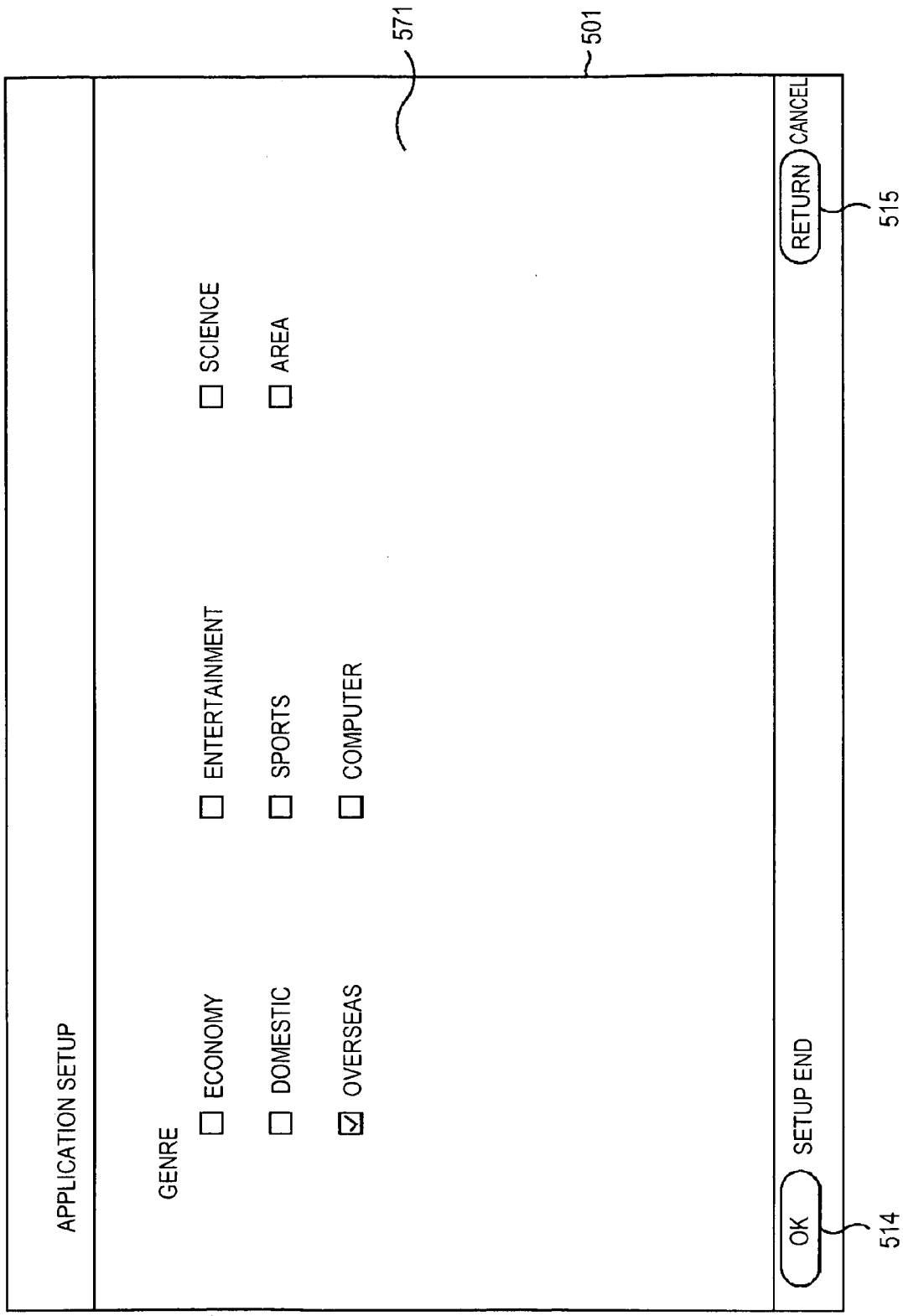
FIG. 26 is a diagram showing an example of a screen which is displayed on the display panel.

Of the items that are displayed in the option menu screen 481, if a button 492 corresponding to the item called "APPLICATION SETUP" is operated, the screen is switched to a screen shown in FIG. 26. A description will be provided for a setup screen shown in FIG. 26. A setup screen 501 shown in FIG. 26 is a screen for setup in the application 72-3 named "NEWS". The setup screen 501 regarding news is provided with a region 571 for setup of a desired genre.

In the region 571 for selection of a desired genre, a plurality of genre names are listed, and a checkbox is provided for each genre name. The user can select a plurality of genre names, and check each checkbox.

The items that are displayed in the setup screen 501 shown in FIG. 20 for the application 72-2 called "FORTUNE-TELLING" are different from the items that are displayed in the setup screen 501 shown in FIG. 26 for the application 72-3 called "NEWS", and the items correspond to the applications 72. As described above, the items that are displayed in the setup screen 501 depend on the application 72.

The set items set in the setup screen 501 are stored on the television receiver 14 side. Then, for example, when the application 72-3, "NEWS", is put in the active mode, the genre names of the items set in the television receiver 14 are referred to, and contents data 131 that corresponds to news belonging to the genre is acquired from the contents server 13 and displayed. Therefore, the user can first view news belonging to a desired genre set once in the active mode.

As described above, the application 72 called NEWS operates in parallel to other applications 72, regardless of the normal mode or the focus mode, and as a result, a news article is updated. Therefore, in the normal mode or the focus mode, as well as the active mode, the set genre may be referred to, and contents data 131 of a news article belonging to the referred genre may be acquired.

In the active mode, if the return button 274 of the remote controller 251 is operated, the screen is switched to the normal mode.

As described above, the normal mode, the focus mode, and the active mode are provided, and thus the user can easily acquire information in a desired mode while enjoying a program of television broadcasting.

Figure 27:
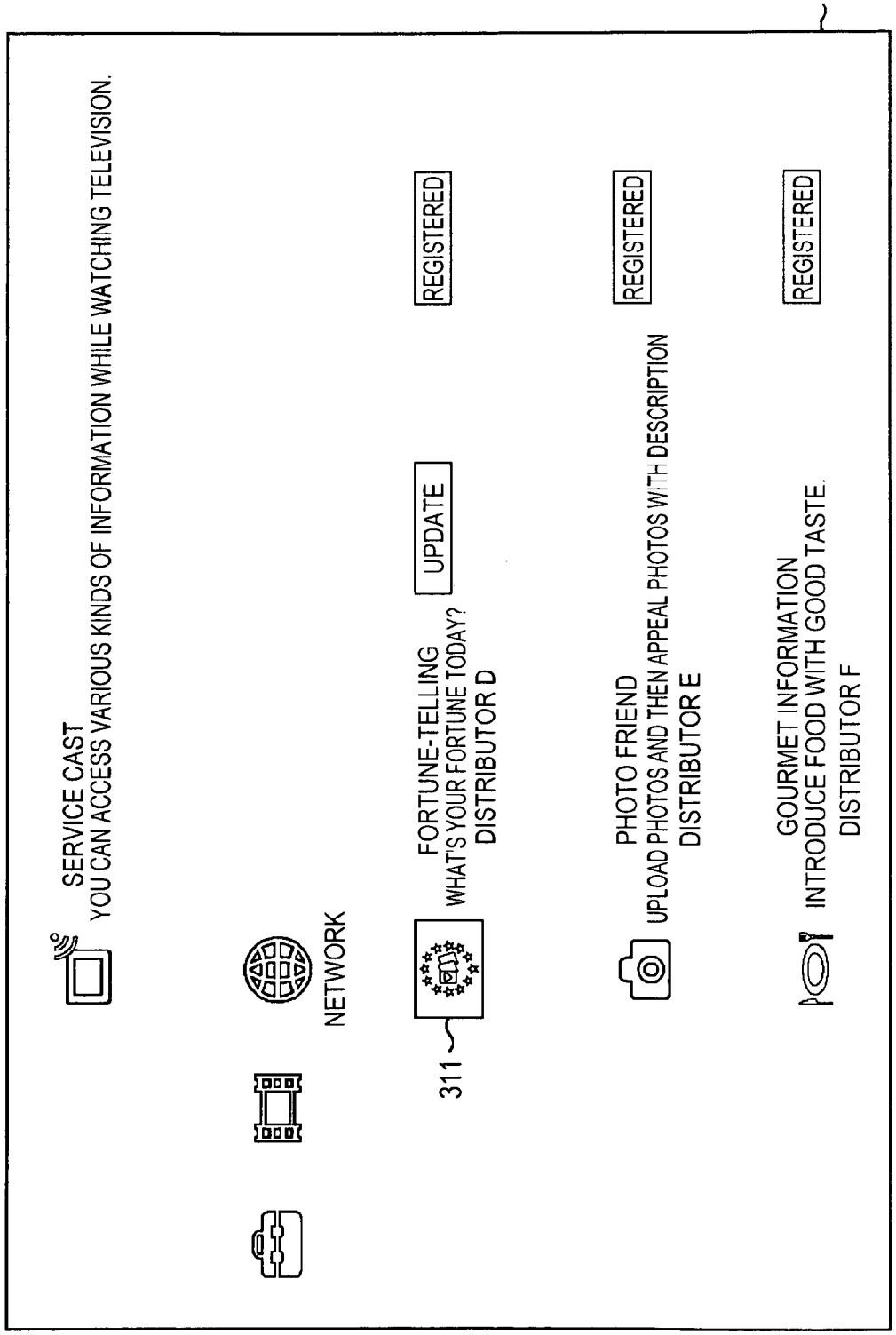
FIG. 27 is a diagram showing an example of a screen which is displayed on the display panel.

A description will be provided again in reference to an initial screen. As the initial screen, an initial screen shown in FIG. 27 is referred to. An icon named "SERVICE CAST", an icon named "FORTUNE-TELLING", an icon named "PHOTO FRIEND", and an icon named "GOURMET INFORMATION" are displayed. Of these, the application 72-2 named "FORTUNE-TELLING", the application 72-4 named "PHOTO FRIEND", and the application 72-5 named "GOURMET INFORMATION" are registered, and icons, REGISTERED, are displayed in the registration state display section 305.

As described above, when the three applications 72, "FORTUNE-TELLING", "PHOTO FRIEND", and "GOURMET INFORMATION", are registered, if the icon named "SERVICE CAST" is selected, the three registered applications 72-2, 72-4, and 72-5 are activated. If the three registered applications 72-2, 72-4, and 72-5 are activated, for example, the screen is switched to a screen of a normal mode shown in FIG. 28.

While a case where the name of the icon that is operated when only the registered applications 72 are activated is "SERVICE CAST" has been described, any name may be used insofar as the user can easily recognize the service contents.

Figure 28:
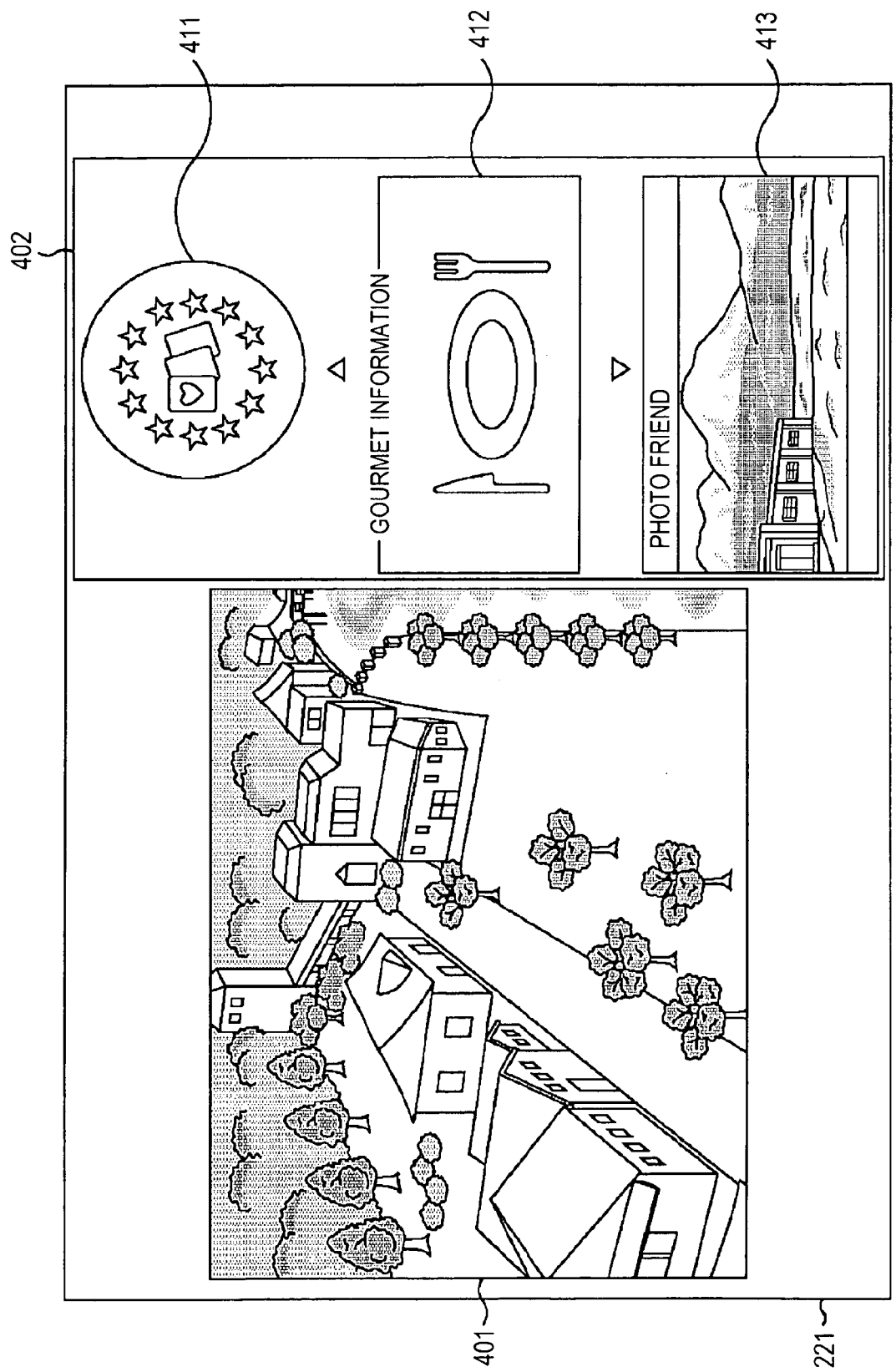
FIG. 28 is a diagram showing an example of a screen which is displayed on the display panel.

In the case of the screen of the normal mode shown in FIG. 28, information that is provided by the three registered applications 72-2, 72-4, and 72-5, "FORTUNE-TELLING", "GOURMET INFORMATION", and "PHOTO FRIEND", is displayed in the application display region 402. The information of the applications 72-2, 72-4, and 72-5 may be displayed in the region 411, the region 412, and the region 413 in an order of registration or in an order of display in the initial screen, for example.

As described above, the icon named "SERVICE CAST" is an icon that is operated to activate the registered applications 72, and a utility for activation of a plurality of registered applications 72. Such an icon is also provided in the initial screen.

If such an icon of the utility is provided in the initial screen, the user can collectively activate the registered applications 72, without finding the registered applications 72 in the list. Therefore, the user can acquire information by a desired application 72 with a simple operation.

As described above, when the initial screen is displayed, the application list 71 is acquired from the application server 12 and stored on the television receiver 14 side. Then, when display is switched from the initial screen to the screen of the normal mode, one or a plurality of applications 72 (programs of the main bodies of the applications 72) that are activated at that time are acquired from the application server 12 and stored on the television receiver 14 side.

In the normal mode and the focus mode, an access is appropriately executed to the contents server 13 on the basis of the application 72 to acquire contents data 131, and stored on the television receiver 14 side. In this case, by applications 72, contents server 13 of the connection destination is different, and contents data 131 to be acquired is different. In the active mode, an access is made to the contents server 13 or a server (not shown) only on the basis of the activated application 72, and contents data 131 or other kinds of data are acquired and stored on the television receiver 14 side.

When the screen is switched from the screen of one of the normal mode, the focus mode, and the active mode to the initial screen, the application 72 and contents data 131 (other kinds of data) stored on the television receiver 14 are deleted. In this way, the application 72 or contents data 131 is stored as needed, and deleted as not needed. Therefore, the memory area for the application 72 or contents data 131 on the television receiver 14 side can be reduced.

If the television receiver 14 acquires the application 72 as needed, for example, even if the application 72 is updated, the updated application 72 can be provided to the television receiver 14 side. Therefore, the application 72 that is provided to the television receiver 14 side can be constantly made to be an up-to-date application 72.

The application 72 that is acquired by the television receiver 14 can be set only to the application 72 that is described in the application list 71. For this reason, with appropriate management of the application list 71, an ill-intended application 72 can be prevented from being downloaded to the television receiver 14. In addition, if an interval for which the application 72 is described in the application list 71 is limited, the application 72 can be provided to the user side with a limited interval, and thus the service width can be increased.

The television receiver 14 acquires contents data 131 as needed, and deletes stored contents data 131 as not needed. For example, even in the case of information, such as news articles, which is frequently updated, updated up-to-date information can be provided to the television receiver 14 side, and old information being stored can be prevented from being provided to the user.

[Other Applications]

While the above-described example has bee described mainly focusing on the application 72-2 named "FORTUNE-TELLING", the same basic flow is applied to the other applications 72. That is, with respect to other application 72, similarly to the application 72-2 named "FORTUNE-TELLING", in accordance with a user's instruction, the mode is changed from the normal mode to the focus mode and from the focus mode to the active mode, and predetermined setting is carried out in each mode.

While the basic processing flow is the same, a description will be provided again for a screen change or the like in each of the applications 72 other than "FORTUNE-TELLING". First, a description will be provided for the registered applications 72.

Figure 29:
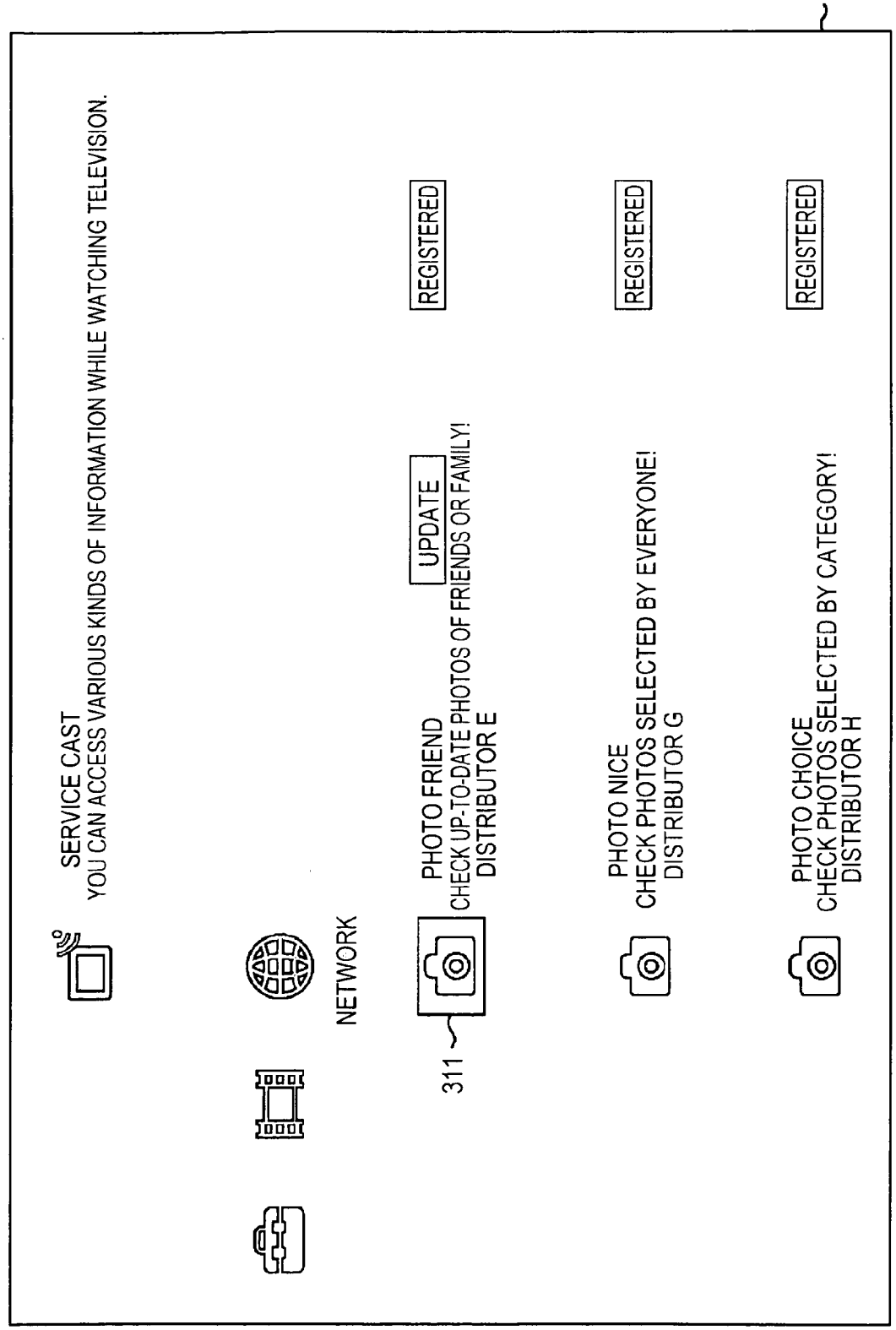
FIG. 29 is a diagram showing an example of a screen which is displayed on the display panel.

A description will be provided again in reference to an initial screen. As the initial screen, an initial screen shown in FIG. 29 is referred to. An icon named "SERVICE CAST", an icon named "PHOTO FRIEND", an icon named "PHOTO NICE", and an icon named "PHOTO CHOICE" are displayed. Of these, the application 72-4 named "PHOTO FRIEND", the application 72-5 named "PHOTO NICE", and the application 72-6 named "PHOTO CHOICE" are registered. For this reason, the REGISTERED icon is displayed in the registration state display section 305.

As described above, when the three applications 72, "PHOTO FRIEND", "PHOTO NICE", and "PHOTO CHOICE", are registered, if the icon named "SERVICE CAST" is selected, the three registered applications 72-4, 72-5, and 72-6 are activated. If the three registered applications 72-4, 72-5, and 72-6 are activated, the screen is switched to a screen of a normal mode shown in FIG. 30, for example.

While a case where the name of the icon, which is operated to activate only the registered applications 72 is "SERVICE CAST" has been described, any name may be used insofar as the user can recognize the service contents.

Figure 30:
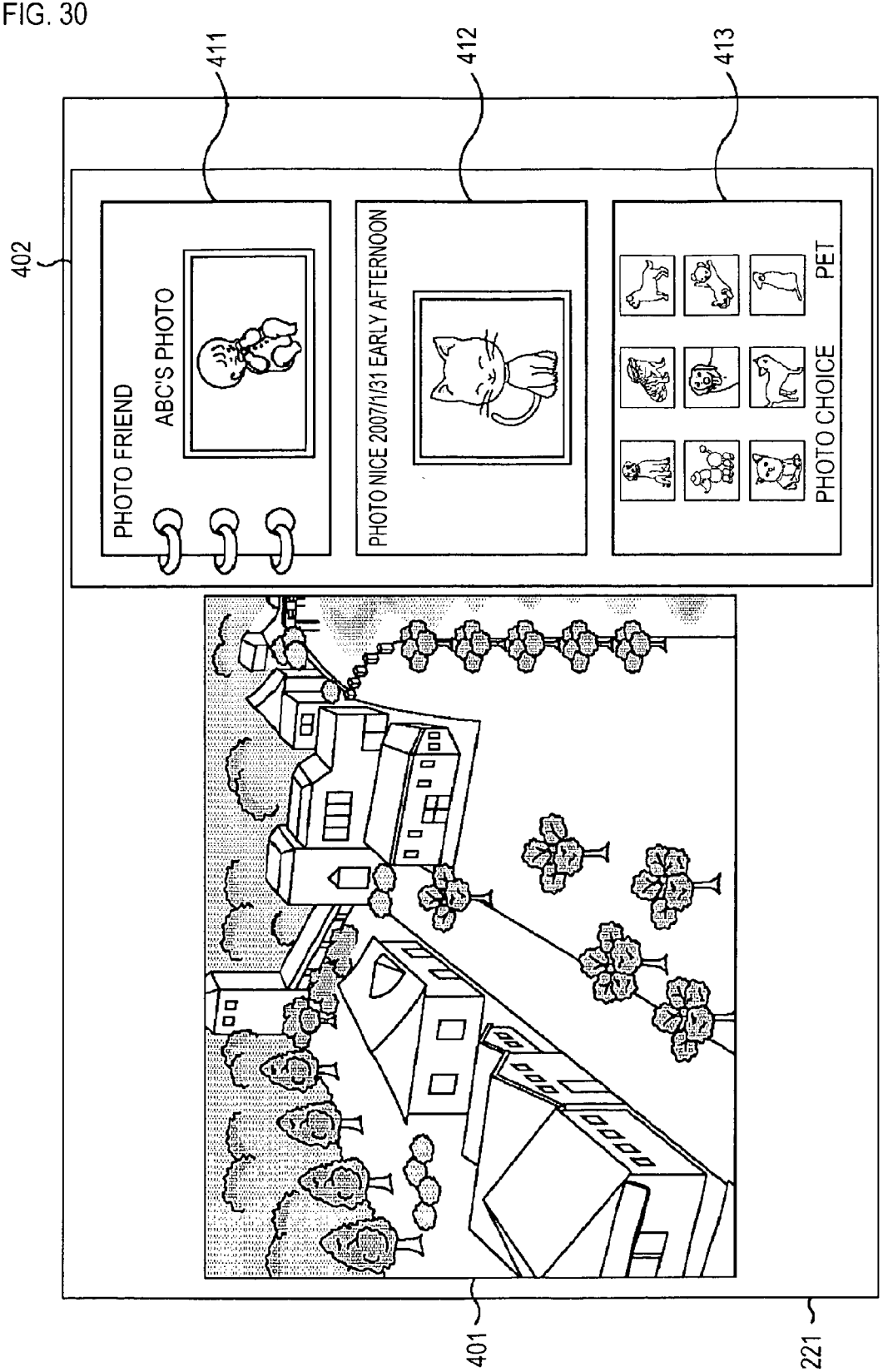
FIG. 30 is a diagram showing an example of a screen which is displayed on the display panel.

On the screen of the normal mode shown in FIG. 30, information that is provided by the three registered applications 72-4, 72-5, and 72-6, "PHOTO FRIEND", "PHOTO NICE", and "PHOTO CHOICE", is displayed in the application display region 402. The information of the application 72-4, 72-5, and 72-6 may be displayed in the region 411, the region 412, and the region 413, respectively, in an order of registration or in an order of display in the initial screen.

As described above, the icon named "SERVICE CAST" is an icon that is operated to activate the registered applications 72, and a utility for activation of a plurality of registered applications 72. Such an icon is also provided in the initial screen.

If such an icon of the utility is provided in the initial screen, the user can collectively activate the registered applications 72, without finding the registered applications 72 in the list. Therefore, the user can acquire information by a desired application 72 with a simple operation.

Next, the screen shift or setup in each application 72 of the application 72-4 named "PHOTO FRIEND", the application 72-5 named "PHOTO NICE", and the application 72-6 named "PHOTO CHOICE", which are displayed in the normal mode of FIG. 30, will be described.

Any one of "PHOTO FRIEND", "PHOTO NICE", and "PHOTO CHOICE" is an application regarding photos (still images). Though the details are described in connection with a description of each application, to simply describe each application, "PHOTO FRIEND" is an application that allows persons who knows a predetermined ID to share photos. "PHOTO NICE" is an application that allows the user to view photos, which are selected as nice photos by many people, from among the photos being managed by a predetermined server (here, it is assumed as the contents server 13-1). "PHOTO CHOICE" is an application that allows the user to view photos, which is classified into a predetermined category, from among the photos being managed by the contents server 13-1.

[Photo Friend]

First, a description will be provided for the application 72-4 named "PHOTO FRIEND".

Figure 31:
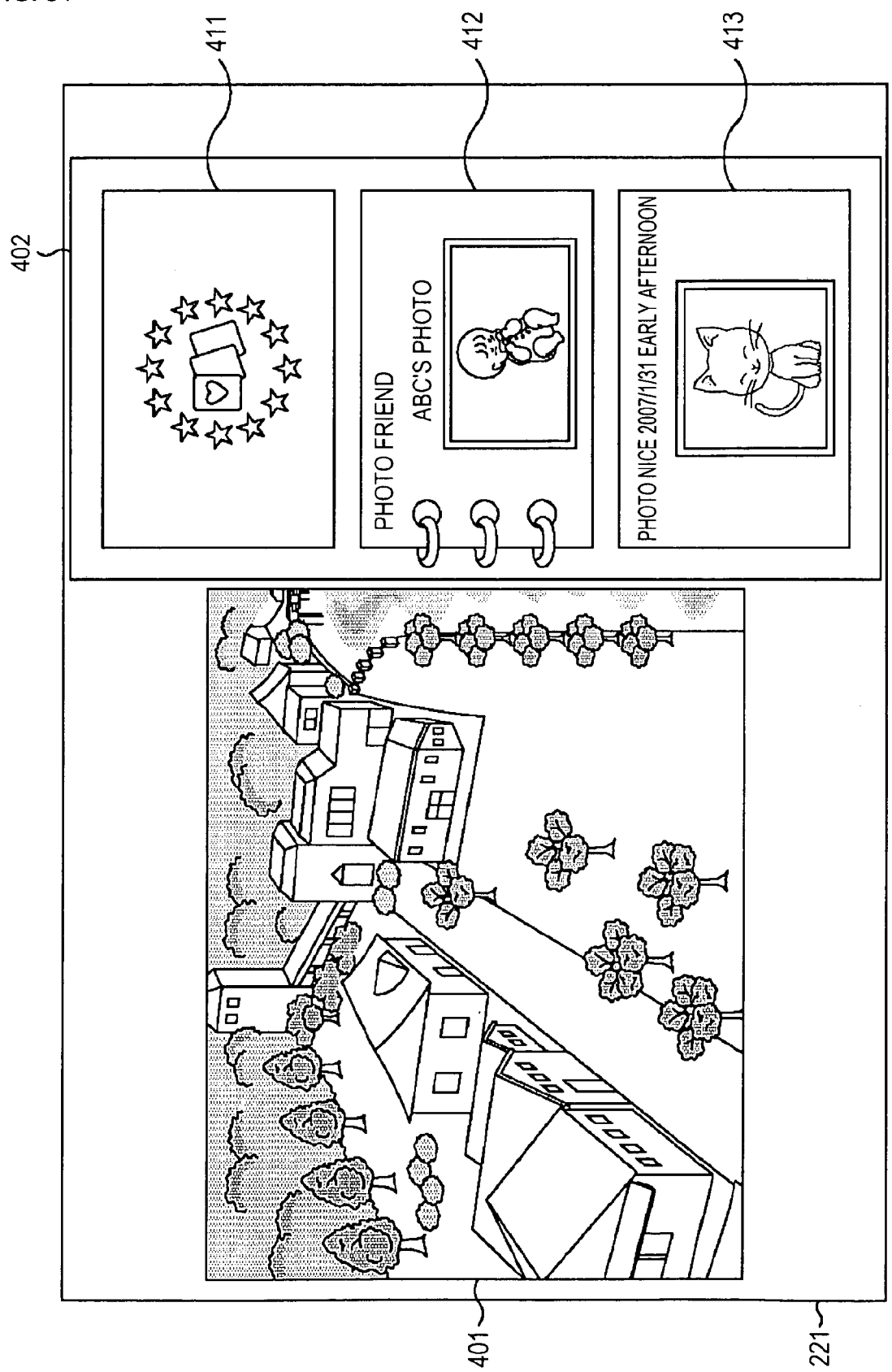
FIG. 31 is a diagram showing an example of a screen which is displayed on the display panel.

In the case of the screen of the normal mode shown in FIG. 30, that is, when information by the application 72-5 named "PHOTO NICE" is displayed in the region 412 that is positioned in the middle of the application display region 402, if the down button 271-2 of the remote controller 251 is operated, the screen becomes a screen of a normal mode shown in FIG. 31. That is, the screen is switched to the screen of the normal mode on which information by the application 72-4 named "PHOTO FRIEND" is displayed in the region 412 positioned in the middle of the application display region 402.

A description will be provided for the screen named "PHOTO FRIEND" on the screen of the normal mode shown in FIG. 30 or 31. As shown in FIG. 31, for example, the screen named "PHOTO FRIEND" has a background as a copy of one page of a paper album, and a photo is displayed in the background. This photo is switched to another photo each time a predetermined time elapses. In other words, display is performed as if the pages of the album are turned over (replaced) by one page (by one photo). Specifically, the photo that is displayed within the screen named "PHOTO FRIEND" is displayed in a slide show manner.

A photo is switched each time the predetermined time elapses, and information regarding the predetermined time is described in, for example, Java (Registered Trademark) Script, which is included in the application 72-4. When a photo is switched, image data of the photo is acquired from the contents server 13 (here, it is assumed as the contents server 13-1), which manages image data. Image data of the background is included in the application 72-4, and the screen of the normal mode is instantaneously displayed earlier than the photo. If only the background is instantaneously displayed, the user may recognize the change to the screen of the normal mode or may feel uneasiness of an erroneous operation since nothing is displayed. Therefore, a feeling of uneasiness can be relieved.

Image data that is acquired from the contents server 13-1 is image data that is identified by a predetermined ID. The predetermined ID is, for example, the ID for identifying the user 24 (FIG. 1), and the ID that is used by the user 24 to register image data in the contents server 13-1. In other words, the user 24 can register image data of photos captured by himself/herself in the contents server 13-1. The predetermined ID is an ID that is used for authentication of whether or not the user 24 is authorized to register image data.

The contents server 13-1 is configured to identify a plurality of image data being registered on the basis of the IDs. In addition, at the time of registration, the user puts a tag. This tag represents a category of a photo. For example, in the case of a photo of a baby, it is classified into a category named "BABY", and a tag representing this category is put. An application 72-6 named "PHOTO CHOICE" that will be described below selects a photo on the basis of the tag.

Returning to the description of the screen named "PHOTO FRIEND" shown in FIG. 31, for example, a white frame is displayed around a photo. With the white frame, even if it is assumed that photos based on image data being managed by the contents server 13 have various sizes (aspect ratios), different sizes can be absorbed. When a photo is displayed within the screen called "PHOTO FRIEND", a photo based on acquired image data is processed to a size according to the size of the screen (aspect ratio), and a white frame that is fitted to the size of the processed photo is displayed.

In the example of FIG. 31, in the screen named "PHOTO FRIEND", a sentence, "ABC'S PHOTO", is also displayed. The sentence to be displayed is a sentence having, for example, a portion corresponding to "ABC" as a nickname. The nickname is managed on the contents server 13-1 side in association with the ID.

As described above, a photo based on imaged data being managed with a predetermined ID is displayed in the screen named "PHOTO FRIEND", and accordingly an ID needs to be set before such display is performed. This is because, if an ID is not set, it is not understood which image data being managed with which ID is acquired from the contents server 13-1.

Figure 32:
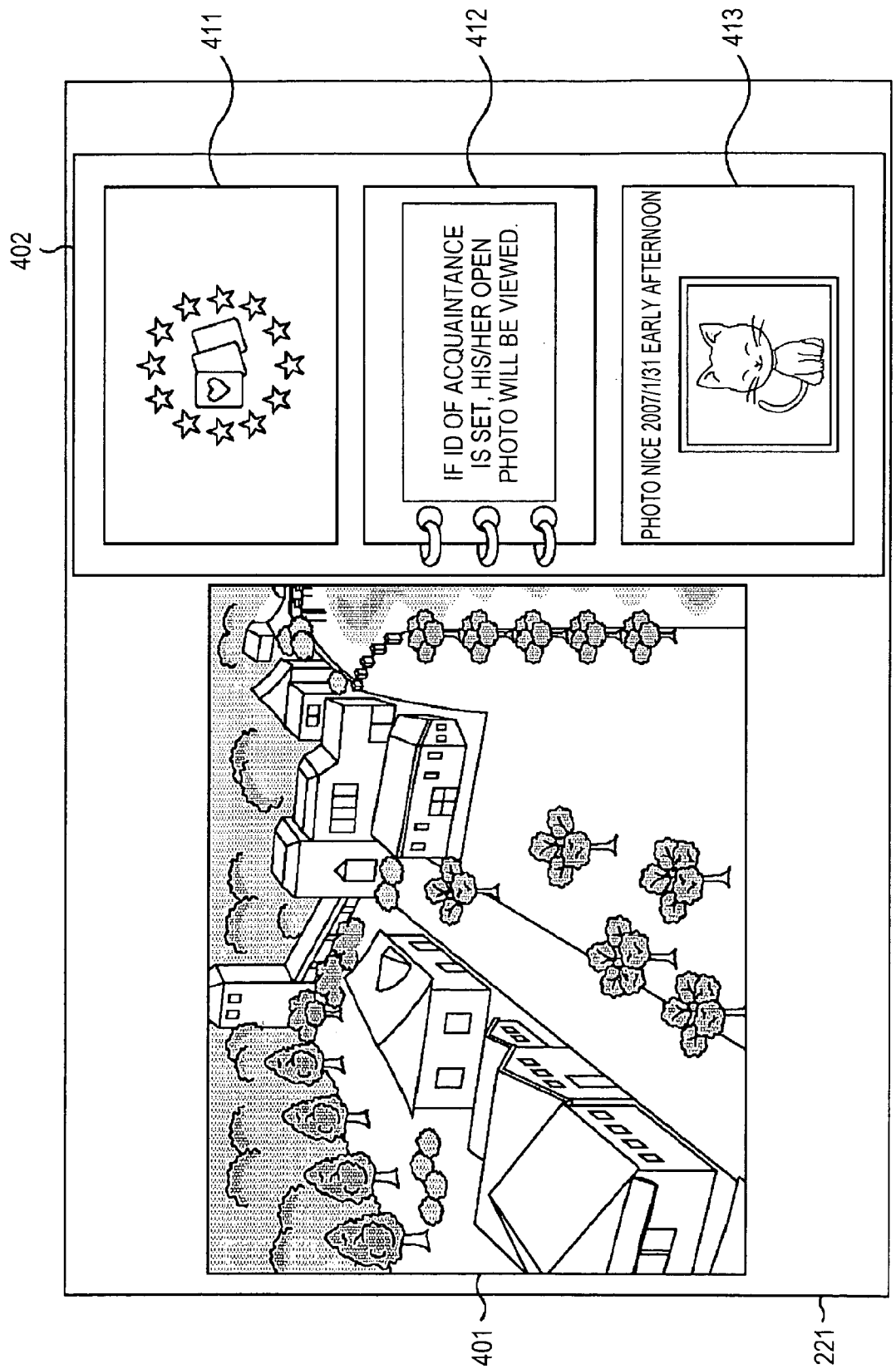
FIG. 32 is a diagram showing an example of a screen which is displayed on the display panel.

Accordingly, when the ID is not set, the screen shown in FIG. 32, not the screen named "PHOTO FRIEND" shown in FIG. 31, is displayed. Referring to FIG. 32, a sentence, "IF ID OF ACQUAINTANCE IS SET, OPEN PHOTO OF ACQUAINTANCE WILL BE VIEWED!", is displayed in the screen named "PHOTO FRIEND". If such a sentence is displayed, the user can recognize that the ID is not set and even if the application 72-4 is activated, he/she cannot view the photos since the ID is not set.

If such a sentence is displayed, the user can recognize that the application 72-4 named "PHOTO FRIEND" is an application 72 that allows the user to view an open photo of an acquaintance.

The user who reads such a sentence and recognizes that he/she does not set an ID can set the ID. In either the screen of the normal mode shown in FIG. 32 or the screen of the normal mode shown in FIG. 31, for setup of the application 72-4 named "PHOTO FRIEND", the user operates the set button 273 of the remote controller 251.

Figure 33:
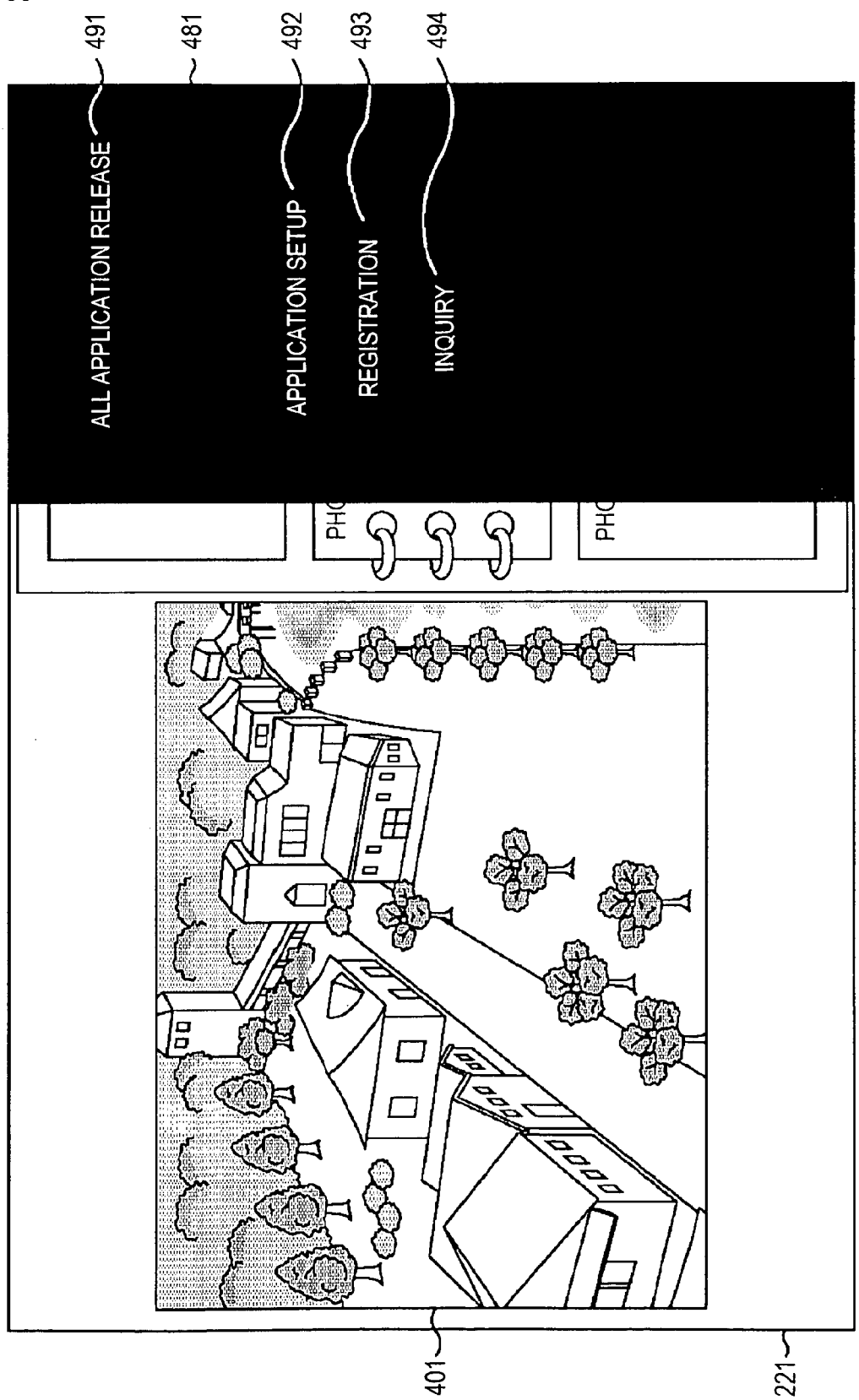
FIG. 33 is a diagram showing an example of a screen which is displayed on the display panel.

If the set button 273 of the remote controller 251 is operated, the option menu for ID setup is displayed. FIG. 33 shows an example of an option menu screen corresponding to the application 72-4 called "PHOTO FRIEND". In any of the screen of the normal mode (for example, FIG. 31), a screen of a focus mode described below (for example, FIG. 36), and a screen of an active mode described below (for example, FIG. 37), if the set button 273 of the remote controller 251 is operated, the option menu screen 481 is superimposed on the screen at that time, and the same display is performed.

Meanwhile, in the case of the application 72-4 called "PHOTO FRIEND", if an ID is not set, control is performed so as not to be changed to the focus mode or the active mode.

Accordingly, in the focus mode or the active mode, an ID is already set, and in this case, the ID being already set can be changed.

In the option menu screen 481, the same items as the above-described option menu screen 481 (FIG. 21), which is displayed when the application 72-2 called "FORTUNE-TELLING" is put in the active mode, are displayed. The example shown in FIG. 33 is different from the example shown in FIG. 21 in that the option menu screen 481 is displayed on the normal mode screen of the application 72-4, PHOTO FRIEND.

Figure 34:
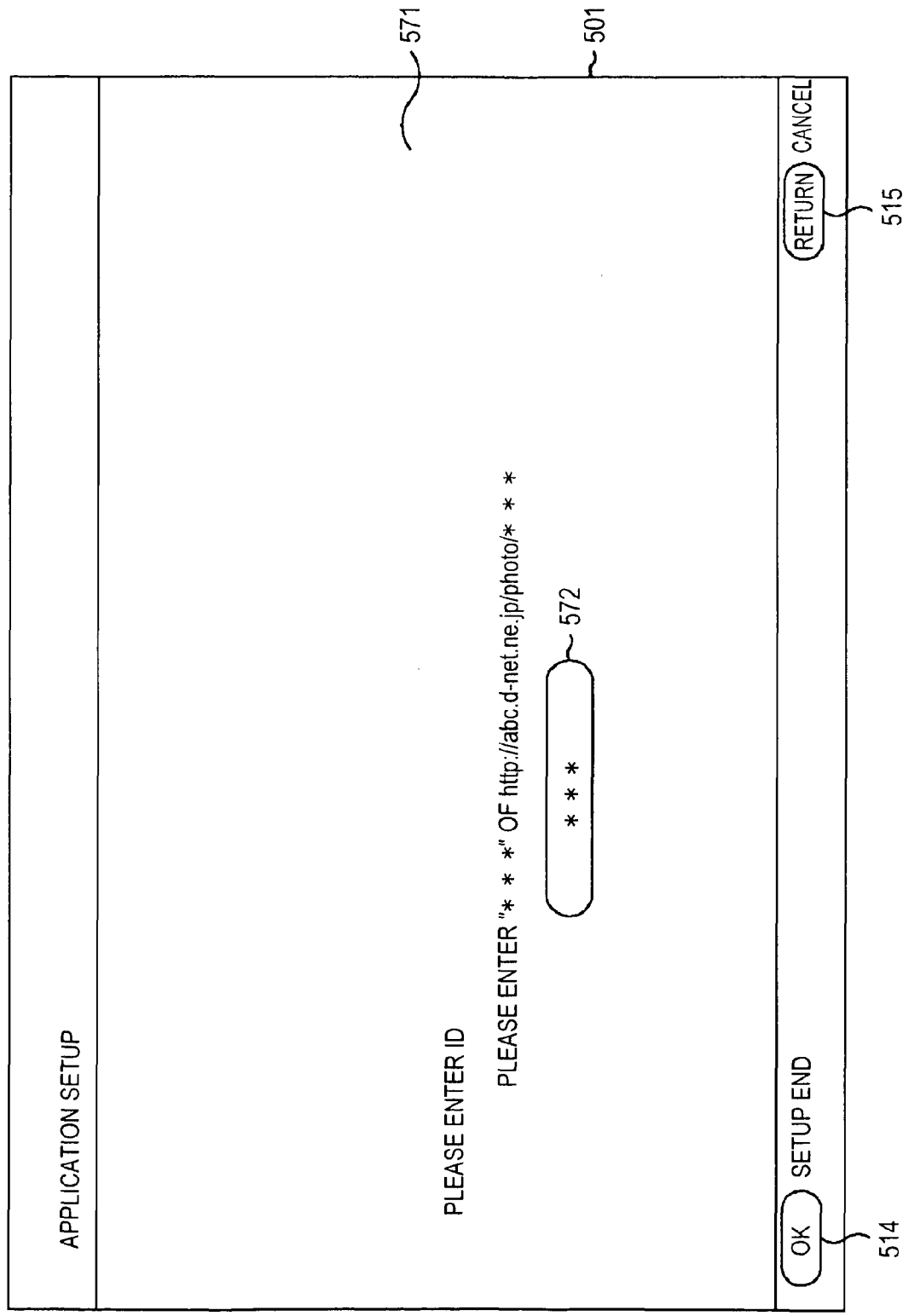
FIG. 34 is a diagram showing an example of a screen which is displayed on the display panel.

Of the items that are displayed in the option menu screen 481, if a button 492 called "APPLICATION SETUP" is selected and operated, the screen is switched to a screen shown in FIG. 34.

A description will be provided for a setup screen shown in FIG. 34. A setup screen 501 shown in FIG. 34 is a screen for setup in the application 72-4 named "PHOTO FRIEND". The setup screen 501 regarding PHOTO FRIEND is provided with a region 571 where a sentence, which allows the user to recognize which ID is to be input, is described, and a region 572 where an ID being already set is displayed.

In the region 571, a sentence, "PLEASE ENTER ID", and a sentence, "PLEASE ENTER "*" OF http://abc.d-net-.ne.jp/photo/*." are displayed. From this sentence, the user can recognize that it should suffice if the characters corresponding to the portion "***" is input. The address "http://abc.d-net.ne.jp/photo/" is an address that is used by the contents server 13-1 to manage image data of photos.

The user 24 who registers photos in the contents server 13-1 by using the ID makes a contract regarding photo registration beforehand with the contents provider 23 that manages the contents server 13-1 or the application provider 22 that manages the contents server 13-1. There is an ID that is exchanged at the time of this contract, and this ID is input to the setup screen shown in FIG. 34.

In the region 572 of the setup screen shown in FIG. 34, when there is an ID being already set, the ID, not "***", is displayed.

Figure 35:
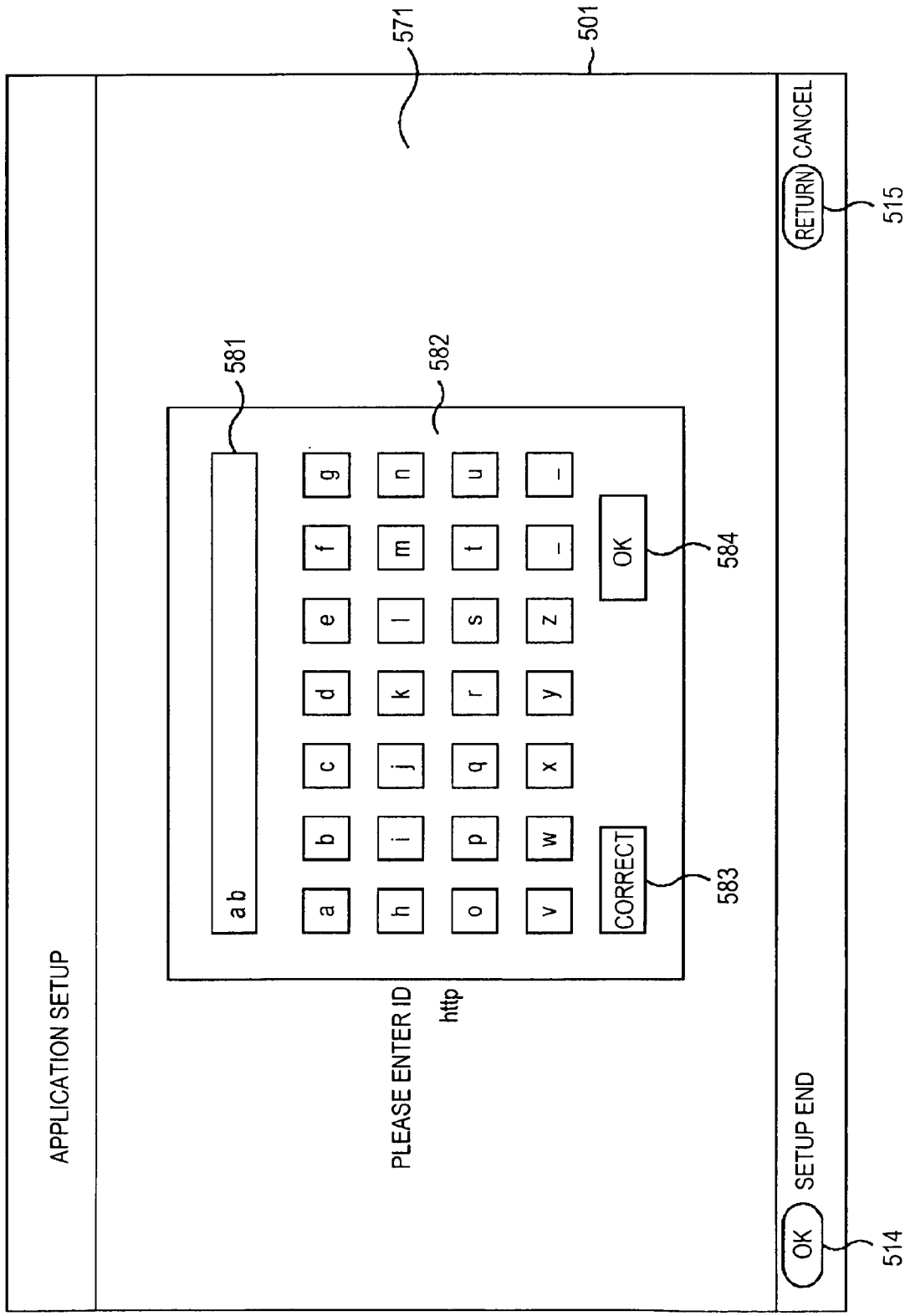
FIG. 35 is a diagram showing an example of a screen which is displayed on the display panel.

When the setup screen shown in FIG. 34 is displayed, if the OK button 272 of the remote controller 251 is operated, as shown in FIG. 35, a screen, called a soft keyboard or the like, for support of character input is displayed. For example, in the character input screen of FIG. 35, a region 581 where input characters are displayed, a region 582 where a list of buttons of characters that can be input is displayed, a button 583, "CORRECT", which is operated to correct the input characters, and a button 584, "OK", which is operated when the input characters (ID) are satisfactory, are displayed.

In the example shown in FIG. 35, the buttons of the characters, which are displayed in the region 582, are lowercase alphabet characters. The buttons are configured such that the characters can be selected by the operations of the up button 271-1, the down button 271-2, the left button 271-3, and the right button 271-4 of the remote controller 251. The OK button 272 of the remote controller 251 is operated in order to input a selected character.

Through repetitions of the operation of the remote controller 251, the characters constituting the ID are input to the region 581. If the characters constituting the ID are all input, the button 584, "OK", is operated. If the button 584 is operated, the screen returns to the screen shown in FIG. 34. Then, the set ID is displayed in the region 572.

Such input of the ID is considered as being simple, as compared with a case where a keyboard of a personal computer is operated to input characters. The types of the characters constituting the ID are alphabet characters or numerals and are limitative. Therefore, even if a desired character is found from the screen shown in FIG. 35 and input, it is considered that there is no case where it is difficult to find a desired character or the operation of the remote controller 251 becomes complicated. The number of characters constituting the ID is not so much, and thus it is considered that the ID can be input only by the operations of the remote controller 251 several times.

Therefore, since the ID can be simply input, most people, including children and old people, can set the ID, and can pleasantly view the photos through processing of the application 72-4.

For example, it is assumed that a user A tells the parent A of the user A his/her ID. The parent A, as well as the user A, can view the photos registered by the user A through the above-described simple ID setup processing. Therefore, in this case, when the user A registers the photos of the grandchildren of the parent A, the parent A can freely view the photos of the grandchildren. In addition, a person can view the photos while viewing television broadcasting on the television receiver 14. Therefore, the parent A can enjoy the photos of the adorable grandchildren while viewing a favorite program of television broadcasting. As described above, in the case of the screen of the normal mode, the photos to be displayed are switched, and thus the parent A enjoys the photos of the grandchildren with various expressions.

As described above, the photos can be shared with simple setup, in this case, the ID setup.

The photos that are displayed in the screen of the normal mode are enlarged and displayed, as described below, when the screen is switched to the screen of the active mode. When a favorite photo is displayed, the favorite photo can be simply viewed as a photo of a larger size.

The items that are displayed in the setup screen 501 shown in FIG. 22 with respect to the application 72-2 called "FORTUNE-TELLING" are different from the items that are displayed in the setup screen 501 shown in FIG. 34 with respect to the application 72-4 called "PHOTO FRIEND", and the items correspond to the applications 72. As described above, the items that are displayed in the setup screen 501 depend on the application 72.

The set items set in the setup screen 501 are stored on the television receiver 14 side. Then, for example, when the application 72-4, "PHOTO FRIEND", is activated, the ID that is set in the television receiver 14 is referred to, and image data (contents data 131) corresponding to the photos belonging to the ID is acquired from the contents server 13-1 and displayed.

A description will be provided for the screen of the focus mode named "PHOTO FRIEND" and the screen in the active mode.

Figure 36:
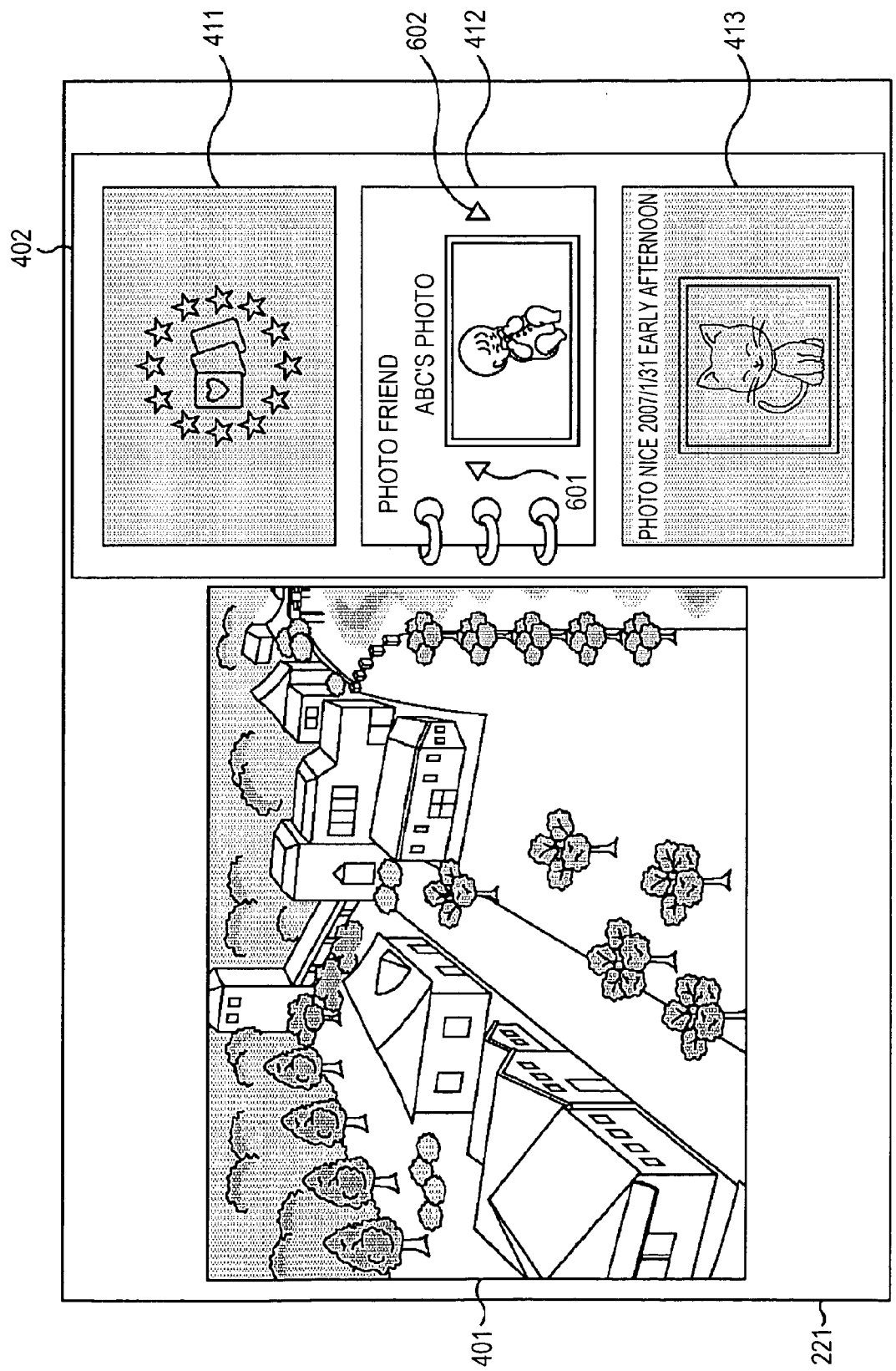
FIG. 36 is a diagram showing an example of a screen which is displayed on the display panel.

In the case of the screen of the normal mode shown in FIG. 31, if the OK button 272 of the remote controller 251 is operated, the screen is switched to the screen of the focus mode shown in FIG. 36.

In the case of the screen of the normal mode shown in FIG. 32, that is, when an ID is not set, even if the OK button 272 of the remote controller 251 is operated, the mode is not changed to the focus mode, and the screen is not switched to the screen of the focus mode.

FIG. 36 shows a screen example in the focus mode in which the application 72-4 named "PHOTO FRIEND" is focused. Of the application display region 402, only the region 412 where a photo is displayed through processing by the application 72-4 is displayed brighter than other regions. In such a focus mode, the registered applications 72 and the selected application 72 are operating in parallel, regardless of whether or not the applications 72 are displayed in the application display region 402.

As the buttons based on the application 72-4 named "PHOTO FRIEND", in the example of FIG. 32, a button 601 that is operated to display a photo previously updated, and a button 602 that is operated to display a photo next updated are displayed.

The operation of the left button 271-3 of the remote controller 251 corresponds to the operation of the button 601, and the operation of the right button 271-4 corresponds to the operation of the button 602. The user operates the left button 271-3 or the right button 271-4 to view a desired photo.

In the focus mode, the frame that is displayed around the photo as the white frame in the normal mode may be displayed a different color, such as yellow or the like. If display is changed in such a manner, the user can better recognize the focus mode, and fine display can be performed.

In the case of the focus mode shown in FIG. 36, if the OK button 272 of the remote controller 251 is operated, the mode is changed to the active mode, and the screen is switched. As described above, the active mode is a mode in which only information to be provided by one application 72-4 is displayed. In this case, as shown in FIG. 37, an active screen 621 in which only information to be provided by the application 72-4 named "PHOTO FRIEND" is displayed is displayed in the application display region 402.

In the active mode, the activated application 72-4 accesses the contents server 13-1 to acquire contents data 131 regarding PHOTO FRIEND. A processing based on acquired contents data 131 is executed, and thus a photo is displayed as the active screen 621.

Figure 37:
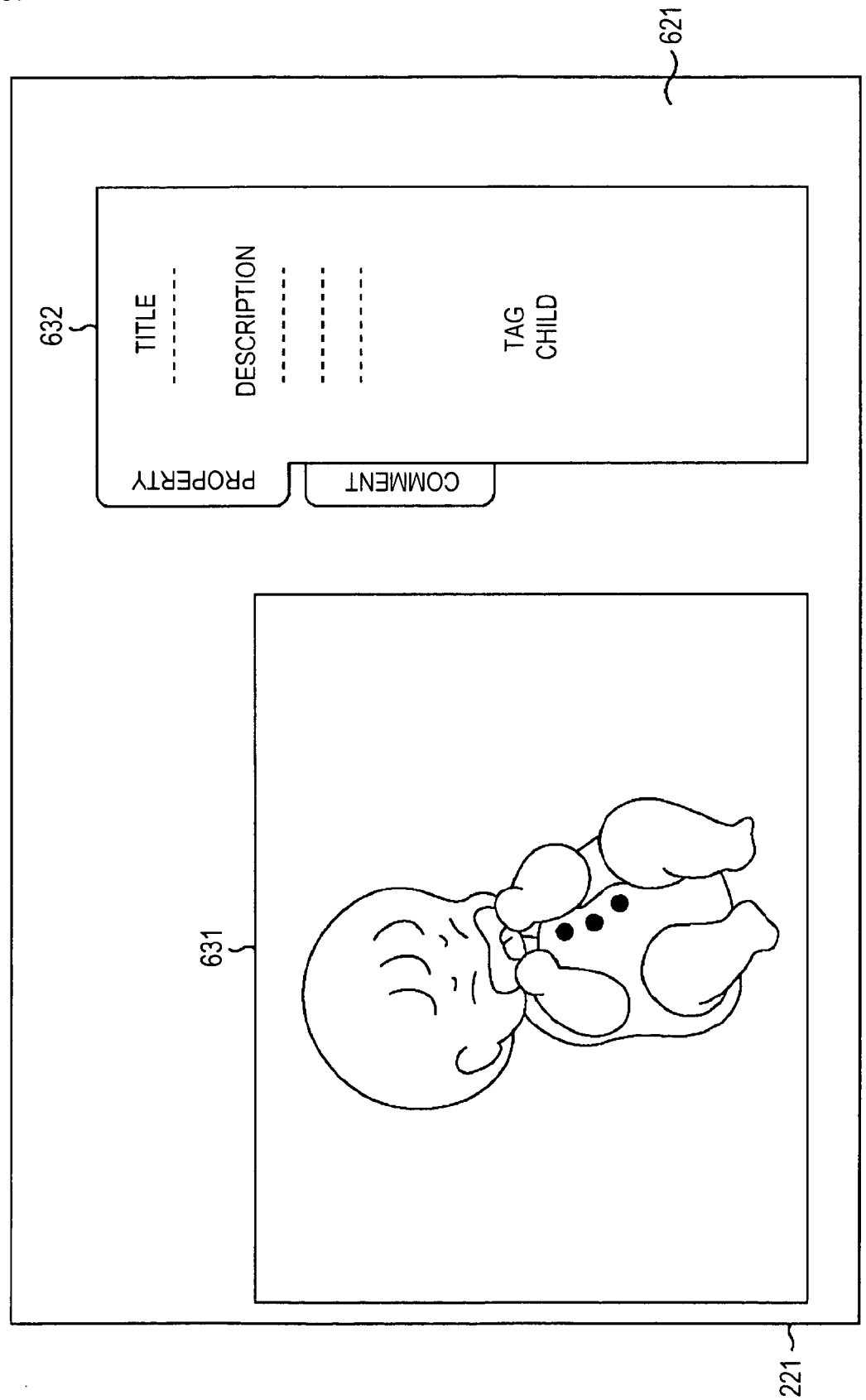
FIG. 37 is a diagram showing an example of a screen which is displayed on the display panel.

The active screen 621 shown in FIG. 37 is provided with a region 631 where an enlarged photo is displayed, and a region 632 where information regarding the photo is displayed. The photo that is displayed in the region 631 is a photo that is displayed in the focus mode before the change to the active mode. In the region 632, the title of the photo being displayed, the description, information regarding the tag, and the like are displayed. In the region 632, the tag is configured so as to be switched, and if the tag is switched, the comment for the photo by another user is displayed.

Such an active screen 621 may be displayed only in the application display region 402 or may be displayed on the display panel 221 as the entire screen.

When the active screen 621 is displayed only in the application display region 402, the same screen as when the above-described application 72-2 named "FORTUNE-TELLING" is put in the active mode is configured. For example, the screen shown in FIG. 20 is configured and displayed, together with the screen of television broadcasting. Meanwhile, when the active screen 621 is displayed on the display panel 221 as the entire screen, the screen of television broadcasting is not displayed.

Meanwhile, as described above, the application 72-4 named "PHOTO FRIEND" accesses the contents server 13-1 to acquire image data of photos. The images that are registered in the contents server 13-1 can also be viewed from the personal computer. When the personal computer accesses the contents server 13-1 to acquire image data, an application called a Web browser or the like is used. The television receiver 14 may also be incorporated with a Web browser, and as one of the processing of the application 72-4, when the mode is change to the active mode, the Web browser may be activated so as to display the active screen 621 shown in FIG. 37.

That is, when the mode is changed to the active mode, the Web browser may be activated, and the processing by the application 72-4 is changed to the processing by the activated Web browser so as to display the active screen 621 on the display panel 221. In this case, even if the user is not particularly conscious, conversion from the mode in which television broadcasting is viewed to the mode in which photos or the like are viewed with the Web browser becomes possible.

Conversion on the television receiver 14 from the state where information of a program of television broadcasting is received from the broadcasting wave to the state where predetermined information is acquired by communication through the network 11 (FIG. 1) becomes possible, without making the user be conscious. That is, the communication mode can be switched without making the user be conscious.

Watching of a program of television broadcasting comes into wide use. In general, communication through the Web browser is performed when a personal computer accesses a predetermined server to view a homepage, but this does not come into wide use, as compared with watching of a program of television broadcasting. In other words, there is a user who has viewed a program of television broadcasting but has not (rarely) viewed information by the personal computer.

As described above, the mode in which a program of television broadcasting is viewed is changed to the mode in which information is viewed with the Web browser with a series of operations. Accordingly, even a user who is not familiar with viewing information by the Web browser can be provided with information by the Web browser. This can give a change to acquire information with the Web browser. In other words, in this case, a chance to view photos being managed in the contents server 13-1 with the personal computer can be given.

The contents provider 23 or the application provider 22 that manages the contents server 13-1, which manages the photos, can view on the personal computer. For this reason, advertising, please view information with a personal computer and please make a contract, becomes possible.

As described above, in the application 72-4 named "PHOTO FRIEND", the normal mode, the focus mode, and the active mode are provided, and thus the user can easily acquire information in a desired mode while enjoying a program of television broadcasting.

[Photo Nice]

Next, a description will be provided for the application 72-5 named "PHOTO NICE".

As shown in FIG. 30, in the screen of the normal mode, that is, in the region 412 positioned in the middle of the application display region 402, the application 72-5 named "PHOTO NICE" is displayed. A description will be provided for the screen by the application 72-5 named "PHOTO NICE" in the normal mode.

The screen named "PHOTO NICE" is the same as the above-described screen named "PHOTO FRIEND", and can be divided into a background and a photo. Image data of the background is included in the application 72-5, and when the screen of the normal mode is displayed, it is instantaneously displayed earlier than the photo.

The photo is switched to another photo each time a predetermined time elapses. In other words, similarly to the photo that is displayed within the screen named "PHOTO FRIEND", the photo that is displayed within the screen named "PHOTO NICE" is also displayed in a slide show manner.

A photo is switched each time the predetermined time elapses, and information regarding the predetermined time is described in, for example, Java (Registered Trademark) Script, which is included in the application 72-5. When a photo is switched, image data of the photo is acquired from the contents server 13 (here, it is assumed as the contents server 13-1), which manages image data.

Image data that is acquired from the contents server 13-1 is a photo that is evaluated to be "GOOD" after a plurality of users views a plurality of photos, which are registered in the contents server 13-1. A plurality of users can view the photos that are registered in the contents server 13-1 if the user who registers the photos permits. Then, the users who view the photos can evaluate the viewed photos.

The application 72-5 named "PHOTO NICE" acquires image data of photos with a high score of evaluation, "GOOD", from the contents server 13-1. In such a case, the photos with a high score of evaluation, "GOOD", are displayed within the screen named "PHOTO NICE" in a slide show manner.

It is assumed that application 72-5 named "PHOTO NICE" acquires and displays image data of the photos with a high score of evaluation, "GOOD". In addition, it may be considered that new photos are displayed in a slide show manner. Even if new photos are displayed in a slide show manner, the processing can be basically performed by the application 72-5 named "PHOTO NICE".

The new photos are simply registered in the contents server 13-1 on new date and time, and other filters are not applied. Accordingly, it is considered that undesirable open photos may be registered, and the photos may be displayed in a slide show manner.

In contrast, the photos with a high score of evaluation, "GOOD", are viewed by a plurality of users and are given evaluation, "GOOD". Therefore, there is little possibility that the photos are undesirable open photos. That is, it can be said that the photos with a high score of evaluation, "GOOD", are photos that are selected as the result of application of the filters, that is, through viewing of a plurality of users. As a result, it is considered that there is no problem in opening and displaying such photos in a slide show manner.

In this way, the filters can be applied to information (in this case, photos) that is provided on the user 24 side of the television receiver 14, and similarly to the application 72, safe information can be provided to the user side. In this case, since the information to be provided does not need to be managed by the service provider 21 (FIG. 2), the processing of the service provider 21 can be reduced.

Returning to the description of the screen named "PHOTO NICE" shown in FIG. 30, for example, a white frame is displayed around the photo. With the white frame, even if it is assumed that photos have various sizes (aspect ratios), different sizes can be absorbed.

In the screen named "PHOTO NICE", for example, in the example of FIG. 30, the sentence "2007/1/31 EARLY AFTERNOON . . . " is displayed. This sentence being displayed includes, for example, date and time on which the photo is registered, the title of the photo, and the like.

Figure 38:
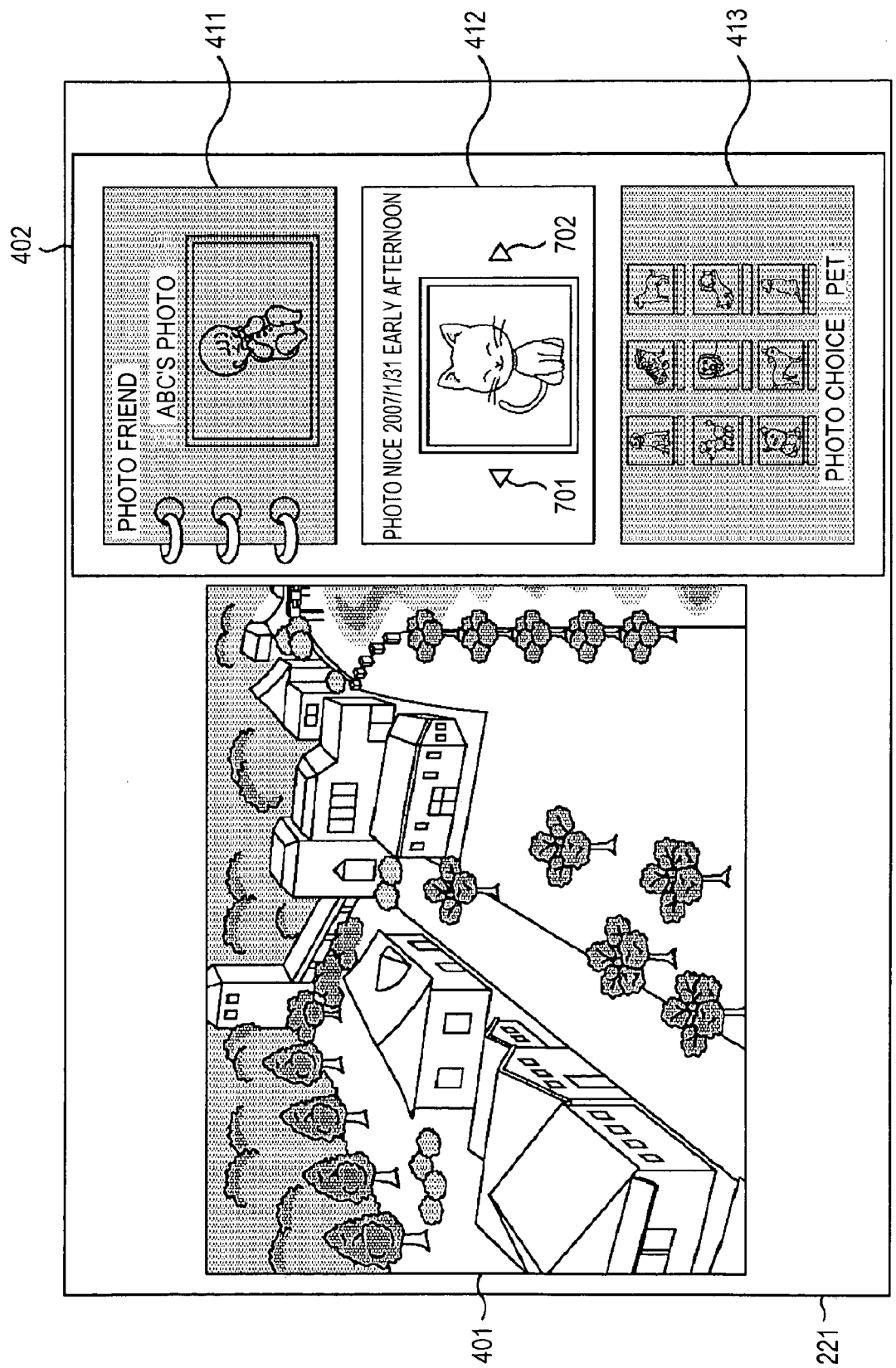
FIG. 38 is a diagram showing an example of a screen which is displayed on the display panel.

In the case of the screen of the normal mode shown in FIG. 30, that is, when information by the application 72-5 named "PHOTO NICE" is displayed in the region 412 in the middle of the application display region 402, if the OK button 272 of the remote controller 251 is operated, the screen is switched to a screen of a focus mode shown in FIG. 38.

FIG. 38 shows a screen example in the focus mode in which the application 72-5 named "PHOTO NICE" is focused. Of the application display region 402, only the region 412 where PHOTO NICE is displayed through processing by the application 72-5 is displayed brighter than other regions.

As the buttons based on the application 72-5 named "PHOTO NICE", in the example of FIG. 38, a button 701 that is operated to display a photo previously updated, and a button 702 that is operated to display a photo next updated are displayed.

The operation of the left button 271-3 of the remote controller 251 corresponds to the operation of the button 701, and the operation of the right button 271-4 corresponds to the operation of the button 702. The user operates the left button 271-3 or the right button 271-4 to view a desired photo.

In the focus mode, the frame that is displayed around the photo as the white frame in the normal mode may be displayed a different color, such as yellow or the like. If display is changed in such a manner, the user can better recognize the focus mode, and fine display can be performed.

In the focus mode shown in FIG. 38, if the OK button 272 of the remote controller 251 is operated, the mode is changed to the active mode, and the screen is switched. As described above, the active mode is a mode in which only information to be provided by one application 72-5 is displayed. As shown in FIG. 37, in this case, the active screen 621 in which only information to be provided by the application 72-4 named "PHOTO NICE" is displayed is displayed in the application display region 402.

In the active mode, the activated application 72-5 accesses the contents server 13-1 to acquire contents data 131 regarding PHOTO NICE. The processing based on acquired contents data 131 is executed, and thus the photo is displayed as the active screen 621.

Although the active screen 621 shown in FIG. 37 has been already described, and the details thereof will be omitted, in the case of the application 72-5 named "PHOTO NICE", similarly to the application 72-4 named "PHOTO FRIEND", in the active mode, the screen is changed to a screen in which one photo is enlarged and displayed. In this case, the Web browser is activated (the Web browser may be activated).

As described above, the normal mode, the focus mode, and the active mode are provided, and thus the user can easily acquire information in a desired mode while enjoying a program of television broadcasting.

[Photo Choice]

Next, a description will be provided for the application 72-6 named "PHOTO CHOICE".

Figure 39:
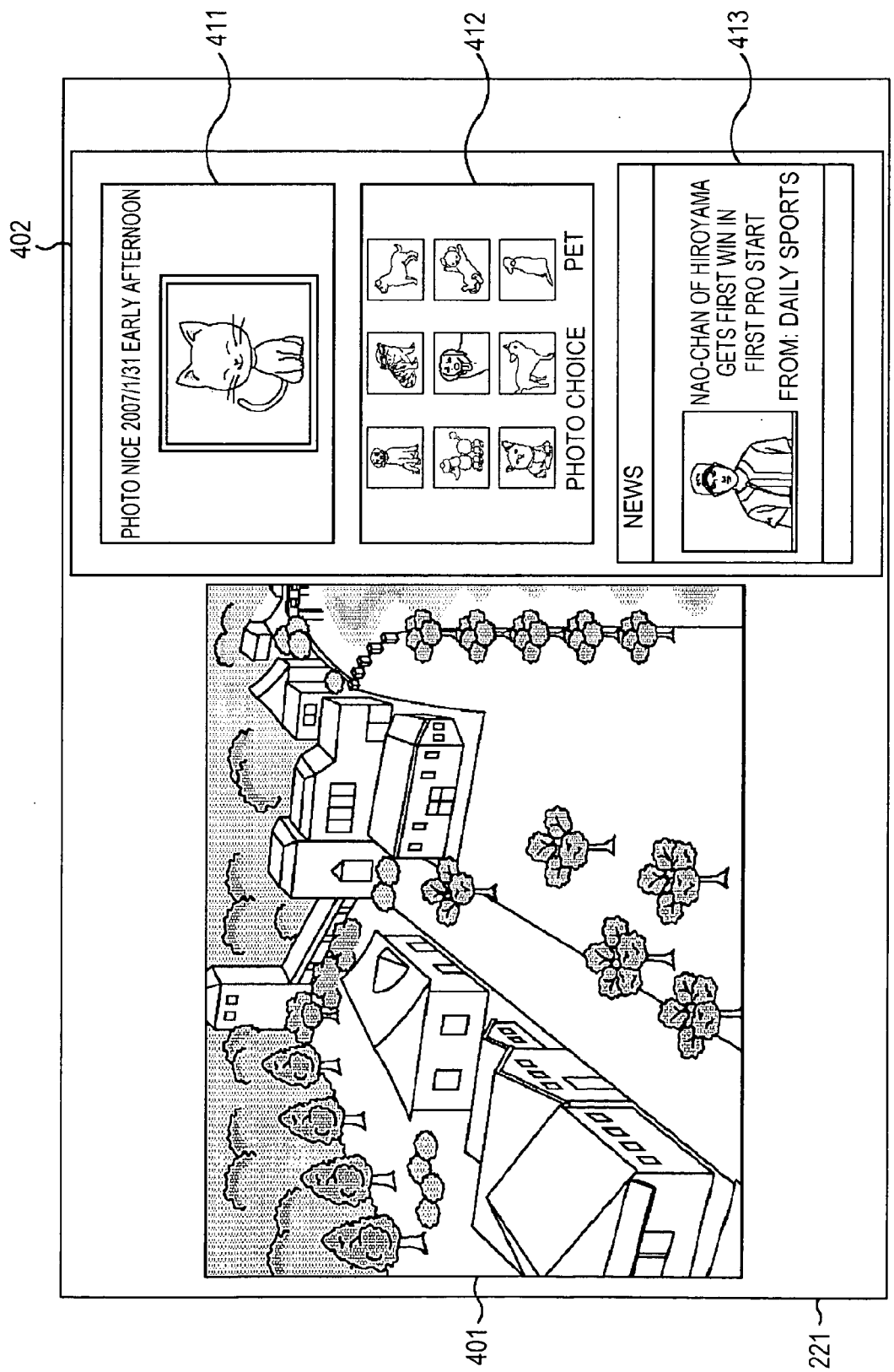
FIG. 39 is a diagram showing an example of a screen which is displayed on the display panel.

In the screen of the normal mode shown in FIG. 30, that is, when information by the application 72-5 named "PHOTO NICE" is displayed in the region 412 positioned in the middle of the application display region 402, if the up button 271-1 of the remote controller 251 is operated, the screen becomes a screen of a normal mode shown in FIG. 39. That is, the screen is switched to a screen of a normal mode on which information by the application 72-6 named "PHOTO CHOICE" is displayed in the region 412 positioned in the middle of the application display region 402.

A description will be provided for a screen, "PHOTO CHOICE" in the screen of the normal mode shown in FIG. 30 or 39. In the screen named "PHOTO CHOICE", for example, as shown in FIG. 39, a plurality of photos (in the example of FIG. 39, 9 photos) are displayed. Each of a plurality of photos are switched to other photos each time a predetermined time elapses. In other words, the photos that are displayed within the screen named "PHOTO CHOICE" are displayed in a slide show manner. A plurality of photos may be updated at the same time, or may be updated in sequence from the upper left side to the lower right side.

A photo is switched each time the predetermined time elapses, and information regarding the predetermined time or information regarding a way to update is described in, for example, Java (Registered Trademark) Script, which is included in the application 72-6. When a photo is switched, image data of the photo is acquired from the contents server 13 (here, it is assumed as the contents server 13-1), which manages image data.

Image data that is acquired from the contents server 13-1 is image data that is identified by a predetermined tag. The predetermined tag is, for example, information regarding a category, to which the photo belongs, and information that, when the photo is registered in the contents server 13-1 by the user, is set through determination of which category the photo to be registered belongs to. For example, the photo to be registered is a photo of a dog, it is classified into a category "PET" by user's determination, and a tag indicative of the category "PET" is put.

Information regarding the tag is also displayed within the screen named "PHOTO CHOICE". For example, in the screen named "PHOTO CHOICE" shown in FIG. 39, the characters "PET" are displayed on the lower right side. That is, in the example of FIG. 39, a plurality of photos that are displayed within the screen named "PHOTO CHOICE" are photos that are suitable for the tag indicative of "PET".

As described above, in the screen named "PHOTO CHOICE", photos based on image data, which are managed with a predetermined tag, are displayed. The user can set a tag suitable for photos to be displayed on the screen named "PHOTO CHOICE".

When the user wants to carry out setup regarding the application 72-6 named "PHOTO CHOICE", he/she operates the set button 273 of the remote controller 251. If the set button 273 of the remote controller 251 is operated, an option menu for setup of a tag suitable for a photo to be displayed is displayed.

Figure 40:
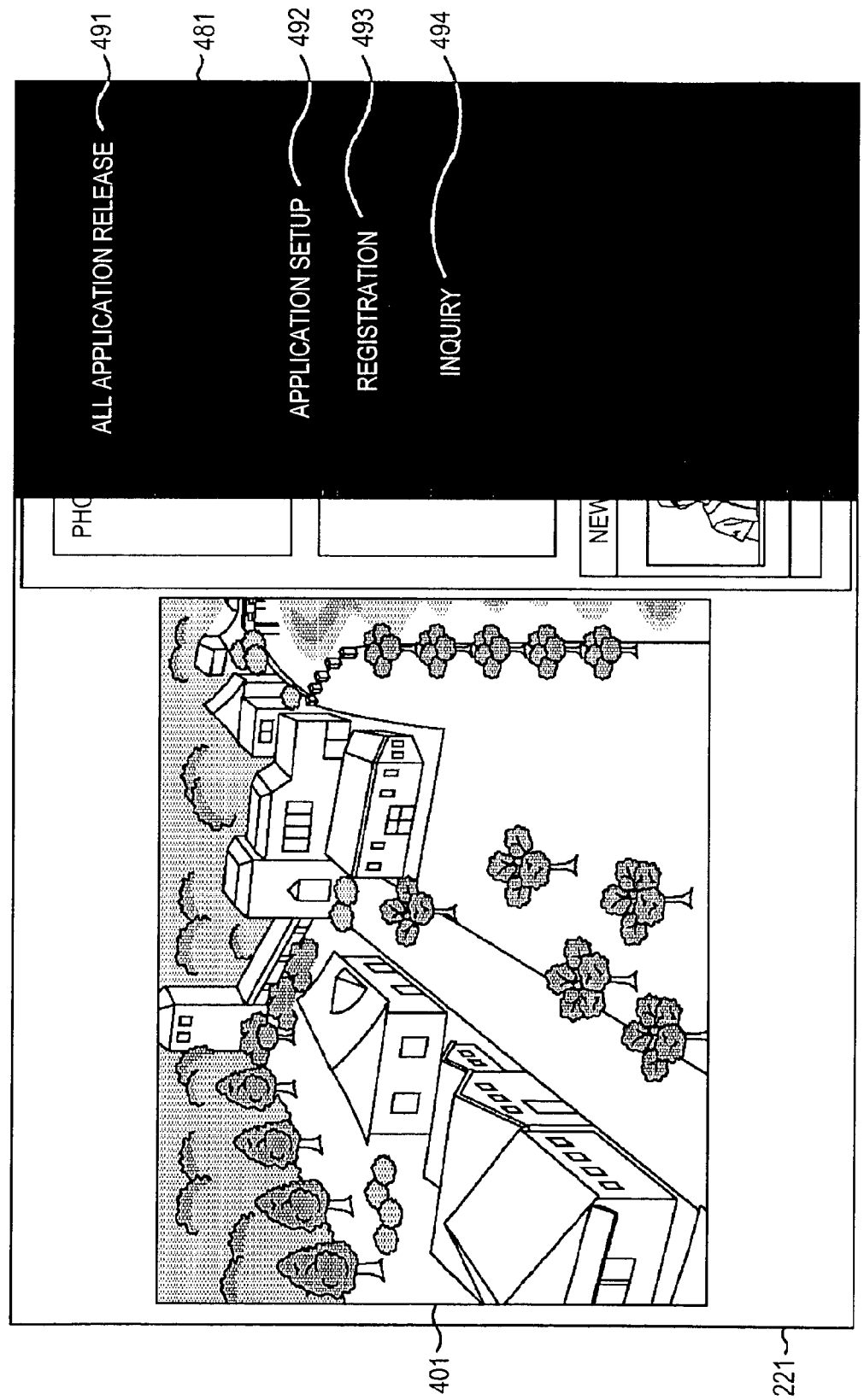
FIG. 40 is a diagram showing an example of a screen which is displayed on the display panel.

FIG. 40 shows an example of an option menu screen corresponding to the application 72-4 named "PHOTO CHOICE". In any of the screen of the normal mode (for example, FIG. 39), a screen of a focus mode described below (for example, FIG. 42), and a screen of an active mode described below (for example, FIG. 37), if the set button 273 of the remote controller 251 is operated, an option menu screen 481 is superimposed on the screen at that time, and the same display is performed.

In the option menu, screen 481, the same items as the above-described option menu screen 481 (FIG. 21), which is displayed when the application 72-2 named "FORTUNE-TELLING" is put in the active mode, are displayed. The example shown in FIG. 40 is different from the example shown in FIG. 21 in that the option menu screen 481 is displayed on the normal mode screen of the application 72-6, PHOTO CHOICE.

Figure 41:
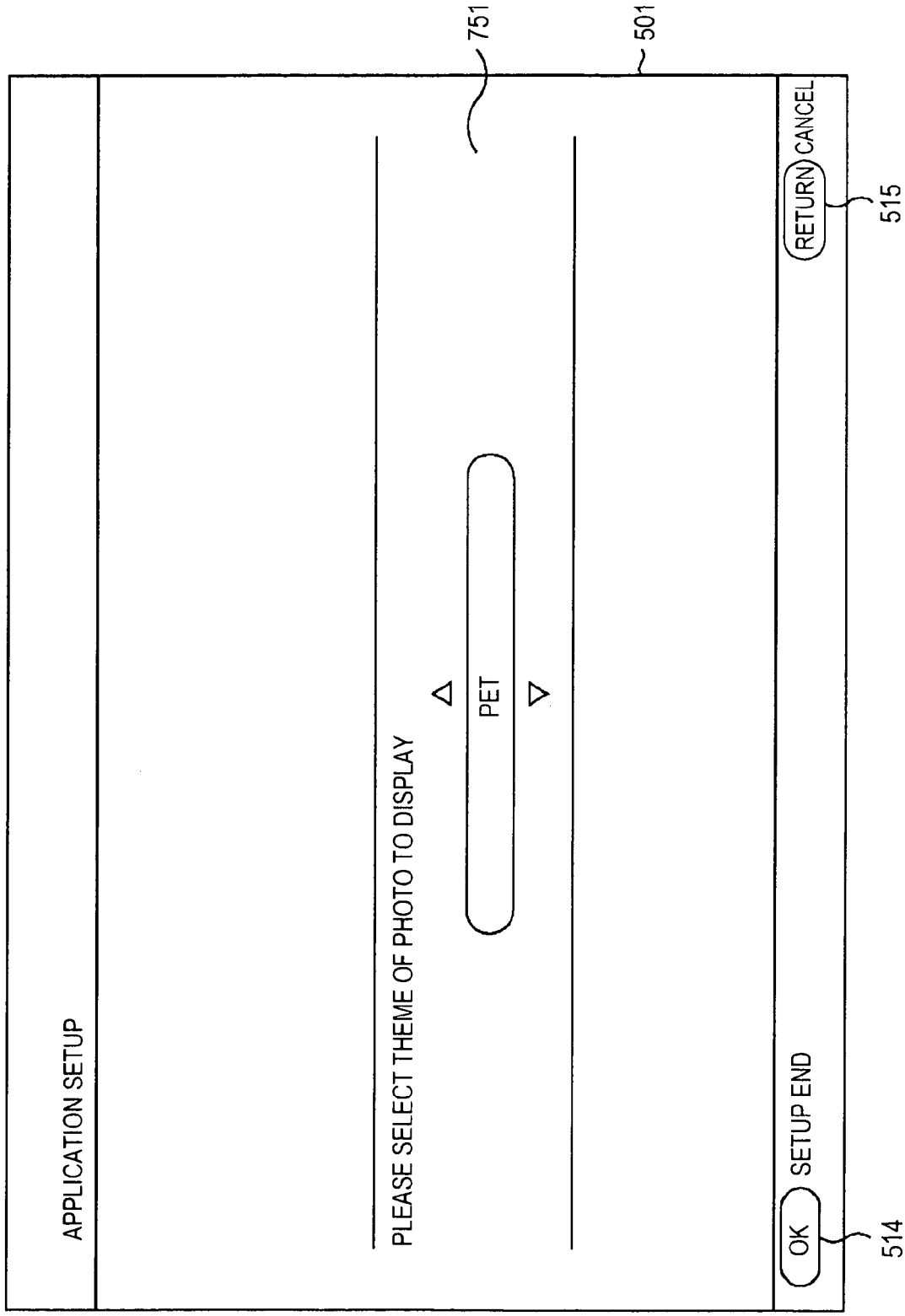
FIG. 41 is a diagram showing an example of a screen which is displayed on the display panel.

Of the items that are displayed in the option menu screen 481, if a button 492 corresponding to the item "APPLICATION SETUP" is operated, the screen is switched to a screen shown in FIG. 41.

A description will be provided for a setup screen shown in FIG. 41. A setup screen 501 shown in FIG. 41 is a screen for setup in the application 72-6 named "PHOTO CHOICE". The setup screen 501 regarding PHOTO CHOICE is a screen for setup of a tag suitable for photos to be displayed through processing in the application 72-6, "PHOTO CHOICE".

The setup screen 501 is provided with a region 751 where a tag can be selected. In the region 751, the sentence, "PLEASE SELECT THEME OF PHOTO TO DISPLAY", which notifies the user that the setup screen 501 is the screen, in which a tag of a photo to be displayed in the screen at the time of PHOTO CHOICE can be selected, is displayed. In the example of FIG. 41, the region 751 is provided with a portion where one tag can be selected.

The user operates the up button 271-1 or the down button 271-2 of the remote controller 251 to select a desired tag. For example, while in the example of FIG. 41, the tag "PET" (the name indicative of the category) is displayed in the region 721, in such a state, if the up button 271-1 of the remote controller 251 is operated, a tag that is virtually provided next to the tag "PET" is displayed.

As the tags, for example, "PET", "TOUR", "NIGHT VIEW", "ART", and the like are used, and the tags are sequentially displayed in the region 751 by the button operation of the remote controller 251. When the user wants to set a tag that is displayed in the region 751, he/she operates a button 514, "OK". Photos that are suitable for the tag set by the operation of the button 514 are displayed within the screen named "PHOTO CHOICE".

In the example of the setup screen 501 shown in FIG. 41, a case where one tag can be selected and set has been described. Alternatively, similarly to the column 513 for selection of favorite foods shown in FIG. 22, a screen having a column, in which a plurality of tags are listed and a desired tag can be checked from among the listed tags, may be displayed. Accordingly, a plurality of tags may be set.

Although the user can set a tag in the setup screen 510, when the user does not set a tag (unset state), if the application 72-6 named "PHOTO CHOICE" is activated, photos suitable for a default tag are displayed within the screen named "PHOTO CHOICE".

The set items set in the setup screen 501 are stored on the television receiver 14 side. Then, for example, when the application 72-6 of the "PHOTO CHOICE" is activated, the tag that is set in the television receiver 14 is referred to, and image data (contents data 131) corresponding to photos suitable for the tag are acquired from the contents server 13-1 and displayed.

A further description will be provided for a screen of a focus mode and a screen of an active mode in the screen named "PHOTO CHOICE".

Figure 42:
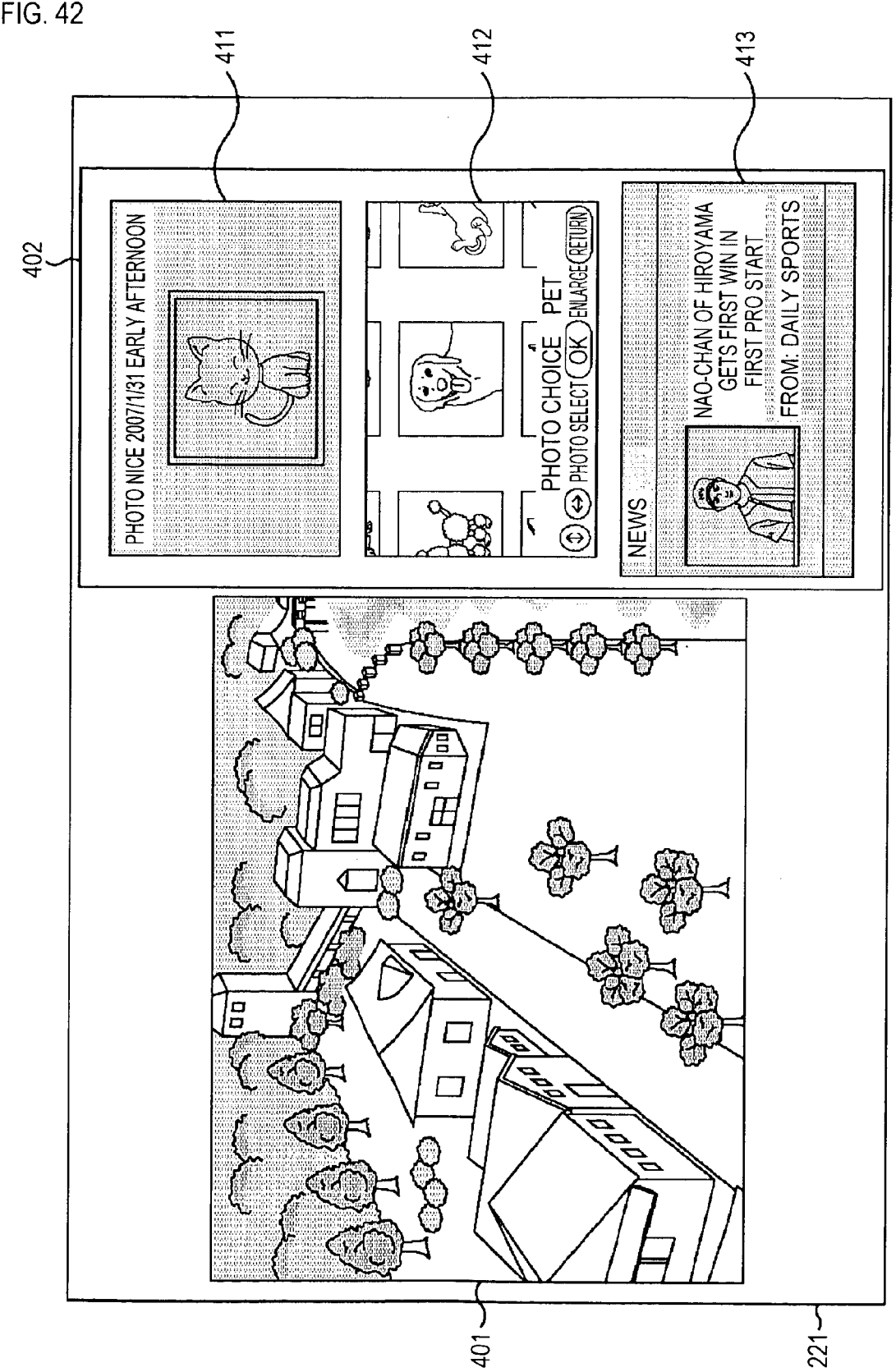
FIG. 42 is a diagram showing an example of a screen which is displayed on the display panel.
Figure 43:
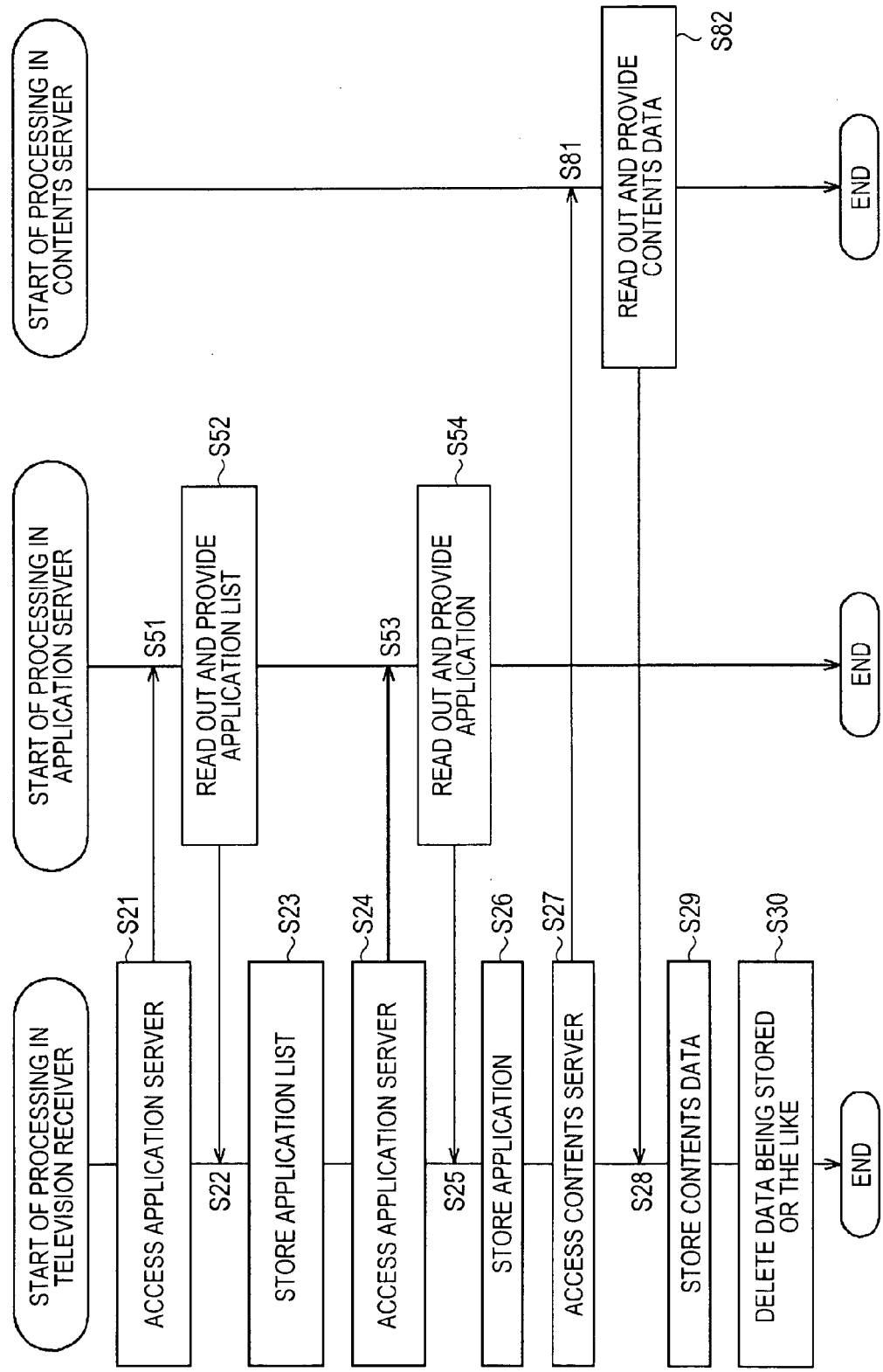
FIG. 43 is a flowchart illustrating the operation of the system.

In the case of the screen of the normal mode shown in FIG. 39, if the OK button 272 of the remote controller 251 is operated, the screen is switched to a screen of a focus mode shown in FIG. 42.

FIG. 42 shows a screen example in the focus mode in which the application 72-6 named "PHOTO CHOICE" is focused. Of the application display region 402, only a region 412 where a photo is displayed through processing by the application 72-6 is displayed brighter than other regions.

In the case of the screen named "PHOTO CHOICE" in the focus mode, a photo that is displayed in the middle of the screen of the normal mode when the mode is changed to the focus mode is enlarged and displayed, and a photo that is displayed around the photo displayed in the middle of the screen is also enlarged and displayed. The photo that is displayed in the middle of the screen is enlarged and displayed such that the entire is displayed, and the photo that is displayed around the photo displayed in the middle of the screen is partially displayed.

If the up button 271-1 of the remote controller 251 is operated, the application 72-6 performs control such that a photo which is positioned above a photo displayed in the middle of the screen at that time is enlarged and displayed in the middle of the screen. If the down button 271-2 of the remote controller 251 is operated, the application 72-6 performs control such that a photo which is positioned below a photo displayed in the middle of the screen at that time is enlarged and displayed in the middle of the screen.

If the left button 271-3 of the remote controller 251 is operated, the application 72-6 performs control such that a photo which is positioned on the left of a photo displayed in the middle of the screen at that time is enlarged and displayed in the middle of the screen. If the right button 271-4 of the remote controller 251 is operated, the application 72-6 performs control such that a photo which is positioned on the right of a photo displayed in the middle of the screen at that time is enlarged and displayed in the middle of the screen.

Control is also performed such that, as the photo in the middle of the screen is switched, other photos are also switched, in addition to the photo that is displayed in the middle of the screen. In this case, image data of other photos is acquired from the contents server 13-1, as needed.

With this control, when "PHOTO CHOICE" is put in the focus mode, the user operates the remote controller 251 to enlarge and display a desired photo in the middle of the screen and to view the enlarged photo.

In the focus mode, for example, the photo that is displayed in the middle of the screen may be framed yellow or the like. The frame allows the user to recognize the focus mode, or ensures a photo being selected to be accurately displayed.

In the focus mode shown in FIG. 42, if the OK button 272 of the remote controller 251 is operated, the mode is changed to the active mode, and the screen is switched. As described above, the active mode is a mode in which only information to be provided by one application 72-6 is displayed. As shown in FIG. 37, in this case, an active screen 621 in which only information to be provided by the application 72-6 named "PHOTO CHOICE" is displayed is displayed in the application display region 402.

In the active mode, the activated application 72-6 accesses the contents server 13-1 to acquire contents data 131 regarding PHOTO CHOICE. The processing based on acquired contents data 131 is executed, and thus a photo is displayed as the active screen 621.

Although the active screen 621 shown in FIG. 37 has already been described, and the details thereof will be omitted, the application 72-6 named "PHOTO CHOICE" is the same as the application 72-4 named "PHOTO FRIEND", and in the active mode, the screen is changed to a screen in which one photo is enlarged and displayed. In this case, the Web browser is activated (the Web browser may be activated).

As described above, the normal mode, the focus mode, and the active mode are provided, and thus the user can easily acquire information in a desired mode while enjoying a program of television broadcasting.

[Server for Management of Image Data of Photo]

As described above, the three applications 72-4 to 72-6, "PHOTO FRIEND", "PHOTO NICE", and "PHOTO CHOICE", are applications for display control of photos. In the foregoing embodiment, a case where the applications 72-4 to 74-6 for display control of photos acquire image data from the contents server 13-1 has been described.

When a photo is registered, the contents server 13-1 is configured to manage an ID for identifying a predetermined user in association with the photo to be registered such that the application 72-4 named "PHOTO FRIEND" can acquire image data on the basis of the ID.

The contents server 13-1 is configured to open a photo being registered or to allow the user to add evaluation to an open photo such that the application 72-5 named "PHOTO NICE" can acquire image data on the basis of an evaluation sequence, and is configured to manage rankings or the like on the basis of the added evaluation.

When a photo is registered, the contents server 13-1 is configured to allow the user to put a tag suitable for a photo to be registered such that the application 72-6 named "PHOTO CHOICE" can acquire image data on the basis of the tag, and is configured to manage the photo in association with the tag put on the photo.

As a user-end apparatus that registers a photo or carries out processing to put a tag on a photo to be registered, for example, a person computer is used. This processing is also carried out by the television receiver 14. As described above, the photos that are managed by the contents server 13-1 can be viewed on the television receiver 14 through processing of the applications 72-4 to 72-6, but the photos may be viewed with the personal computer.

That is, the personal computer may register the photos in the contents server 13-1, and the registered photos may be viewed with the personal computer and the television receiver 14. The contents server 13-1 may store the same photo with different resolutions as a photo for the personal computer and a photo for the television receiver 14, or may store a photo with the same resolution as a photo, which is commonly used in the personal computer and the television receiver 14.

Even a person who is not familiar with the personal computer but familiar with the television receiver 14 can simply view the photos that are registered in the contents server 13-1. In this embodiment, this can be realized. In addition, the television receiver 14 may have a function to import photos, and such a television receiver 14 may register the photos in the photos contents server 13-1. Therefore, similarly to viewing, even a person that is not familiar with the personal computer but familiar with the television receiver 14 can simply register the photos in the contents server 13-1.

In general, the personal computer and the contents server 13-1 perform communication using a language, such as a Web browser or the like.

Like the foregoing embodiment, in the normal mode and the focus mode, in a state where the application 72 does not present information to the user side, in other words, the application 72 does not display information on the display panel 221, the application 72 constantly executes processing insofar as the application 72 is the registered application 72 or the selected application 72. That is, in the normal mode and the focus mode, a plurality of applications 72 execute processing in parallel. In the active mode, the applications 72 other than the application 72, which is put in the active mode, stop the processing.

In the normal mode and the focus mode, a plurality of applications 72 store data for processing in a memory, for example, the SDRAM 230. Meanwhile, in the active mode, only the application 72 in the active mode can store necessary data in the memory.

In consideration of such a situation, similarly to the foregoing embodiment, in the normal mode and the focus mode, an application 72 of a comparatively small size, called a widget or the like, is used. In the active mode, depending on the applications 72, a program by a language, such as a Web browser or the like, is activated, instead of the application 72.

As described above, the Web browser is a language that is generally used for communication between the personal computer and the contents server 13-1. For this reason, if the Web browser is activated, the television receiver 14 can carry out the same processing as the personal computer. For example, as shown in FIG. 37, an enlarged photo may be displayed or information appended with the photo may be displayed.

As described above, in this embodiment, the mode of the application 72 that carries out processing can be switched.

[System Operation]

As described above, when the initial screen is displayed, the application list 71 is acquired from the application server 12 and stored on the television receiver 14 side. Then, when display is switched from the initial screen to the screen of the normal mode, one or a plurality of applications 72 (the programs of the main bodies of the applications 72), which are activated at that time, are acquired from the application server 12 and stored on the television receiver 14 side.

In the normal mode and the focus mode, an access is appropriately executed to the contents server 13 on the basis of the application 72, and contents data 131 is acquired and stored on the television receiver 14 side. In this case, by applications 72, the contents servers 13 as the connection destinations are different, and acquired contents data 131 is different. In the active mode, an access is made to the contents server 13 or a server (not shown) only on the basis of the activated application 72, and contents data 131 or other kinds of data are acquired and stored on the television receiver 14 side.

When the screen is switched from the screen of one of the normal mode, the focus mode, and the active mode to the initial screen, the application 72 and contents data 131 (other kinds of data) that are stored on the television receiver 14 side are deleted. In this way, the application 72 or contents data 131 is stored as needed, and deleted as not needed. Therefore, the memory area for storing the application 72 or contents data 131 on the television receiver 14 side can be reduced.

If the television receiver 14 acquires the application 72 as needed, for example, even if the application 72 is updated, the updated application 72 can be provided to the television receiver 14 side. Therefore, the application 72 that is provided to the television receiver 14 side can be constantly made to be an up-to-date application 72.

The application 72 that is acquired by the television receiver 14 can be set only to the application 72 that is described in the application list 71. For this reason, with appropriate management of the application list 71, an ill-intended application 72 can be prevented from being downloaded to the television receiver 14. In addition, if an interval for which the application 72 is described in the application list 71 is limited, the application 72 can be provided to the user side with a limited interval, and thus the service width can be increased.

The television receiver 14 acquires contents data 131 as needed, and deletes stored contents data 131 as not needed. For example, even in the case of information, such as news articles, which is frequently updated, updated up-to-date information can be provided to the television receiver 14 side, and old information being stored can be prevented from being provided to the user.

Next, the operation of the system shown in FIG. 1 when the display screen of the television receiver 14 is switched, as described above, will be described with reference to a flowchart of FIG. 37. The description in reference to the flowchart of FIG. 37 will be provided focusing on the flow of data in the system of FIG. 1.

In Step S21, the television receiver 14 accesses the application server 12. During this access, a request to provide the application list 71 is made.

In Step S51, the application server 12 accepts the access from the television receiver 14, if the request to provide the application list 71 is accepted, in Step S52, reads out the application list 71, which is managed by the application server 12, from the storage section 38 (FIG. 4), and provides the application list 71 to the television receiver 14.

In Step S22, the television receiver 14 receives the application list 71 provided from the application server 12, in Step S23, stores the received application list 71, and displays the initial screen on the basis of the stored application list 71.

In Step S24, the television receiver 14 starts to access the application server 12 with a user's selection of a predetermined application 72 from the initial screen as a trigger. During this access, a request to provide the application 72 selected by the user or the registered application 72 is made.

In Step S53, the application server 12 accepts the access from the television receiver 14, if the request to provide the application 72 is accepted, in Step S54, reads out the application 72, which is managed by the application server 12, from the storage section 38 (FIG. 4), and provides the application 72 to the television receiver 14. In this case, a plurality of applications 72 may be read out and provided in accordance with a request from the television receiver 14.

In Step S25, the television receiver 14 receives the application 72 provided from the application server 12, in Step S26, stores the received application 72, and starts processing based on the stored application 72.

In Step S27, the television receiver 14 accesses the contents server 13. This access is made when the processing based on the application 72 is executed and contents data 131 is needed.

In Step S81, the contents server 13 accepts the access from the television receiver 14, if a request to provide contents data 131 is accepted, in Step S82, reads out contents data 131, which is managed by the contents server 13, from the storage section 108 (FIG. 6), and provides contents data 131 to the television receiver 14.

The applications 72 individually access different contents servers 13 to acquire contents data 131.

In Step S28, the television receiver 14 receives contents data 131 provided from the contents server 13, in Step S29, stores received contents data 131, and carries out processing based on stored contents data 131, for example, processing, such as text display.

Such processing to acquire or store contents data 131 depends on the application 72 and is repeatedly carried out. For example, in the case of the application 72 that provides news articles, contents data 131 of the news articles is acquired comparatively frequently, and the acquired news articles are provided to the user side. In addition, in the case of the application 72 that provides information about fortune-telling, when the button that is operated to execute fortune-telling is operated, contents data 131 is acquired.

The processing to acquire or store contents data 131 is repeatedly carried out on the basis of the application 72 in each of the normal mode, the focus mode, and the active mode.

In Step S30, the television receiver 14 deletes the application 72 or contents data 131 being stored. This processing is executed with the timing at which an instruction to end the processing by the application 72 is made by the user (for example, when an instruction to display a program of television broadcasting in a full screen mode is made) or at which the television receiver 14 is powered off, as a trigger.

As described above, the application list 71, the application 72, and contents data 131 are acquired on the television receiver 14 as needed. The processing is executed on the basis of the application list 71, the application 72, and contents data 131. The application list 71, the application 72, and contents data 131 are deleted as not needed.

Next, a processing in the television receiver 14 will be described with reference to flowcharts of FIGS. 44-1 and 44-2.

In Step S101, the television receiver 14 accepts an instruction to view the initial screen. When the user wants to view the initial screen, he/she operates the remote controller 251 (FIG. 8) to instruct the television receiver 14 to display the initial screen. The control code indicative of the instruction contents from the remote controller 251 is received by the light receiving section 237 of the television receiver 14 and supplied to the CPU 232. The CPU 232 analyzes the supplied control code to recognize reception of the instruction to display the initial screen and executes processing corresponding to the recognition.

In Step S102, the CPU 232 controls the network I/F 234 and the like, and accesses the application server 12 on the basis of the URL, which is stored in advance. In this case, a request to acquire the application list 71 is also made.

In Step S103, the CPU 232 of the television receiver 14 controls the network I/F 234, receives the application list 71 from the application server 12 as an access destination, and stores the received application list 71 in the SDRAM 230.

While a case where the instruction to view the initial screen is made, the application list 71 is acquired and stored has been described, the application list 71 may be acquired and stored with a different timing. For example, the application list 71 may be acquired when the television receiver 14 is powered on. When this happens, the processing of Step S101 is executed with the timing at which the television receiver 14 is powered on, as a trigger.

The application list 71 may be acquired in a predetermined cycle or at a predetermined time. When this happens, with respect to the processing of Step S101, it is determined whether or not the predetermined cycle elapses, whether or not the predetermined time reaches, or the like, and the processing of Step S101 is executed with the determination result as a trigger.

In any case, the application list 71 to be stored on the television receiver 14 side becomes constantly an up-to-date list.

In Step S104, it is checked whether or not there is an application 72 being registered. As described above, the user can register a desired application 72, and information regarding the registered application 72, for example, the ID for identifying the application 72 is stored in, for example, the flash memory 231.

While a case where information for identifying the application 72 is stored in the flash memory 231 will continue to be described, the ID may be stored in a storage section other than the flash memory 231, or an exclusive-use storage section storing the ID may be provided. In addition, while a case where setup information and the like are stored in the flash memory 231 will continue to be described, the setup information may be stored in a storage section other than the flash memory 231, or an exclusive-use storage section storing the setup information may be provided.

The CPU 232 determines whether or not the ID for identifying the application 72 is stored in the flash memory 231, when the ID is stored, determines to be the registered application 72, and carries out a subsequent processing.

In Step S105, the CPU 232 instructs the graphic generation circuit 219 to generate data of the initial screen based on the application list 71. The panel driving circuit 220 controls the display panel 221 on the basis of data of the initial screen generated by the graphic generation circuit 219. With such control, for example, the initial screen shown in FIG. 11 is displayed on the display panel 221.

When data of the initial screen is generated, in Step S104, if it is determined to be the registered application 72, the ID that is identical to the ID of the registered application 72 is detected from the application list 71, and data is generated for display of an icon indicative of REGISTERED in the registration state display section 305 of the application 72 corresponding to the detected ID.

In Step S106, it is determined whether or not an application 72 is selected from the initial screen. The CPU 232 analyzes the control code from the remote controller 251 to determine whether or not the OK button 272 of the remote controller 251 is operated. When it is determined that the OK button 272 of the remote controller 251 is operated, the CPU 232 determines that an application 72 is selected from the initial screen.

As shown in FIG. 10, the cursor 311 is displayed in the initial screen. When the cursor 311 is positioned on an icon indicative of a predetermined application 72, if the OK button 272 of the remote controller 251 is operated, it is determined that the application 72 is selected, and the processing progresses to Step S107.

Figures 1, 44:
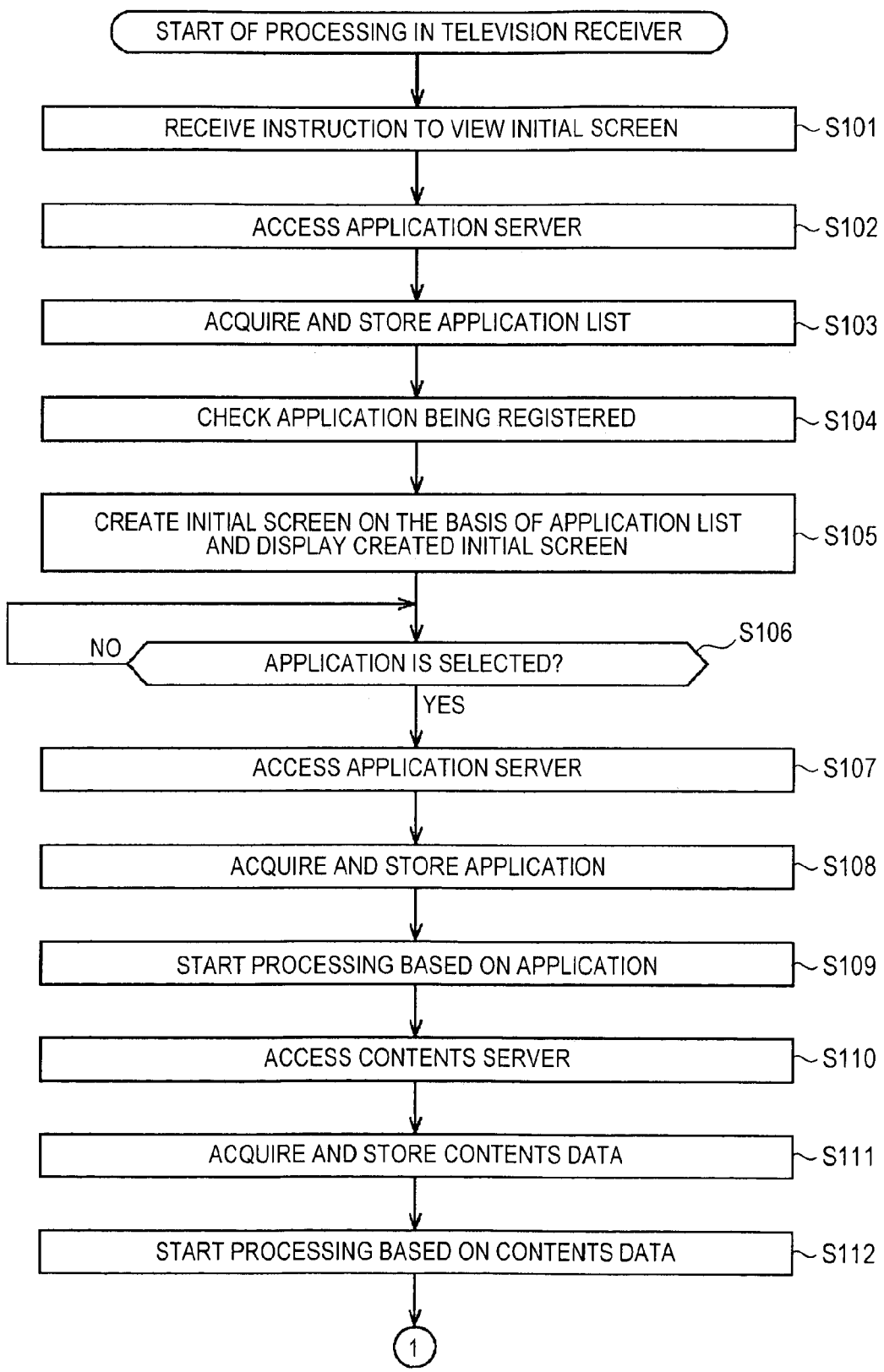
Figures 2, 44:
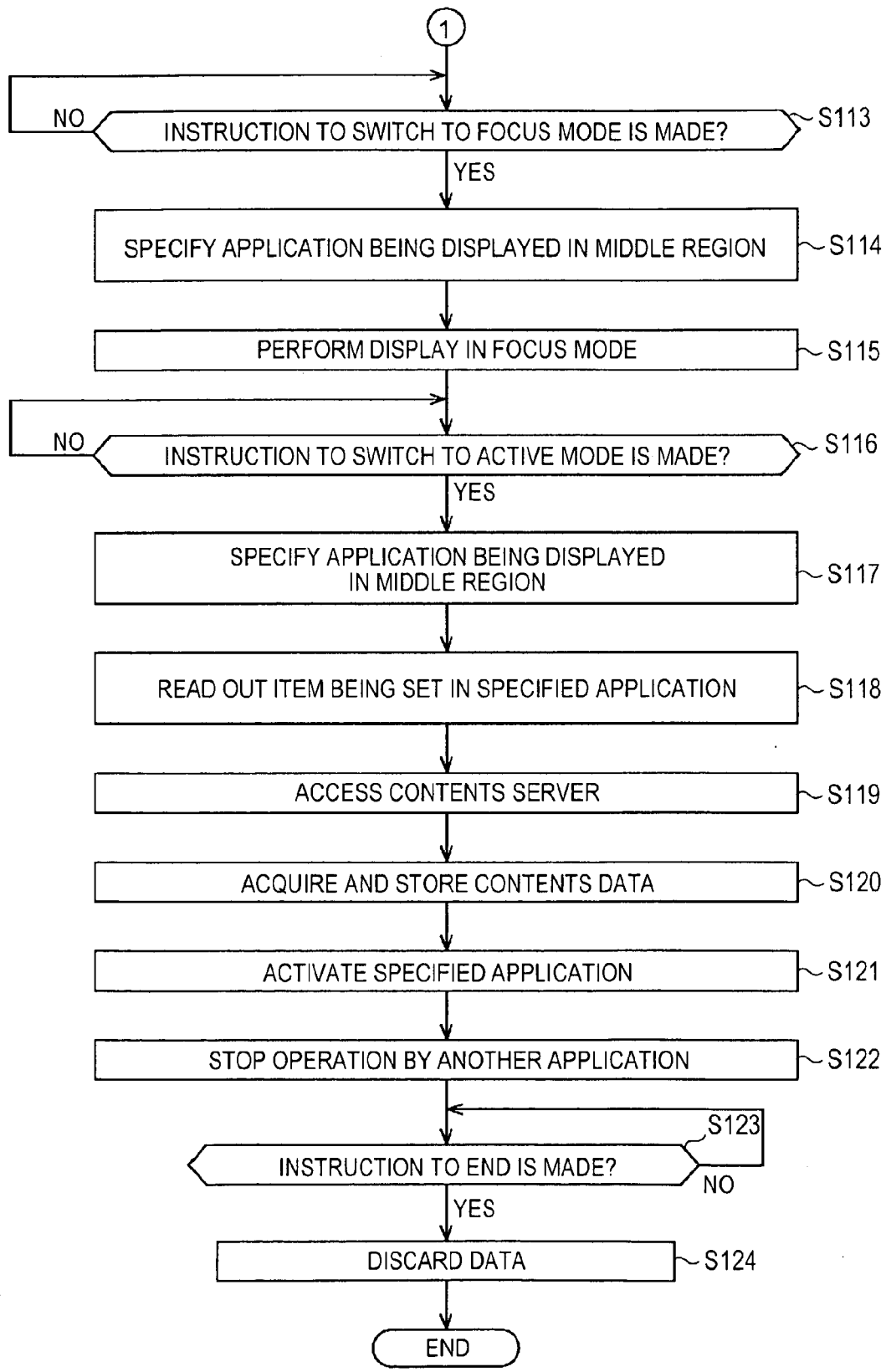

Though not included in the processing based on the flowchart of FIG. 44-1, the CPU 232 analyzes the control code to determine that the up button 271-1 or the down button 271-2 of the remote controller 251 is operated, and controls the graphic generation circuit 219 such that display is performed so as to the icon indicative of the application 72 slides upward or downward. Such control is appropriately performed on the basis of the control code from the remote controller 251.

In Step S106, when it is determined that the application 72 is selected, the processing progresses to Step S107. In Step S107, an access is made to the application server 12, and in Step S108, the selected application 72 is acquired. When there is a registered application 72, all the registered applications 72 are acquired, together with the selected application 72. When the utility named "SERVICE CAST", which is described with reference to FIG. 31, is selected, all the registered applications 72 are acquired. The acquired applications 72 are stored in the flash memory 231.

In Step S109, the CPU 232 starts processing based on the application 72 stored in the flash memory 231. In Step S110, an access is made to the contents server 13, and in Step S111, contents data 131 is acquired from the contents server 13 as an access destination and stored in the flash memory 231.

Contents data 131 is acquired through processing based on the application 72. Therefore, in any application 72, the processing may be omitted. When the processing is omitted, the processing of Step S112 will be omitted.

In Step S112, the processing based on the contents data 131 is carried out. Through the processing based on the acquired application 72, the graphic generation circuit 219 generates data of a screen including text or images on the basis of contents data 131. The panel driving circuit 220 controls the display panel 221 on the basis of generated data, for example, the screen of the normal mode shown in FIG. 14 is displayed.

In Step S113 (FIG. 44-2), it is determined whether or not an instruction to switch to the focus mode is made, when it is determined that the switch instruction is made, the processing progresses to Step S114. When recognizing from the control code of the remote controller 251 that the OK button 272 is operated, the CPU 232 determines that the instruction to switch to the focus mode is made. While a case where the OK button 272 is operated will continue to be described, when it is recognized that the up button 271-1 is operated or the like, processing on the basis of the recognition result is carried out.

In Step S114, an application 72 that is displayed in the region 412 in the middle of the application display region 402 is specified. In Step S115, processing for display in the focus mode is executed. For example, as shown in FIG. 17, display in the focus mode means that the upper region 411 and the lower region 413 of the application display region 402 are displayed dark or that the buttons or the like are displayed in the middle region 412.

The CPU 232 instructs the graphic generation circuit 219 to display the upper region 411 and the lower region 413 of the application display region 402 dark. Simultaneously, if the buttons or the like to be displayed when the application 72, which displays information in the region 412, is in the focus mode are present in the middle region 412, the CPU 232 instructs the graphic generation circuit 219 to display the buttons or the like. If the processing based on such an instruction is carried out, the screen of the focus mode shown in FIG. 17 is displayed on the display panel 221.

In Step S116, it is determined whether or not an instruction to switch to the active mode is made, and when it is determined that the switch instruction is made, the processing progresses to Step S117. In Step S117, an application 72 that is displayed in the middle region 412 is specified, and in Step S118, the items that are set in the specified application 72 are read out.

As described with reference to FIG. 20, for example, the application 72 for proving fortune-telling is configured to set predetermined items, such as zodiac signs, and to acquire appropriate information corresponding to the set items (for example, zodiac signs). During the processing based on the application 72, which is displayed in the region 412, when the items that are set in the active mode are referred to, in Step S118, the CPU 232 reads out the set items.

While a case where the items being set in the active mode are read out has been described, in any application 72, the items that are set in the normal mode or the focus mode may be read out.

In the active mode, in any application 72, a Web browser may be activated, and the processing may be switched to processing by the Web browser. When the Web browser is activated, control is performed such that the processing to acquire information regarding a program of television broadcasting is not carried out.

In Step S119, an access is made to the contents server 13, and in Step S120, contents data 131 is acquired and stored. Contents data 131 is data of information suitable for the set items. In Step S121, the screen of the active mode shown in FIG. 18 is displayed. That is, the screen is displayed in which only information by the application 72 specified in Step S117 is displayed, and information to be displayed is based on contents data 131 acquired and stored in Step S120.

In the active mode, in Step S122, the applications 72 other than the application 72, which is displaying information in the region 412 or the entire display panel 221, stop. That is, the CPU 232 does not carry out the processing of the applications 72 other than the application 72 specified in Step S117.

In Step S123, it is determined whether or not an instruction to end the processing by the application 72 is made. The determination that the instruction to end the processing by the application 72 is made is carried out when an instruction to end is made from the user, when an instruction to display only a program of television broadcasting is made, when the television receiver 14 is powered off, or the like.

In Step S123, when it is determined that the instruction to end is made, the processing progresses to Step S124, and the stored application 72 or contents data 131 is discarded. In this way, stored data or the like is discarded as not needed. In other words, stored information other than the setup information is discarded, and only the setup information is stored.

As described above, on the television receiver 14 side, the application 72 or contents data 131 is acquired as needed, and discarded as not needed. For this reason, the storage section, such as the flash memory 231 or the like, can be effectively used, and with small capacity, a plurality of applications 72 can operate in parallel.

The processing described with reference to the flowcharts of FIGS. 44-1 and 44-2 are for illustrative of one processing.

In any application 72, for example, the processing to acquire contents data 131 may be omitted.

While in the foregoing embodiment, a case where the invention is applied to the television receiver 14 has been described, the invention is not limited to the television receiver 14, but it may be applied to CE appliances, such as a DVD recorder and the like.

In the foregoing embodiment, a case where the application 72 may be, for example, a program, called a widget has been described. In general, the widget is downloaded to the personal computer before being executed, installed on the personal computer, and is used in a state of being resident on the personal computer. However, in this embodiment, as described above, a program is downloaded when being executed and discarded as not needed. If the application 72 is handled in such a manner, various effects described above can be expected.

$

In the foregoing embodiment, each application 72 may have a hierarchical structure. In the foregoing embodiment, for example, the application 72-4 called "PHOTO FRIEND" may be registered in a plural number, not alone. For example, the applications 72-4 called "PHOTO FRIEND" may be registered for each of a plurality of friends. Of course, the invention is not limited to the above-described application 72, but the invention may be applied to other applications.

[Recording Medium]

A series of processing described above may be executed by hardware or may be executed by software. When a series of processing is executed by software, a program constituting software is installed from a program recording medium on a computer, which is incorporated with exclusive-use hardware, or a general-use personal computer, on which various programs are installed so as to execute various functions.

For example, a program that is executed by a computer (CPU 31) having the same configuration as the application server 12 shown in FIG. 2 is recorded in a removable medium 41, which is a package medium, such as a magnetic disk (including a flexible disk), an optical disk (CD-ROM (Compact Disc-Read Only Memory), DVD (Digital Versatile Disc), or the like), a magneto-optical disk, a semiconductor memory, or the like, and then provided, or is provided through a wired or wireless transmission medium, such as a local area network, Internet, or digital satellite broadcasting.

The program may be installed in the storage section 38 through the input/output interface 35 by inserting the removable medium 41 into the drive 40. The program may be received by the communication section 39 through a wired or wireless transmission medium, and installed in the storage section 38. Furthermore, the program may be installed in the ROM 32 or the storage section 38 in advance.

The program to be executed by the computer may be a program for carrying out processing in time series according to the described order, or may be a program for carrying out processing in parallel or with necessary timing, for example, when a call is made.

In this specification, the system means the entire apparatus including a plurality of apparatuses.

Embodiments of the invention are not limited to the foregoing embodiments, and various changes may be made without departing from the subject matter of the invention.

The invention claimed is:

1. An information processing apparatus, comprising:
 a processor; and
 a display panel;
 wherein the information processing apparatus controls display on the display panel of a program of television broadcasting provided by a contents provider and the processor executes processing based on a predetermined application provided by a service provider, a main body of the application being stored external to the information processing apparatus and being acquired by the apparatus based on an application identification stored in the apparatus, the application is acquired through a network, a plurality of acquired applications execute processing in parallel, and
 when a processing mode is switched in the application, activates a Web browser to change the processing based on the application to processing based on the Web browser, and when the Web browser is activated, the plurality of applications are discarded.

2. The information processing apparatus according to claim 1,
 wherein display is controlled such that a screen of the program of television broadcasting and a screen by the processing based on the application lie next to each other.

3. The information processing apparatus according to claim 1,
 wherein, when the Web browser is activated, control of the program of television broadcasting stops.

4. An information processing method for implementation by an information processing apparatus, comprising the steps of:
 controlling display on a display panel of a program of television broadcasting provided by a contents provider and executing processing based on a predetermined application provided by a service provider, a main body of the application being stored external to the information processing apparatus and being acquired by the information processing apparatus based on an application identification stored in the apparatus, the application is acquired through a network, a plurality of acquired applications execute processing in parallel; and
 when a processing mode is switched in the application, activating a Web browser to change the processing based on the application to processing based on the Web browser, and when the Web browser is activated, the plurality of applications are discarded.

5. A non-transitory computer readable medium having stored thereon a computer-readable program that controls a processing for implementation by an information processing apparatus, the processing comprising the steps of:
 controlling display on a display panel of a program of television broadcasting provided by a contents provider and executing processing based on a predetermined application provided by a service provider, a main body of the application being stored external to the information processing apparatus and being acquired by the information processing apparatus based on an application identification stored in the apparatus, the application is acquired through a network, a plurality of acquired applications execute processing in parallel; and
 when a processing mode is switched in the application, activating a Web browser to change the processing based on the application to processing based on the Web browser, and when the Web browser is activated, the plurality of applications are discarded.

* * * * *